US009912963B2

(12) United States Patent
Nakamura et al.

(10) Patent No.: US 9,912,963 B2
(45) Date of Patent: Mar. 6, 2018

(54) PICTURE DECODING DEVICE, PICTURE DECODING METHOD AND PICTURE DECODING PROGRAM

(71) Applicant: JVC KENWOOD Corporation, Yokohama (JP)

(72) Inventors: Hiroya Nakamura, Yokohama (JP); Motoharu Ueda, Yokohama (JP); Shigeru Fukushima, Yokohama (JP); Toru Kumakura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/711,117

(22) Filed: Sep. 21, 2017

(65) Prior Publication Data

US 2018/0020234 A1   Jan. 18, 2018

Related U.S. Application Data

(63) Continuation of application No. 14/860,292, filed on Sep. 21, 2015, now Pat. No. 9,807,420, which is a
(Continued)

(30) Foreign Application Priority Data

Mar. 29, 2013  (JP) .................. 2013-074913
Mar. 29, 2013  (JP) .................. 2013-074914
(Continued)

(51) Int. Cl.
*H04N 19/593* (2014.01)
*H04N 19/109* (2014.01)
(Continued)

(52) U.S. Cl.
CPC ......... *H04N 19/593* (2014.11); *H04N 19/109* (2014.11); *H04N 19/176* (2014.11);
(Continued)

(58) Field of Classification Search
CPC .. H04N 19/176; H04N 19/593; H04N 19/109; H04N 19/50
See application file for complete search history.

(56) References Cited

U.S. PATENT DOCUMENTS

2013/0136375 A1*  5/2013  Sasai ................. G06T 9/004
                                                    382/238
2013/0182761 A1*  7/2013  Chen .................. H04N 19/593
                                                    375/240.02

FOREIGN PATENT DOCUMENTS

CA       2870602 A1    10/2013
JP    2013-005343 A     1/2013
(Continued)

OTHER PUBLICATIONS

"Information technology—Coding of audio-visual objects—Part 10: Advanced Video Coding," International Standard ISO/IEC 14496-10, Seventh Edition, May 1, 2012 [Cited in parent].
(Continued)

*Primary Examiner* — Obafemi Sosanya
(74) *Attorney, Agent, or Firm* — Venable LLP; Michael A. Sartori; Miguel A. Lopez

(57) ABSTRACT

In a picture coding device for coding picture signals including a brightness signal and a color-difference signal in a block unit using intra-prediction and coding information regarding an intra-prediction mode, when aspect ratios of pixels of the brightness signal and the color-difference signal are different from each other, a bitstream generator converts a mode number of a first intra-color-difference prediction mode used when the aspect ratios are equal to each other into a scaled mode number and derives a second intra-color-
(Continued)

difference prediction mode used when the aspect ratios are different from each other.

3 Claims, 35 Drawing Sheets

Related U.S. Application Data continuation of application No. PCT/JP2014/001510, filed on Mar. 17, 2014.

(30) Foreign Application Priority Data

| Apr. 10, 2013 | (JP) | 2013-081796 |
|---|---|---|
| Apr. 10, 2013 | (JP) | 2013-081797 |
| Feb. 10, 2014 | (JP) | 2014-023251 |
| Feb. 10, 2014 | (JP) | 2014-023252 |

(51) Int. Cl.
*H04N 19/176* (2014.01)
*H04N 19/186* (2014.01)
*H04N 19/463* (2014.01)
*H04N 19/503* (2014.01)

(52) U.S. Cl.
CPC ......... *H04N 19/186* (2014.11); *H04N 19/463* (2014.11); *H04N 19/503* (2014.11)

(56) References Cited

FOREIGN PATENT DOCUMENTS

| JP | 2013-005344 A | 1/2013 |
|---|---|---|
| JP | 2013-009102 | 1/2013 |
| WO | 2012/176405 A1 | 12/2012 |
| WO | 2012/176406 A1 | 12/2012 |

OTHER PUBLICATIONS

International Search Report in PCT International Application No. PCT/JP2014/001510, dated Jun. 3, 2014 [Cited in parent].
International Preliminary Report on Patentability in PCT International Application No. PCT/JP2014/001510, dated Sep. 29, 2015 [Cited in parent].
Extended European Search Report in counterpart European Patent Application No. 14773077.4, dated Sep. 28, 2016 [Cited in parent].

\* cited by examiner

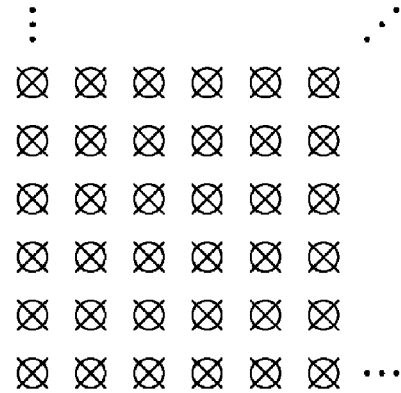
FIG.3C
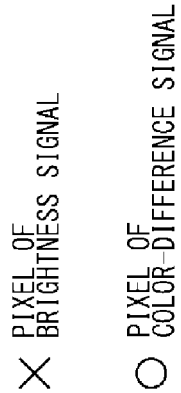
× PIXEL OF BRIGHTNESS SIGNAL
○ PIXEL OF COLOR-DIFFERENCE SIGNAL
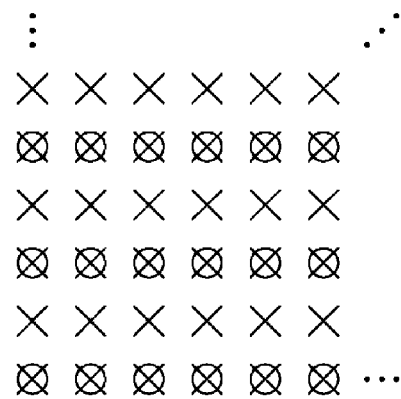
FIG.3B
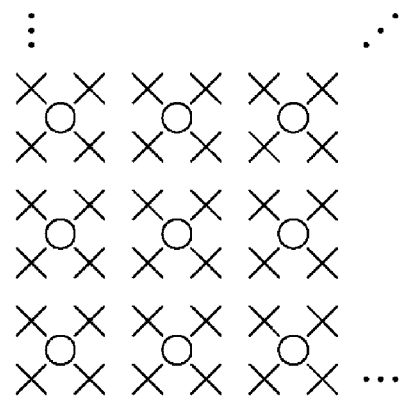
FIG.3E
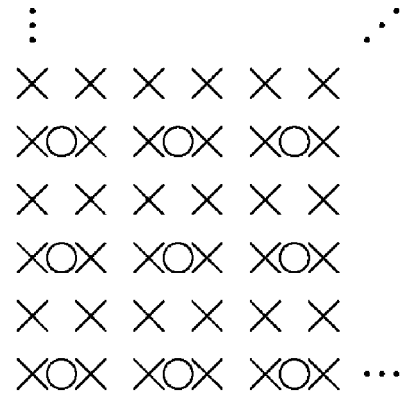
FIG.3A
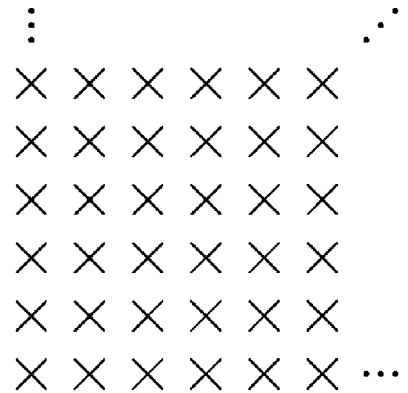
FIG.3D

MACRO BLOCK PARTITION

SUB-MACRO BLOCK PARTITION

| seq_parameter_set_rbsp( ) { | Descriptor |
|---|---|
| ...... | |
| chroma_format_idc | ue(v) |
| if(chroma_format_idc == 3) | |
|    separate_colour_plane_flag | u(1) |
| ...... | |
| } | |

FIG.14

| SYNTAX ELEMENT intra_chroma_pred_mode | INTRA-BRIGHTNESS PREDICTION MODE | | | | |
|---|---|---|---|---|---|
| | 0 | 26 | 10 | 1 | VALUE OTHER THAN 0, 1, 10, AND 26 |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | SAME VALUE AS INTRA-BRIGHTNESS PREDICTION MODE |

FIG.15

| INTRA-BRIGHTNESS PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| FIRST INTRA-COLOR-DIFFERENCE PREDICTION MODE | 0 | 1 | 2 | 2 | 2 | 2 | 3 | 5 | 7 | 8 | 10 | 11 | 12 | 13 | 14 | 15 | 16 | 17 |
| SECOND INTRA-COLOR-DIFFERENCE PREDICTION MODE | 0 | 1 | 2 | 2 | 2 | 2 | 3 | 5 | 7 | 8 | 10 | 12 | 13 | 15 | 17 | 18 | 18 | 18 |

| INTRA-BRIGHTNESS PREDICTION MODE | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| FIRST INTRA-COLOR-DIFFERENCE PREDICTION MODE | 18 | 19 | 20 | 21 | 22 | 23 | 24 | 25 | 26 | 27 | 28 | 29 | 30 | 31 | 32 | 33 | 34 |
| SECOND INTRA-COLOR-DIFFERENCE PREDICTION MODE | 21 | 22 | 23 | 23 | 24 | 24 | 25 | 25 | 26 | 27 | 27 | 28 | 29 | 29 | 30 | 30 | 31 |

| INTRA-BRIGHTNESS PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| FIRST INTRA-COLOR-DIFFERENCE PREDICTION MODE | 0 | 1 | 2 | 2 | 2 | 2 | 3 | 5 | 7 | 8 | 10 | 12 | 13 | 15 | 17 | 18 | 19 | 20 |
| SECOND INTRA-COLOR-DIFFERENCE PREDICTION MODE | | | | | | | | | | | | | | | | | | |

| INTRA-BRIGHTNESS PREDICTION MODE | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| FIRST INTRA-COLOR-DIFFERENCE PREDICTION MODE | 19 | 20 | 21 | 22 | 23 | 24 | 25 | 26 | 27 | 28 | 29 | 30 | 31 | 32 | 33 | 34 | |
| SECOND INTRA-COLOR-DIFFERENCE PREDICTION MODE | 21 | 22 | 23 | 24 | 24 | 25 | 25 | 26 | 26 | 27 | 27 | 28 | 28 | 29 | 29 | 30 | 31 |

FIG.17

| INTRA-BRIGHTNESS PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| FIRST INTRA-COLOR-DIFFERENCE PREDICTION MODE | 0 | 1 | 2 | 2 | 2 | 2 | 2 | 4 | 6 | 8 | 10 | 12 | 14 | 16 | 18 | 18 | 18 | 18 |
| SECOND INTRA-COLOR-DIFFERENCE PREDICTION MODE | | | | | | | | | | | | | | | | | | |

| INTRA-BRIGHTNESS PREDICTION MODE | 18 | 19 | 20 | 21 | 22 | 23 | 24 | 25 | 26 | 27 | 28 | 29 | 30 | 31 | 32 | 33 | 34 | |
|---|---|---|---|---|---|---|---|---|---|---|---|---|---|---|---|---|---|---|
| FIRST INTRA-COLOR-DIFFERENCE PREDICTION MODE | | | | | | | | | | | | | | | | | | |
| SECOND INTRA-COLOR-DIFFERENCE PREDICTION MODE | 22 | 22 | 23 | 23 | 24 | 24 | 25 | 25 | 26 | 27 | 27 | 28 | 28 | 29 | 29 | 30 | 30 | |

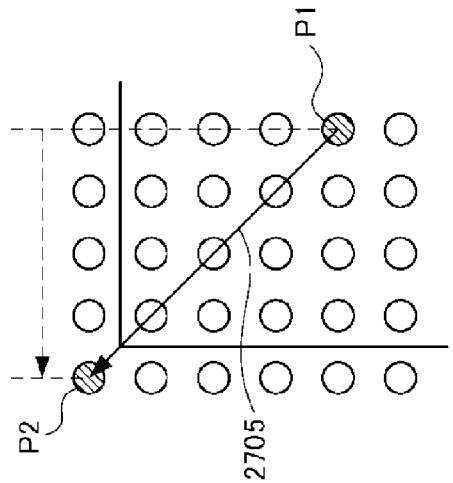
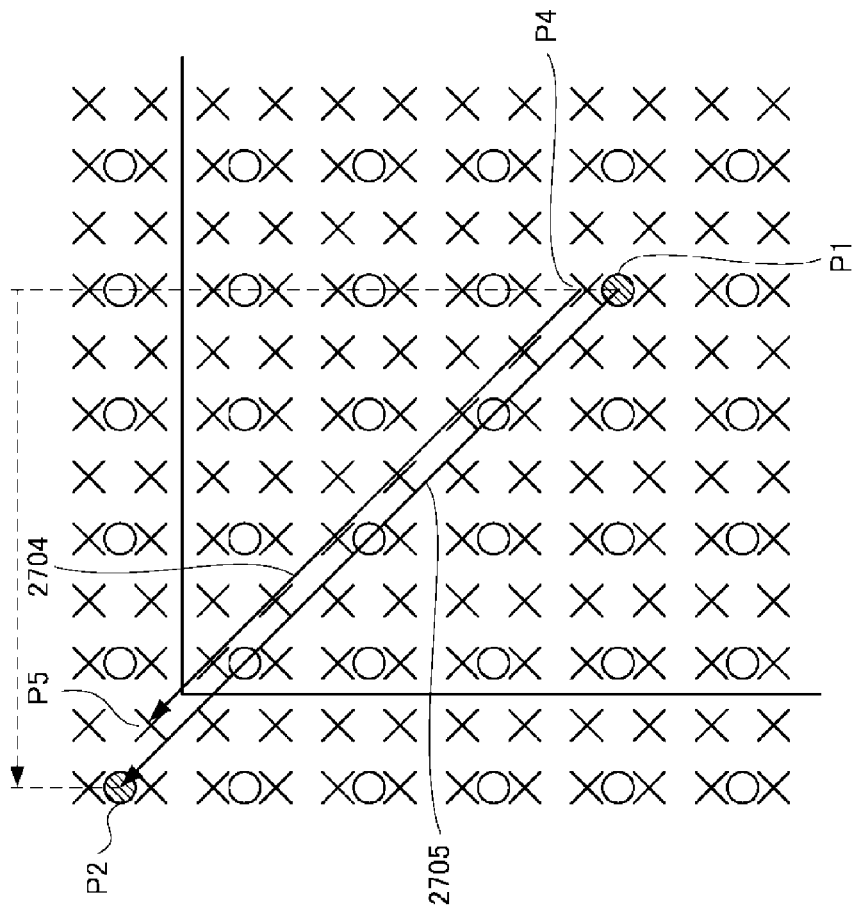

FIG.25

| INTRA-COLOR-DIFFERENCE PREDICTION MODE | INTRA-BRIGHTNESS PREDICTION MODE | | | | |
|---|---|---|---|---|---|
| | 0 | 26 | 10 | 1 | VALUE OTHER THAN 0, 1, 10, AND 26 |
| 0 | 4 | 0 | 0 | 0 | 0 |
| 26 | 1 | 4 | 1 | 1 | 1 |
| 10 | 2 | 2 | 4 | 2 | 2 |
| 1 | 3 | 3 | 3 | 4 | 3 |
| 34 | 0 | 1 | 2 | 3 | – |
| SAME VALUE AS INTRA-BRIGHTNESS PREDICTION MODE | 4 | 4 | 4 | 4 | 4 |

FIG.27

| INTRA-PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| ANGLE OF INTRA-PREDICTION OF SIGNAL OTHER THAN COLOR-DIFFERENCE SIGNAL OF COLOR-DIFFERENCE FORMAT 4:2:2 | - | - | 32 | 26 | 21 | 17 | 13 | 9 | 5 | 2 | 0 | -2 | -5 | -9 | -13 | -17 | -21 | -26 |
| ANGLE OF INTRA-PREDICTION SIGNAL FOR COLOR-DIFFERENCE SIGNAL OF COLOR-DIFFERENCE FORMAT 4:2:2 | - | - | 32 | 32 | 32 | 32 | 26 | 17 | 9 | 5 | 0 | -5 | -9 | -17 | -26 | -32 | -32 | -32 |

| INTRA-PREDICTION MODE | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| ANGLE OF INTRA-PREDICTION OF SIGNAL OTHER THAN COLOR-DIFFERENCE SIGNAL OF COLOR-DIFFERENCE FORMAT 4:2:2 | -32 | -26 | -21 | -17 | -13 | -9 | -5 | -2 | 0 | 2 | 5 | 9 | 13 | 17 | 21 | 26 | 32 |
| ANGLE OF INTRA-PREDICTION SIGNAL FOR COLOR-DIFFERENCE SIGNAL OF COLOR-DIFFERENCE FORMAT 4:2:2 | -17 | -13 | -9 | -9 | -5 | -5 | -2 | -2 | 0 | 2 | 2 | 5 | 5 | 9 | 9 | 13 | 17 |

FIG.28

| INTRA-PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| ANGLE OF INTRA-PREDICTION OF SIGNAL OTHER THAN COLOR-DIFFERENCE SIGNAL OF COLOR-DIFFERENCE FORMAT 4:2:2 | — | — | 32 | 26 | 21 | 17 | 13 | 9 | 5 | 2 | 0 | -2 | -5 | -9 | -13 | -17 | -21 | -26 |
| ANGLE OF INTRA-PREDICTION SIGNAL FOR COLOR-DIFFERENCE SIGNAL OF COLOR-DIFFERENCE FORMAT 4:2:2 | — | — | 32 | 32 | 32 | 32 | 26 | 18 | 10 | 4 | 0 | -4 | -10 | -18 | -26 | -32 | -32 | -32 |

| INTRA-PREDICTION MODE | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| ANGLE OF INTRA-PREDICTION OF SIGNAL OTHER THAN COLOR-DIFFERENCE SIGNAL OF COLOR-DIFFERENCE FORMAT 4:2:2 | -32 | -26 | -21 | -17 | -13 | -9 | -5 | -2 | 0 | 2 | 5 | 9 | 13 | 17 | 21 | 26 | 32 |
| ANGLE OF INTRA-PREDICTION SIGNAL FOR COLOR-DIFFERENCE SIGNAL OF COLOR-DIFFERENCE FORMAT 4:2:2 | -16 | -13 | -11 | -9 | -7 | -5 | -3 | -1 | 0 | 1 | 2 | 4 | 6 | 8 | 10 | 13 | 16 |

FIG.30

| INTRA-BRIGHTNESS PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| FIRST INTRA-COLOR-DIFFERENCE PREDICTION MODE | 0 | 1 | 2 | 2 | 2 | 2 | 2 | 4 | 6 | 8 | 10 | 12 | 14 | 16 | 18 | 20 | 21 | 21 |
| SECOND INTRA-COLOR-DIFFERENCE PREDICTION MODE | 18 | 19 | 20 | 21 | 22 | 23 | 24 | 25 | 26 | 27 | 28 | 29 | 30 | 31 | 32 | 33 | 34 | |
| INTRA-BRIGHTNESS PREDICTION MODE | 18 | 19 | 20 | 21 | 22 | 23 | 24 | 25 | 26 | 27 | 28 | 29 | 30 | 31 | 32 | 33 | 34 | |
| FIRST INTRA-COLOR-DIFFERENCE PREDICTION MODE | 22 | 22 | 23 | 23 | 24 | 24 | 25 | 25 | 26 | 27 | 27 | 28 | 28 | 29 | 29 | 30 | 30 | |

FIG.33

| INTRA-BRIGHTNESS PREDICTION MODE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| FIRST INTRA-COLOR-DIFFERENCE PREDICTION MODE | 0 | 1 | 2 | 2 | 2 | 2 | 3 | 4 | 6 | 8 | 10 | 12 | 14 | 16 | 17 | 18 | 19 | 20 |
| SECOND INTRA-COLOR-DIFFERENCE PREDICTION MODE | 18 | 19 | 20 | 21 | 22 | 23 | 24 | 25 | 26 | 27 | 28 | 29 | 30 | 31 | 32 | 33 | 34 | |
| INTRA-BRIGHTNESS PREDICTION MODE | 21 | 22 | 23 | 23 | 24 | 24 | 25 | 25 | 26 | 27 | 27 | 28 | 28 | 29 | 29 | 30 | 31 | |
| FIRST INTRA-COLOR-DIFFERENCE PREDICTION MODE | | | | | | | | | | | | | | | | | | |
| SECOND INTRA-COLOR-DIFFERENCE PREDICTION MODE | | | | | | | | | | | | | | | | | | |

PICTURE DECODING DEVICE, PICTURE DECODING METHOD AND PICTURE DECODING PROGRAM

CROSS-REFERENCE TO RELATED APPLICATION

This application is a Continuation of U.S. patent application Ser. No. 14/860,292, filed Sep. 21, 2015, which is a Continuation of International Application No. PCT/JP2014/001510, filed on Mar. 17, 2014, which in turn claims the benefit of Japanese Application No. 2013-074913, filed on Mar. 29, 2013, Japanese Application No. 2013-074914, filed on Mar. 29, 2013, Japanese Application No. 2013-081796, filed on Apr. 10, 2013, Japanese Application No. 2013-081797, filed on Apr. 10, 2013, Japanese Application No. 2014-023251, filed on Feb. 10, 2014, and Japanese Application No. 2014-023252, filed on Feb. 10, 2014, the disclosures of which Applications are incorporated by reference herein.

BACKGROUND

1. Field of the Invention

The present invention relates to technology for coding and decoding a picture, and particularly, technology for coding and decoding in a screen.

2. Description of the Related Art

As a representative example of a compression coding system of moving pictures, the standard of MPEG-4 AVC/H.264 is known. In MPEG-4 AVC/H.264, coding is performed in units of macro blocks obtained by dividing a picture into a plurality of rectangular blocks. A size of the macro block is defined as 16×16 pixels in a brightness signal, regardless of a picture size. A color-difference signal is also included in the macro block. However, a size of the color-difference signal included in the macro block is different according to a color-difference format of a coded picture. When the color-difference format is 4:2:0, the size of the color different signal is defined as 8×8 pixels, when the color-difference format is 4:2:2, the size of the color different signal is defined as 8×16 pixels, and when the color-difference format is 4:4:4, the size of the color different signal is defined as 16×16 pixels.

In the color-difference format, a ratio of sampled pixel numbers of three signals of one piece of brightness information and two pieces of color-difference information is represented by X:Y:Z. As examples of a color-difference format of a picture to be coded and decoded by MPEG-4 AVC/H.264, 4:2:0, 4:2:2, 4:4:4, and a monochrome are known.

FIGS. 3A to 3E are a diagram illustrating each color-difference format of a picture. x shows a position of a pixel of a brightness signal of a picture on a screen plane and ○ shows a position of a pixel of a color-difference signal.

4:2:0 illustrated in FIG. 3A is a color-difference format in which a color-difference signal is sampled at a density of ½ in both horizontal and vertical directions, with respect to a brightness signal. That is, in 4:2:0, aspect ratios of pixels of the brightness signal and the color-difference signal are equal to each other. In 4:2:0, the color-difference signal may be sampled at a position illustrated in FIG. 3E.

4:2:2 illustrated in FIG. 3B is a color-difference format in which a color-difference signal is sampled at a density of ½ in a horizontal direction and at the same density in a vertical direction, with respect to a brightness signal. That is, in 4:2:2, aspect ratios of pixels of the brightness signal and the color-difference signal are different from each other.

4:4:4 illustrated in FIG. 3C is a color-difference format in which both a brightness signal and a color-difference signal are sampled at the same density. That is, in 4:4:4, aspect ratios of pixels of the brightness signal and the color-difference signal are equal to each other.

The monochrome illustrated in FIG. 3D is a color-difference format configured using only a brightness signal without using a color-difference signal.

The brightness signal and the color-difference signal are set to share coding information such as motion compensation with each other and are coded and decoded. However, in 4:4:4, a mechanism for coding and decoding one brightness signal and two color-difference signals as three monochromes independently is also prepared.

In a system of AVC/H.264, a method of executing prediction from a block coded/decoded in a coding/decoding target picture is used. This method is called intra-prediction. In addition, motion compensation to predict a motion from a reference picture using a coded/decoded picture as the reference picture is used. A method of predicting the motion by the motion compensation is called inter-prediction.

First, switching units of an intra-prediction mode by the intra-prediction in intra-coding of the system of AVC/H.264 will be described. FIGS. 4A to 4C are diagrams illustrating the switching units of the intra-prediction mode. In the intra-coding of the system of AVC/H.264, three types of "4×4 intra-prediction", "16×16 intra-prediction", and "8×8 intra-prediction" are prepared as the switching units of the intra-prediction mode.

In the "4×4 intra-prediction", a brightness signal of a macro block (a brightness signal of 16×16 pixel blocks and a color-difference signal of 8×8 pixel blocks) is divided into 16 parts of 4×4 pixel blocks, a mode is selected from nine types of 4×4 intra-prediction modes in 4×4 pixel units divided, and the intra-prediction is sequentially performed (FIG. 4A).

In the "16×16 pixel intra-prediction", a mode is selected from four types of 16×16 intra-prediction modes in 16×16 pixel block units of a brightness signal and the intra-prediction is performed (FIG. 4B).

In the "8×8 pixel intra-prediction", a brightness signal of a macro block is divided into 4 parts of 8×8 pixel blocks, a mode is selected from nine types of 8×8 intra-prediction modes in 8×8 pixel units divided, and the intra-prediction is sequentially performed (FIG. 4C).

In addition, in the intra-prediction of the color-difference signal, when the color-difference format is 4:2:0 or 4:2:2, a mode is selected from four types of intra-prediction modes of the color-difference signal in macro block units and the intra-predictions are performed.

Next, units of the inter-prediction in inter coding of the system of AVC/H.264 will be described. FIGS. 5A to 5H are diagrams illustrating macro block partition and sub-macro block partition. Here, only a pixel block of a brightness signal is illustrated for the simplification of explanation. In MPEG series, a macro block is defined by a square region. Generally, in the MPEG series including the system of AVC/H.264, a block defined by 16×16 pixels (16 pixels in a horizontal direction and 16 pixels in a vertical direction) is called a macro block. In addition, in the system of AVC/H.264, a block defined by 8×8 pixels is called a sub-macro block. The macro block partition means each of small blocks obtained by dividing the macro block for the sake of motion compensation and prediction. The sub-macro block partition means each of small blocks obtained by dividing the sub-macro block for the sake of the motion compensation and prediction.

FIG. 5A is a diagram illustrating the case in which a macro block is configured from one macro block partition configured from a brightness signal of 16×16 pixels and two color-difference signals corresponding to the brightness signal. Here, this configuration is called a macro block type of a 16×16 mode.

FIG. 5B is a diagram illustrating the case in which a macro block is configured from two macro block partitions configured from a brightness signal of 16×8 pixels (16 pixels in a horizontal direction and 8 pixels in a vertical direction) and two color-difference signals corresponding to the brightness signal. The two macro block partitions are arranged vertically. Here, this configuration is called a macro block type of a 16×8 mode.

FIG. 5C is a diagram illustrating the case in which a macro block is configured from two macro block partitions configured from a brightness signal of 8×16 pixels (8 pixels in a horizontal direction and 16 pixels in a vertical direction) and two color-difference signals corresponding to the brightness signal. The two macro block partitions are arranged horizontally. Here, this configuration is called a macro block type of an 8×16 mode.

FIG. 5D is a diagram illustrating the case in which a macro block is configured from four macro block partitions configured from a brightness signal of 8×8 pixels and two color-difference signals corresponding to the brightness signal. The four macro block partitions are arranged two by two vertically and horizontally. Here, this configuration is called a macro block type of an 8×8 mode.

FIG. 5E is a diagram illustrating the case in which a sub-macro block is configured from one sub-macro block partition configured from a brightness signal of 8×8 pixels and two color-difference signals corresponding to the brightness signal. Here, this configuration is called a sub-macro block type of an 8×8 mode.

FIG. 5F is a diagram illustrating the case in which a sub-macro block is configured from two sub-macro block partitions configured from a brightness signal of 8×4 pixels (8 pixels in a horizontal direction and 4 pixels in a vertical direction) and two color-difference signals corresponding to the brightness signal. The two sub-macro block partitions are arranged vertically. This configuration is called a sub-macro block type of an 8×4 mode.

FIG. 5G is a diagram illustrating the case in which a sub-macro block is configured from two macro block partitions configured from a brightness signal of 4×8 pixels (4 pixels in a horizontal direction and 8 pixels in a vertical direction) and two color-difference signals corresponding to the brightness signal. The two macro block partitions are arranged horizontally. Here, this configuration is called a sub-macro block type of a 4×8 mode.

FIG. 5H is a diagram illustrating the case in which a sub-macro block is configured from four sub-macro block partitions configured from a brightness signal of 4×4 pixels and two color-difference signals corresponding to the brightness signal. The four sub-macro block partitions are arranged two by two vertically and horizontally. Here, this configuration is called a sub-macro block type of a 4×4 mode.

In the coding system of AVC/H.264, a mechanism for selectively using the motion compensation block sizes is taken. First, any macro block type can be selected as the motion compensation block size of the macro block unit, from the macro block types of the 16×16, 16×8, 8×16, and 8×8 modes. When the macro block type of the 8×8 mode is selected, any sub-macro block type can be selected as the motion compensation block size of the sub-macro block unit, from the sub-macro block types of the 8×8, 8×4, 4×8, and 4×4 modes.

CITATION LIST

Non-Patent Literature

Non-Patent Literature 1: ISO/IEC14496-10 Information technology—Coding of audio-visual objects—Part 10: Advanced Video Coding When information regarding an intra-prediction mode of a picture signal is coded, information regarding an intra-prediction mode of a brightness signal and information regarding an intra-prediction mode of a color-difference signal are coded and are arranged in a bitstream. However, at this time, if the intra-prediction mode is not coded according to a color-difference format, process efficiency may be degraded.

SUMMARY OF THE INVENTION

The present invention has been made in view of the above circumstances and an object of the present invention is to provide technology for efficiently coding and decoding a picture signal by intra-prediction of a brightness signal and a color-difference signal according to a color-difference format.

In order to solve the above issue, a picture coding device of an aspect of the present invention for coding information regarding an intra-prediction mode in a prediction block unit and coding picture signals including a brightness signal and a color-difference signal in a conversion block unit using intra-prediction, includes: an intra-brightness prediction mode coder (122, 126) that sets a prediction block of the brightness signal, codes a syntax element regarding the intra-prediction mode of the brightness signal, on the basis of the intra-prediction mode of the brightness signal showing an intra-prediction method of the prediction block of the bright signal, and codes information regarding an intra-brightness prediction mode in a bitstream; an intra-color-difference prediction mode coder (123, 126) that sets a prediction block of the color-difference signal, codes a syntax element regarding an intra-color-difference prediction mode of the color-difference signal by referring to the intra-brightness prediction mode, on the basis of the intra-color-difference prediction mode of the color-difference signal showing an intra-prediction method of the prediction block of the color-difference signal, and codes information regarding the intra-color-difference prediction mode in the bitstream; a brightness signal intra-predictor (103) that predicts a brightness signal of a conversion block of the brightness signal from a surrounding brightness signal of the conversion block of the brightness signal, according to the intra-brightness prediction mode; and a color-difference signal intra-predictor (103) that predicts a color-difference signal of a conversion block of the color-difference signal from a surrounding color-difference signal of the conversion block of the color-difference signal, according to the intra-color-difference prediction mode.

According to another aspect of the present invention, there is provided a picture coding method. The picture coding method for coding information regarding an intra-prediction mode in a prediction block unit and coding picture signals including a brightness signal and a color-difference signal in a conversion block unit using intra-prediction, includes: setting a prediction block of the brightness signal, coding a syntax element regarding the intra-prediction mode of the brightness signal, on the basis of the intra-prediction mode of the brightness signal showing an intra-prediction method of the prediction block of the bright signal, and coding information regarding an intra-brightness prediction mode in a bitstream; setting a prediction block of the color-difference signal, coding a syntax element regarding an intra-color-difference prediction mode of the color-difference signal by referring to the intra-brightness prediction mode, on the basis of the intra-color-difference prediction mode of the color-difference signal showing an intra-prediction method of the prediction block of the color-difference signal, and coding information regarding the intra-color-difference prediction mode in the bitstream; predicting a brightness signal of a conversion block of the brightness signal from a surrounding brightness signal of the conversion block of the brightness signal, according to the intra-brightness prediction mode; and predicting a color-difference signal of a conversion block of the color-difference signal from a surrounding color-difference signal of the conversion block of the color-difference signal, according to the intra-color-difference prediction mode.

According to further another aspect of the present invention there is provided a picture decoding device. The picture decoding device for decoding information regarding an intra-prediction mode in a prediction block unit and decoding picture signals including a brightness signal and a color-difference signal in a conversion block unit using intra-prediction, includes: an intra-brightness prediction mode decoder (222, 224) that decodes a syntax element regarding an intra-prediction mode of the brightness signal from a bitstream in which information regarding an intra-brightness prediction mode showing an intra-prediction method of a prediction block of the bright signal is coded and derives the intra-prediction mode of the brightness signal; an intra-color-difference prediction mode decoder (222, 225) that decodes a syntax element regarding an intra-color-difference prediction mode of the color difference signal from the bitstream in which information regarding an intra-color-difference prediction mode showing an intra-prediction method of a prediction block of the color-difference signal is coded and derives the intra-color-difference prediction mode by referring to the intra-brightness prediction mode; a brightness signal intra-predictor (206) that predicts a brightness signal of a conversion block of the brightness signal from a surrounding brightness signal of the conversion block of the brightness signal, according to the intra-brightness prediction mode specified for each prediction block of the brightness signal; and a color-difference signal intra-predictor (206) that predicts a color-difference signal of a conversion block of the color-difference signal from a surrounding color-difference signal of the conversion block of the color-difference signal, according to the intra-color-difference prediction mode specified for each prediction block of the color-difference signal.

According to further another aspect of the present invention there is provided a picture decoding method. The picture decoding method for decoding information regarding an intra-prediction mode in a prediction block unit and decoding picture signals including a brightness signal and a color-difference signal in a conversion block unit using intra-prediction, includes: decoding a syntax element regarding an intra-prediction mode of the brightness signal from a bitstream in which information regarding an intra-brightness prediction mode showing an intra-prediction method of a prediction block of the bright signal is coded and deriving the intra-prediction mode of the brightness signal; decoding a syntax element regarding an intra-color-difference prediction mode of the color-difference signal from the bitstream in which information regarding an intra-color-difference prediction mode showing an intra-prediction method of a prediction block of the color-difference signal is coded and deriving the intra-color-difference prediction mode by referring to the intra-brightness prediction mode; predicting a brightness signal of a conversion block of the brightness signal from a surrounding brightness signal of the conversion block of the brightness signal, according to the intra-brightness prediction mode specified for each prediction block of the brightness signal; and predicting a color-difference signal of a conversion block of the color-difference signal from a surrounding color-difference signal of the conversion block of the color-difference signal, according to the intra-color-difference prediction mode specified for each prediction block of the color-difference signal.

In addition, any combinations of the above components and conversion expressions of the present invention among a method, a device, a system, a recording medium, and a computer program are effective as aspects of the present invention.

BRIEF DESCRIPTION OF THE DRAWINGS

FIGS. 3A to 3E are a diagram illustrating a color-difference format of a picture;

FIGS. 5A to 5H are a diagram illustrating units of inter-prediction of the system of AVC/H.264;

FIG. 10 is a diagram illustrating an example of a definition of a syntax when color-difference format information is coded by a sequence parameter set becoming a header to code information regarding coding of an entire sequence defined in this embodiment;

FIG. 14 is a table to derive a value of an intra-color-difference prediction mode from a value of a syntax element used at a decoding side defined in this embodiment and a value of an intra-brightness prediction mode of a prediction block of a brightness signal of the same position as a prediction block of a color-difference signal;

FIG. 15 is a diagram illustrating an example of a conversion table to convert an intra-brightness prediction mode or a first intra-color-difference prediction mode into a second intra-color-difference prediction mode at a color-difference format 4:2:2 defined in this embodiment;

FIG. 16 is a diagram illustrating a conversion table to convert an intra-brightness prediction mode or a first intra-color-difference prediction mode into a second intra-color-difference prediction mode at a color-difference format 4:2:2 defined in this embodiment;

FIG. 17 is a diagram illustrating another example of a conversion table to convert an intra-brightness prediction mode or a first intra-color-difference prediction mode into a second intra-color-difference prediction mode at a color-difference format 4:2:2 defined in this embodiment;

FIGS. 22A and 22B are a diagram illustrating a correspondence relation of prediction directions of intra-predictions of a brightness signal and a color-difference signal when a color-difference format is 4:2:0;

FIG. 25 is a table to derive a value of a syntax element regarding an intra-color-difference prediction mode from a value of an intra-color-difference prediction mode used at a coding side defined in this embodiment and a value of an intra-brightness prediction mode of a prediction block of a brightness signal of the same position as a prediction block of a color-difference signal;

FIG. 27 is a diagram illustrating an example of a table to derive an angle of intra-prediction for a color-difference format 4:2:2 from a first intra-color-difference prediction mode;

FIG. 28 is a diagram illustrating another example of a table to derive an angle of intra-prediction for a color-difference format 4:2:2 from a first intra-color-difference prediction mode;

FIG. 30 is a diagram illustrating a conversion table to convert an intra-brightness prediction mode or a first intra-color-difference prediction mode into a second intra-color-difference prediction mode at a color-difference format 4:2:2 defined in this embodiment;

FIG. 33 is a diagram illustrating a conversion table to convert an intra-brightness prediction mode or a first intra-color-difference prediction mode into a second intra-color-difference prediction mode at a color-difference format 4:2:2 defined in this embodiment;

DETAILED DESCRIPTION

The invention will now be described by reference to the preferred embodiments. This does not intend to limit the scope of the present invention, but to exemplify the invention.

This embodiment relates to coding and decoding of moving pictures. Particularly, in this embodiment, a code amount is reduced using intra-prediction to perform prediction from pixel values of surrounding coded and decoded blocks in coding and pixel values of neighboring decoded blocks in decoding and inter-prediction by motion compensation from a decoded picture, in units of blocks obtained by dividing a picture into rectangles having any size and shape.

First, technologies and technical terms used in this embodiment are defined.

(Color-Difference Format)

In description of an embodiment, it is assumed that color-difference formats of a picture to be coded and decoded are set to a monochrome, 4:2:0, 4:2:2, and 4:4:4 and a brightness signal and a color-difference signal are set and are coded and decoded. However, in description of the color-difference signal, description of the case of the monochrome is omitted. When the color-difference format is 4:4:4, RGB signals can be coded and decoded. In this case, a G (green) signal is regarded as a brightness signal, a B (blue) signal and an R (red) signal are regarded as color-difference signals, and the signals are coded and decoded. A method of coding and decoding the brightness signal and the color-difference signals independently at 4:4:4 is regarded as the monochrome in this embodiment.

(With Respect to Tree Block and Coding Block)

Figure 6:
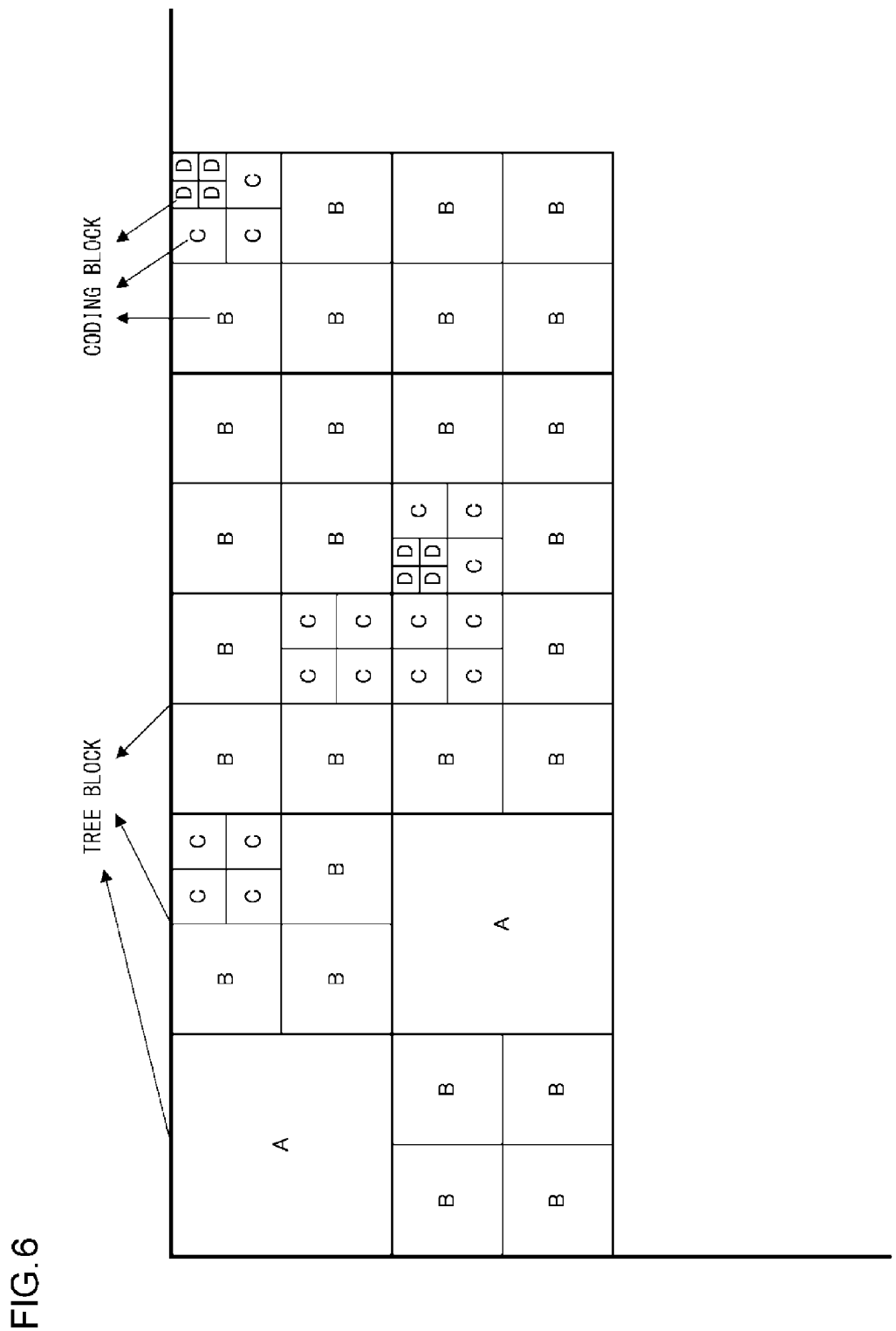
FIG. 6 is a diagram illustrating a tree block and a coding block defined in this embodiment.
Figure 7D:
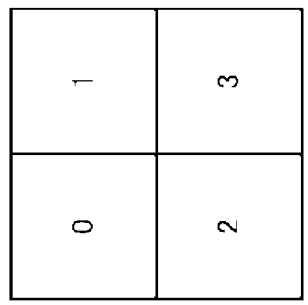
FIGS. 7A to 7D are a diagram illustrating a division mode defined in this embodiment.
Figure 7C:
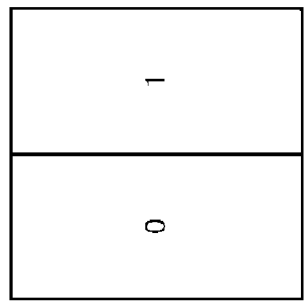
Figure 7B:
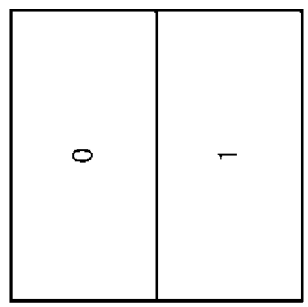
Figure 7A:
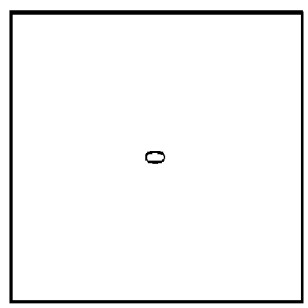

In the embodiment, as illustrated in FIG. 6, a screen is equally divided in units of squares having any same size. This unit is defined as a tree block and is used as a basic unit of address management to specify a coding/decoding target block (a coding target block in coding and a decoding target block in decoding) in a picture. The tree block other than the monochrome is configured from one brightness signal and two color-difference signals. A size of the tree block can be freely set in sizes of a power of 2, according to a picture size or a texture in the screen. To optimize a coding process according to the texture in the screen, the tree block can be changed to blocks having a small block size, by dividing brightness signals and color-difference signals in the tree block by 4 (two division in each of a horizontal direction and a vertical direction) hierarchically, according to necessity. Each of these blocks is defined as a coding block and is used as a basic unit of a process when coding and decoding are performed. The coding block other than the monochrome is also configured from one brightness signal and two color-difference signals. A maximum size of the coding block is equal to the size of the tree block. A coding block having a minimum size of the coding blocks is called a minimum coding block and the size thereof can be freely set in sizes of a power of 2.

In FIG. 6, a coding block A is a block of the case in which the tree block is not divided and is used as one coding block. Coding blocks B are coding blocks obtained by dividing the tree block into four blocks. Coding blocks C are coding blocks obtained by dividing each of blocks obtained by dividing the tree block into four blocks into four blocks. Coding blocks D are coding blocks obtained by dividing each of blocks obtained by dividing the tree block into four blocks into four blocks two times hierarchically and are coding blocks having a minimum size.

In description of the embodiment, when the color-difference format is 4:2:0, the size of the tree block is set to 64×64 pixels in the brightness signal and 32×32 pixels in the color-difference signal and the size of the minimum coding block is set to 8×8 pixels in the brightness signal and 4×4 pixels in the color-difference signal. In FIG. 6, the size of the coding block A is 64×64 pixels in the brightness signal and 32×32 pixels in the color-difference signal, the size of the coding block B is 32×32 pixels in the brightness signal and 16×16 pixels in the color-difference signal, the size of the coding block C is 16×16 pixels in the brightness signal and 8×8 pixels in the color-difference signal, and the size of the coding block D is 8×8 pixels in the brightness signal and 4×4 pixels in the color-difference signal. When the color-difference format is 4:4:4, the sizes of the brightness signal and the color-difference signal of each coding block are equal to each other. When the color-difference format is 4:2:2, the size of the coding block A is 32×64 pixels in the color-difference signal, the size of the coding block B is 16×32 pixels in the color-difference signal, the size of the coding block C is 8×16 pixels in the color-difference signal, and the size of the coding block D to be the minimum coding block is 4×8 pixels in the color-difference signal.

(With Respect to Prediction Mode)

The intra-prediction to perform prediction from surrounding coded/decoded picture signals and the inter-prediction to perform prediction from picture signals of coded/decoded pictures are switched in a coding block unit. A mode to identify the intra-prediction and the inter-prediction is defined as a prediction mode (PredMode). The prediction mode (PredMode) has a value of intra-prediction (MODE_INTRA) or inter-prediction (MODE_INTER) and can be selected and coded.

(With Respect to Division Mode and Prediction Block)

When the screen is divided into blocks and the intra-prediction and the inter-prediction are performed, a coding block is divided according to necessity to cause switching units of methods of the intra-prediction and the inter-prediction to be smaller and the prediction is performed. A mode to identify a division method of the brightness signal and the color-difference signal of the coding block is defined as a division mode (PartMode). The divided block is defined as a prediction block. As illustrated in FIGS. 7A to 7D, four types of division modes (PartMode) are defined according to the division method of the brightness signal of the coding block. A division mode (PartMode) of the case (FIG. 7A) in which the brightness signal of the coding block is not divided and the coding block is regarded as one prediction block is defined as 2N×2N division (PART_2N×2N), a division mode (PartMode) of the case (FIG. 7B) in which the brightness signal of the coding block is divided into two blocks in a horizontal direction and the coding block is used as two prediction blocks is defined as 2N×N division (PART_2N×N), a division mode (PartMode) of the case (FIG. 7C) in which the brightness signal of the coding block is divided in a vertical direction and the coding block is used as two prediction blocks is defined as N×2N division (PART_N×2N), and a division mode (PartMode) of the case (FIG. 7D) in which the brightness signal of the coding block is divided equally in a horizontal direction and a vertical direction and the coding block is used as four prediction blocks is defined as N×N division (PART_N×N). The color-difference signal is also divided at the same division ratio as the division ratio of the vertical and horizontal directions of the brightness signal, for each division mode (PartMode) other than the N×N division (PART_N×N) of the intra-prediction (MODE_INTRA). The division ratio of the vertical and horizontal directions of the color-difference signal of the coding block of the N×N division (PART_N×N) of the intra-prediction (MODE_INTRA) is different according to the type of the color-difference format, which will be described below.

A number starting from 0 is allocated to each of the prediction blocks existing in the coding block in coding order to specify each prediction block in the coding block. The number is defined as a division index PartIdx. A numeral described in each prediction block of the coding block of FIGS. 7A to 7D shows a division index PartIdx of each prediction block. In the 2N×N division (PART_2N×N) illustrated in FIG. 7B, a division index PartIdx of an upper prediction block is defined as 0 and a division index PartIdx of a lower prediction block is defined as 1. In the N×2N division (PART_N×2N) illustrated in FIG. 7C, a division index PartIdx of a left prediction block is defined as 0 and a division index PartIdx of a right prediction block is defined as 1. In the N×N division (PART_N×N) illustrated in FIG. 7D, a division index PartIdx of an upper left prediction block is defined as 0, a division index PartIdx of an upper right prediction block is defined as 1, a division index PartIdx of a lower left prediction block is defined as 2, and a division index PartIdx of a lower right prediction block is defined as 3.

When the prediction mode (PredMode) is the intra-prediction (MODE_INTRA), the division mode (PartMode) is defined as the 2N×2N division (PART_2N×2N) in the coding blocks other than the coding block D (in this embodiment, 8×8 pixels in the brightness signal) to be the minimum coding block and the division mode (PartMode) is defined as the 2N×2N division (PART_2N×2N) and the N×N division (PART_N×N) in only the coding block D to be the minimum coding block.

When the prediction mode (PredMode) is the inter-prediction (MODE_INTER), the division mode (PartMode) is defined as the 2N×2N division (PART_2N×2N), the 2N×N division (PART_2N×N), and the N×2N division (PART_N×

2N) in the coding blocks other than the coding block D to be the minimum coding block and the division mode (Part-Mode) is defined as the 2N×2N division (PART_2N×2N), the 2N×N division (PART_2N×N), the N×2N division (PART_N×2N), and the N×N division (PART_N×N) in only the coding block D to be the minimum coding block. The reason why the N×N division (PART_N×N) is not defined in the coding blocks other than the minimum coding block is that the coding block can be divided into four blocks and the small coding block can be represented, in the coding blocks other than the minimum coding block.

(With Respect to Intra-Prediction and Intra-Prediction Mode)

Figure 8:
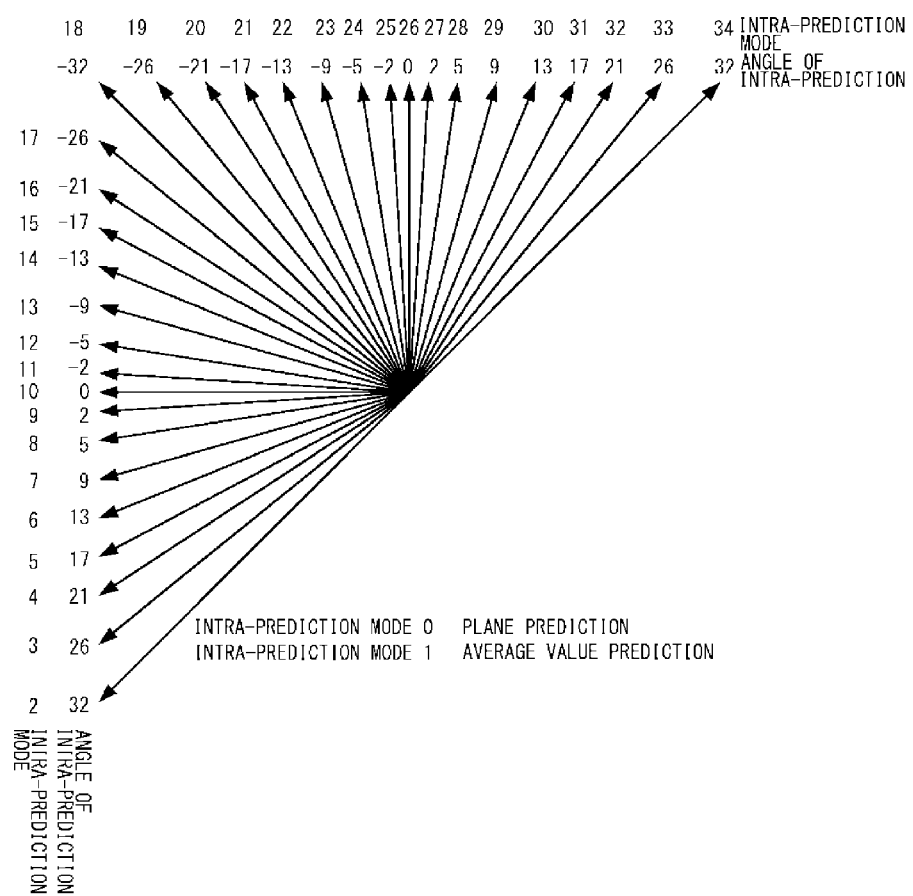
FIG. 8 is a diagram illustrating a value and a prediction direction of an intra-prediction mode defined in this embodiment.

In the intra-prediction, values of pixels of a process target conversion block are predicted from values of pixels of a surrounding decoded conversion block to be described below in the same screen. In a coding device and a decoding device according to this embodiment, an intra-prediction mode is selected from 35 intra-prediction modes for each prediction block and intra-prediction is performed for each conversion block. Sizes of the prediction block and the conversion block may be different from each other. However, when the intra-prediction of the conversion block is performed, an intra-prediction mode of a prediction block including the conversion block is used. FIG. 8 is a diagram illustrating a value and a prediction direction of an intra-prediction mode defined in this embodiment. The value of the intra-prediction mode is defined by mode numbers from 0 to 34. The intra-prediction mode (intraPredMode) defines plane prediction (intra-prediction mode intraPredMode=0) in which prediction is performed by interpolating a pixel value from a surrounding decoded block, average value prediction (intra-prediction mode intraPredMode=1) in which prediction is performed by deriving an average value from a surrounding decoded block, and 33 angle predictions (intra-prediction mode intraPredMode=2 . . . 34) in which prediction is performed from a surrounding decoded block at various angles.

(Conversion Block)

Similarly to the conventional technology, in this embodiment, a code amount is reduced using orthogonal transform to convert a discrete signal into a frequency domain, such as discrete cosine transform (DCT) and discrete sine transform (DST), and inverse transform thereof. Conversion or inverse conversion is performed in units of conversion blocks obtained by dividing a coding block into four parts hierarchically. In the embodiment, four conversion sizes of 32×32 pixels, 16×16 pixels, 8×8 pixels, and 4×4 pixels are defined and 32×32 conversion, 16×16 conversion, 8×8 conversion, 4×4 conversion, and inverse conversion thereof are performed.

(Positions of Tree Block, Coding Block, Prediction Block, and Conversion Block)

Figure 9:
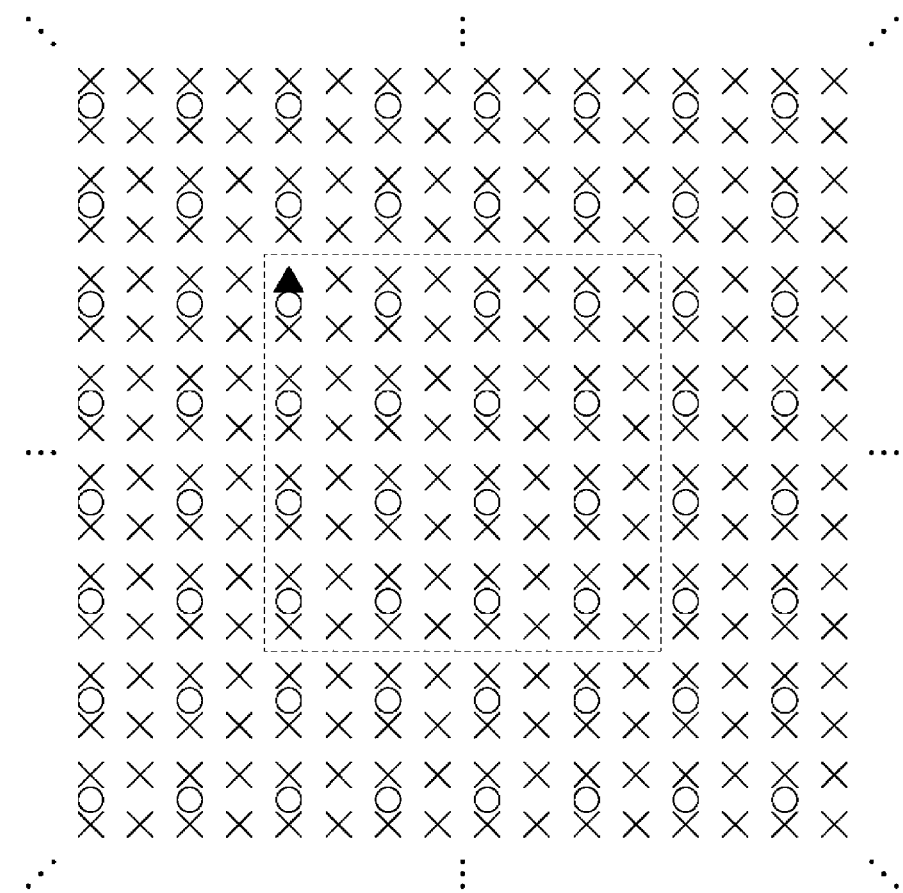
FIG. 9 is an exemplary diagram illustrating a position of a block defined in this embodiment.

For a position of each of the blocks including the tree block, the coding block, the prediction block, and the conversion block described in this embodiment, a position of a pixel of a top-left brightness signal included in a region of each block is represented by the two-dimensional coordinates of (x, y), using a position of a pixel of a top-left brightness signal in a screen of brightness signals as an original point (0, 0). In directions of coordinate axes, a rightward direction in a horizontal direction and a downward direction in a vertical direction are positive directions and a unit is a unit of one pixel of a brightness signal. In addition to the case of the color-difference format 4:4:4 in which picture sizes (pixel numbers) are equal in a brightness signal and a color-difference signal, in the cases of the color-difference formats 4:2:0 and 4:2:2 in which picture sizes (pixel numbers) are different in a brightness signal and a color-difference signal, a position of each block of the color-difference signal is represented by the coordinates of a position of a pixel of a brightness signal included in a region of each block and a unit is one pixel of the brightness signal. In this way, the position of each block of the color-difference signal can be specified and a position relation of a block of the brightness signal and a block of the color-difference signal becomes clear by comparing values of the coordinates. FIG. 9 is an exemplary diagram illustrating a position of a block defined in this embodiment, when the color-difference format is 4:2:0. In FIG. 9, x shows a position of a pixel of a brightness signal of a picture on a screen plane and ○ shows a position of a pixel of a color-difference signal. In FIG. 9, a rectangle shown by a dotted line is a block E of brightness signals of 8×8 pixels and is a block F of color-difference signals of 4×4 pixels. ▲ is a position of a pixel of a top-left brightness signal of the block E of the brightness signals of the 8×8 pixels shown by the dotted line. Therefore, ▲ becomes a position of the block E of the brightness signals of the 8×8 pixels shown by the dotted line and the coordinates of the brightness signal of the pixel shown by ▲ become the coordinates of the block E of the brightness signals of the 8×8 pixels shown by the dotted line. Likewise, ▲ is a position of a pixel of a top-left brightness signal included in a region of the block F of the color-difference signals of the 4×4 pixels shown by the dotted line. Therefore, ▲ becomes a position of the block F of the color difference signals of the 4×4 pixels shown by the dotted line and the coordinates of the brightness signal of the pixel shown by A become the coordinates of the block F of the color difference signals of the 4×4 pixels shown by the dotted line. In the embodiment, only when values of x components and y components of the defined coordinates of the block of the brightness signal and the defined coordinates of the block of the color-difference signal are equal to each other, regardless of the type of the color difference format or the shape and the size of the block, these blocks are defined as blocks at the same position.

Figure 1:
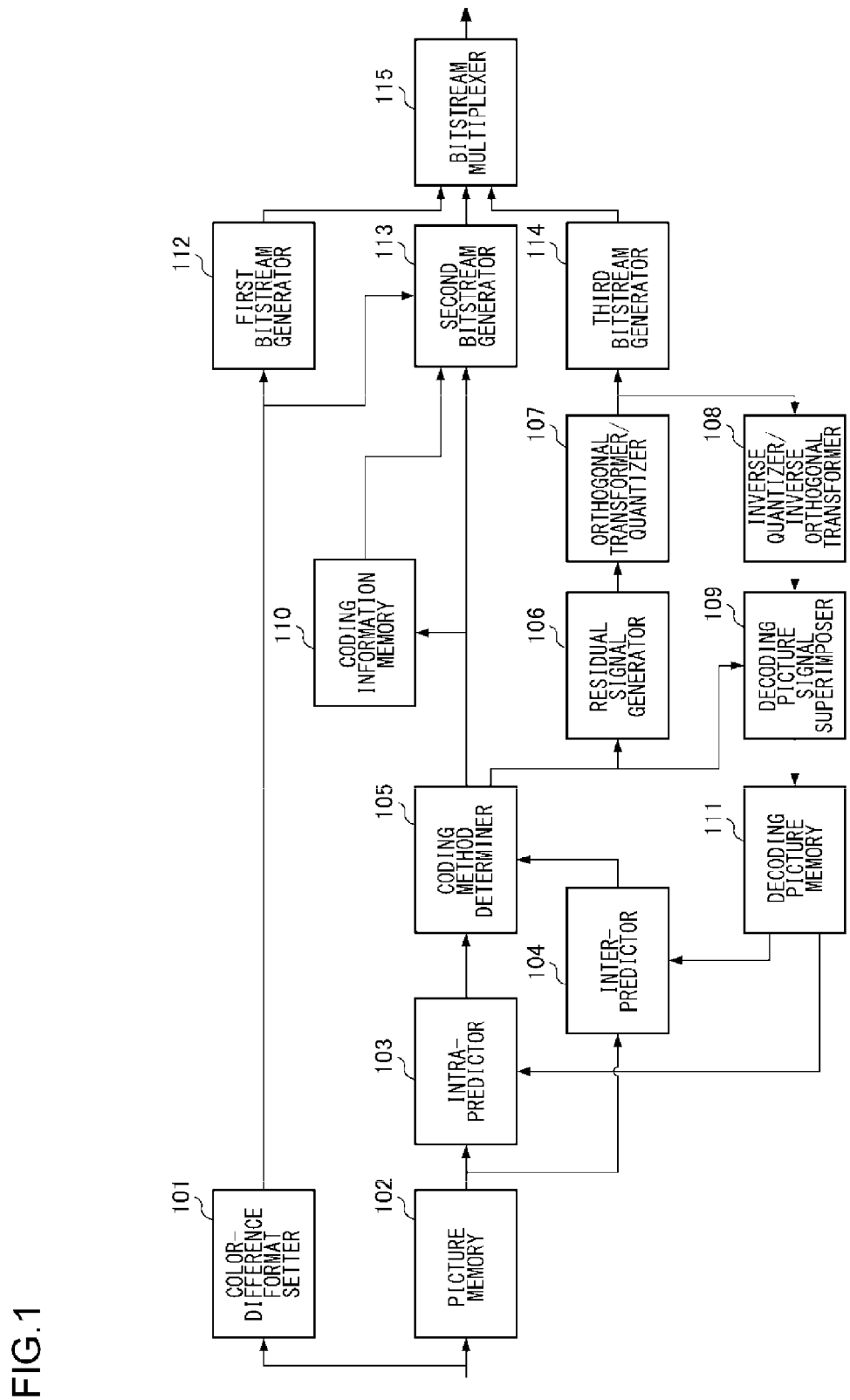
FIG. 1 is a block diagram illustrating a configuration of a picture coding device according to an embodiment.

FIG. 1 is a block diagram illustrating a configuration of a picture coding device according to the embodiment. The picture coding device according to the embodiment includes a color-difference format setter 101, a picture memory 102, an intra-predictor 103, an inter-predictor 104, a coding method determiner 105, a residual signal generator 106, an orthogonal transformer/quantizer 107, an inverse quantizer/inverse orthogonal transformer 108, a decoding picture signal superimposer 109, a decoding picture memory 111, a first bitstream generator 112, a second bitstream generator 113, a third bitstream generator 114, and a bitstream multiplexer 115.

In the color-difference format setter 101, a color-difference format of a picture signal of a coding target is set. The color-difference format may be determined from a coding picture signal supplied to the color-difference format setter 101 and the color-difference format may be set or the color-difference format may be set from the outside. Information of a color-difference format set to 4:2:0, 4:2:2, or 4:4:4 in only a brightness signal is supplied to the first bitstream generator 112 and the second bitstream generator 113 and a coding process is executed on the basis of the color-difference format. Although not illustrated in the drawings, in the picture memory 102, the intra-predictor 103, the inter-predictor 104, the coding method determiner 105, the residual signal generator 106, the orthogonal transformer/quantizer 107, the inverse quantizer/inverse orthogonal transformer 108, the decoding picture signal superimposer 109, and the third bitstream generator 114 of FIG. 1, the coding process is executed on the basis of the set color-difference format and in a coding information memory 110 and the decoding picture memory 111, a management is made on the basis of the set color-difference format.

In the picture memory 102, picture signals of coding targets supplied in order of time are temporarily stored. The picture signals of the coding targets stored in the picture memory 102 are arranged in order of coding, are divided in each coding block unit by a plurality of combinations according to setting, are divided in each prediction block unit, and are supplied to the intra-predictor 103 and the inter-predictor 104.

The intra-predictor 103 sets a plurality of intra-brightness prediction modes and a plurality of intra-color-difference prediction modes for each of a brightness signal and a color-difference signal of a prediction block of a coding target from a decoded picture signal stored in the decoding picture memory 111, in a prediction block unit according to each division mode (PartMode) in a plurality of coding block units, performs each intra-prediction according to an intra-brightness prediction mode and an intra-color-difference prediction mode for each conversion block, and obtains an intra-prediction signal. The intra-color-difference prediction mode can select a value predicted from the intra-brightness prediction mode or select any one of 0 (plane prediction), 1 (average value prediction), 10 (horizontal prediction), 26 (vertical prediction), and 34 (oblique prediction) to be representative intra-prediction modes for each prediction block. However, in this embodiment, when the intra-prediction in which the color-difference format is 4:2:2 is performed, a second intra-color-difference prediction mode to be described below is used. The intra-prediction and the intra-prediction mode of the color-difference signal will be described in detail below.

An intra-prediction signal of a prediction block unit is subtracted from a signal of a coding target supplied in the prediction block unit for each pixel and a prediction residual signal is obtained. An evaluation value to evaluate a code amount and a distortion amount is derived using the prediction residual signal, an optimal mode is selected from the plurality of intra-brightness prediction modes and the plurality of intra-color-difference prediction modes in the prediction block unit, from the viewpoint of the code amount and the distortion amount, and intra-prediction information, an intra-prediction signal, and an evaluation value of the intra-prediction corresponding to the selected intra-prediction mode are supplied as candidates of the intra-prediction of the prediction block to the coding method determiner 105.

The inter-predictor 104 performs each inter-prediction according to a plurality of inter-prediction modes (L0 prediction, L1 prediction, and both predictions) and a reference picture from the decoded picture signals stored in the decoding picture memory 111, in a unit according to each division mode (PartMode) in the plurality of coding block units, that is, a prediction block unit, and obtains an inter-prediction signal. At this time, a motion vector search is performed and the inter-prediction is performed according to a searched motion vector. In the case of both predictions, two inter-prediction signals are averaged or are weighted and added for each pixel and the inter-prediction of both predictions is performed. An inter-prediction signal of a prediction block unit is subtracted from a signal of a coding target supplied in the prediction block unit for each pixel and a prediction residual signal is obtained. An evaluation value to evaluate a code amount and a distortion amount is derived using the prediction residual signal, an optimal mode is selected from the plurality of inter-prediction modes in the prediction block unit, from the viewpoint of the code amount and the distortion amount, and inter-prediction information, an inter-prediction signal, and the evaluation value of the inter-prediction corresponding to the selected inter-prediction mode are supplied as candidates of the inter-prediction of the prediction block to the coding method determiner 105.

The coding method determiner 105 determines a coding block division method, a prediction mode (PredMode), and a division mode (PartMode) optimally, on the basis of the intra-prediction evaluation value and the inter-prediction evaluation value respectively corresponding to the intra-prediction information and the inter-prediction information selected for each prediction block in the plurality of coding block units, supplies coding information including the intra-prediction information or the inter-prediction information according to the determination to the second bitstream generator 113, stores the coding information in the coding information memory 110, and supplies a prediction signal of the intra-prediction or the inter-prediction according to the determination to the residual signal generator 106 and the decoding picture signal superimposer 109.

The residual signal generator 106 subtracts the prediction signal of the intra-prediction or the inter-prediction from a picture signal to be coded for each pixel, generates a residual signal, and supplies the residual signal to the orthogonal transformer/quantizer 107.

The orthogonal transformer/quantizer 107 performs orthogonal transform and quantization to convert a signal into a frequency domain, such as the DCT or the DST, for the supplied residual signal, according to a quantization parameter, generates an orthogonally transformed/quantized residual signal, and supplies the orthogonally transformed/quantized residual signal to the third bitstream generator 114 and the inverse quantizer/inverse orthogonal transformer 108.

The first bitstream generator 112 derives a value of a syntax element regarding coding information of sequence, picture, and slice units, according to a semantics rule defining a meaning of the syntax element and a derivation method, performs entropy coding using variable length coding and arithmetic coding for the derived value of each syntax element, according to a syntax rule, generates a first bitstream, and supplies the coded first bitstream to the bitstream multiplexer 115. A value of a syntax element regarding the color-difference format is also derived by the first bitstream generator 112. The syntax element regarding the color-difference format is derived from the color-difference formation information supplied from the color-difference format setter 101. FIG. 10 illustrates an example of a definition of a syntax when color-difference format information is coded by a sequence parameter set becoming a header to code information regarding coding of an entire sequence defined in this embodiment. A syntax element chroma_format_idc shows a type of the color-difference format. The syntax element chroma_format_idc shows a monochrome when a value is 0, 4:2:0 when the value is 1, 4:2:2 when the value is 2, and 4:4:4 when the value is 3. In addition, a syntax element separate_colour_plane_flag shows whether a brightness signal and a color-difference signal are coded separately and when a value of separate_colour_plane_flag is 0, this shows that the two color-difference signals are associated with the brightness signal and the signals are coded. When the value of the syntax element chroma_format_idc is 1, this shows that the brightness signal and the two color-difference signals are coded separately. Only when the value of the syntax element chroma_format_idc is 3, that is, the color-difference format is 4:4:4, the value of chroma_format_idc can be set to 0 or 1. In the other color-difference formats, the value of the syntax element separate_colour_plane_flag is set to 0 at all times and the signals are coded.

The second bitstream generator 113 derives a value of a syntax element regarding the coding information determined by the coding method determiner 105 for each prediction block, in addition to coding information of a coding block unit, according to the semantics rule defining the meaning of the syntax element and the derivation method. Specifically, the second bitstream generator 113 derives a value of a syntax element regarding coding information of a prediction block unit, in addition to the coding information of the coding block unit such as the coding block division method, the prediction mode (PredMode), and the division mode (PartMode). When the prediction mode (PredMode) is the intra-prediction, the second bitstream generator 113 derives a value of a syntax element regarding an intra-prediction mode including an intra-brightness prediction mode and an intra-color-difference prediction mode and when the prediction mode (PredMode) is the inter-prediction, the second bitstream generator 113 derives a value of a syntax element regarding the inter-prediction mode, information specifying a reference picture, and inter-prediction information such as a motion vector. The second bitstream generator 113 performs the entropy coding using the variable length coding and the arithmetic coding for the derived value of each syntax element, according to the syntax rule, generates a second bitstream, and supplies the coded second bitstream to the bitstream multiplexer 115. The detailed process content for the derivation of the syntax element regarding the intra-brightness prediction mode and the intra-color-difference prediction mode performed by the second bitstream generator 113 will be described below.

The third bitstream generator 114 performs the entropy coding using the variable length coding and the arithmetic coding for the orthogonally transformed and quantized residual signal, according to the prescribed syntax rule, generates a third bitstream, and supplies the third bitstream to the bitstream multiplexer 115.

The first bitstream, the second bitstream, and the third bitstream are multiplexed by the bitstream multiplexer 115 according to the prescribed syntax rule, a bit stream is generated, and the multiplexed bit stream is output.

The inverse quantizer/inverse orthogonal transformer 108 performs inverse quantization and inverse orthogonal transform for the orthogonally transformed and quantized residual signal supplied from the orthogonal transformer/quantizer 107, derives a residual signal, and supplies the residual signal to the decoding picture signal superimposer 109. The decoding picture signal superimposer 109 superimposes the prediction signal of the intra-prediction or the inter-prediction according to the determination by the coding method determiner 105 and the residual signal inversely quantized and inversely orthogonally transformed by the inverse quantizer/inverse orthogonal transformer 108, generates a decoding picture, and stores the decoding picture in the decoding picture memory 111. A filtering process to decrease block distortion by coding may be executed on the decoding picture and the decoding picture may be stored in the decoding picture memory 111.

Figure 2:
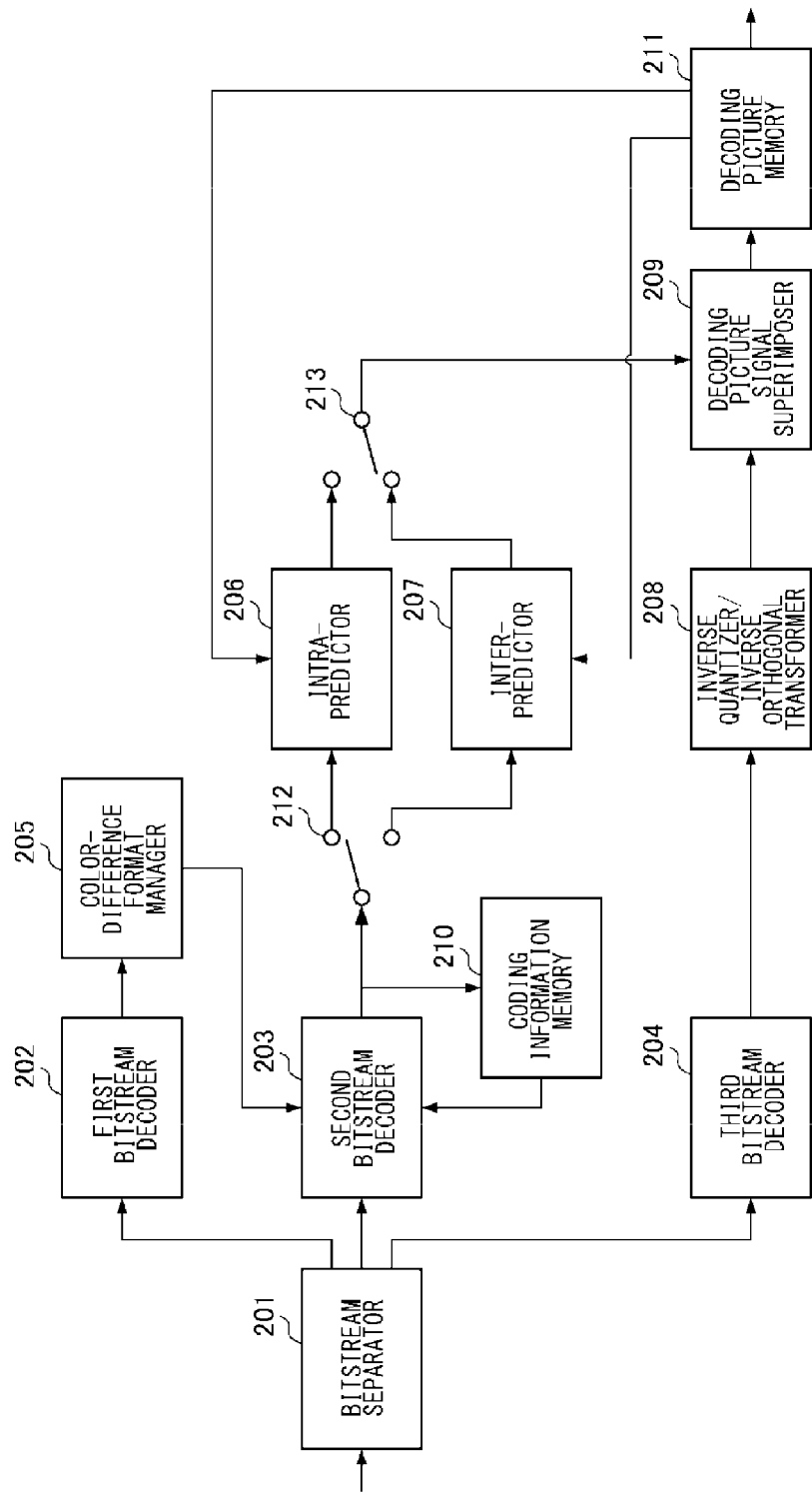
FIG. 2 is a block diagram illustrating a configuration of a picture decoding device according to an embodiment.
Figures 4A, 4B, 4C:
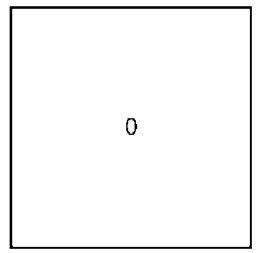
FIGS. 4A to 4C are a diagram illustrating switching units of an intra-prediction mode of a system of AVC/H.264.

FIG. 2 is a block diagram illustrating a configuration of a picture decoding device according to the embodiment corresponding to the picture coding device of FIG. 1. The picture decoding device according to the embodiment includes a bitstream separator 201, a first bitstream decoder 202, a second bitstream decoder 203, a third bitstream decoder 204, a color-difference format manager 205, an intra-predictor 206, an inter-predictor 207, an inverse quantizer/inverse orthogonal transformer 208, a decoding picture signal superimposer 209, a coding information memory 210, a decoding picture memory 211, and switches 212 and 213.

A bit stream supplied to the bitstream separator 201 is separated according to the prescribed syntax rule, a first bitstream showing coding information of sequence, picture, and slice units is supplied to the first bitstream decoder 202, a second bitstream including coding information of a coding block unit is supplied to the second bitstream decoder 203, and a third bitstream including the orthogonally transformed and quantized residual signal is supplied to the third bitstream decoder 204.

The first bitstream decoder 202 performs entropy decoding on the supplied first bitstream according to the syntax rule and obtains each value of syntax elements regarding coding information of sequence, picture, and slice units. The first bitstream decoder 202 derives the coding information of the sequence, picture, and slice units from the decoded value of the syntax element regarding the coding information of the sequence, picture, and slice units, according to a semantics rule defining a meaning of the syntax element and a derivation method. The first bitstream decoder 202 is a bitstream decoder corresponding to the first bitstream generator 112 of the coding side and has a function of returning the first bitstream including the coding information of the sequence, picture, and slice units coded by the first bitstream generator 112 to each coding information. The color-difference format information coded by the first bitstream generator 112 is derived from the value of the syntax element regarding the color-difference format information obtained by performing the entropy decoding on the second bitstream by the first bitstream decoder 202. The type of the color-difference format is specified from the value of the syntax element chroma_format_idc according to the syntax rule and the semantics rule illustrated in FIG. 10 and the syntax element chroma_format_idc shows a monochrome when a value is 0, 4:2:0 when the value is 1, 4:2:2 when the value is 2, and 4:4:4 when the value is 3. In addition, when the value of the syntax element chroma_format_idc is 3, that is, the color-difference format is 4:4:4, the syntax element separate_colour_plane_flag is decoded and it is determined whether the brightness signal and the color-difference signal are coded separately. The derived color-difference format information is supplied to the color-difference format manager 205.

The color-difference format manager 205 manages the supplied color-difference format information. The supplied color-difference format information is supplied to the second bitstream decoder 203 and a derivation process of the coding information of the coding block and the prediction block based on the color-difference format information is executed. Although not illustrated clearly in the drawings, the decoding process based on the color-difference format information is executed in the third bitstream decoder 204 and the intra-predictor 206, the inter-predictor 207, the inverse quantizer/inverse orthogonal transformer 208, and the decoding picture signal superimposer 209 of FIG. 2 and management based on the color-difference format information is performed in the coding information memory 210 and the decoding picture memory 211.

The second bitstream decoder 203 performs the entropy decoding on the supplied first bitstream according to the syntax rule and obtains each value of syntax elements regarding coding information of coding block and prediction block units. The second bitstream decoder 203 derives the coding information of the coding block unit and the prediction block unit from the supplied value of the syntax element regarding the coding information of the coding block unit and the prediction block unit, according to the semantics rule defining the meaning of the syntax element and the derivation method. The second bitstream decoder 203 is a bitstream decoder corresponding to the second bitstream generator 113 of the coding side and has a function of returning the second bitstream including the coding information of the coding block unit and the prediction block unit coded by the second bitstream generator 113 to each coding information. Specifically, in addition to the division method of the coding block, the prediction mode (PredMode), and the division mode (PartMode), an intra-prediction mode including an intra-brightness prediction mode and an intra-color-difference prediction mode is obtained from each syntax element obtained by decoding the second bitstream according to the prescribed syntax rule, when the prediction mode (PredMode) is the intra-prediction. Meanwhile, when the prediction mode (PredMode) is the inter-prediction, an inter-prediction mode, information specifying a reference picture, and inter-prediction information such as a motion vector are obtained. When the prediction mode (PredMode) is the intra-prediction, the intra-prediction mode including the intra-brightness prediction mode and the intra-color-difference prediction mode is supplied to the intra-predictor 206 through the switch 212 and when the prediction mode (PredMode) is the inter-prediction, the inter-prediction mode, the information specifying the reference picture, and the inter-prediction information such as the motion vector are supplied to the inter-predictor 207 through the switch 212. The detailed process for the entropy decoding process and the derivation process of the intra-brightness prediction mode and the intra-color-difference prediction mode from the syntax element regarding the intra-brightness prediction mode and the intra-color-difference prediction mode, executed by the second bitstream decoder 203, will be described below.

The third bitstream decoder 204 decodes the supplied third bitstream, derives an orthogonally transformed/quantized residual signal, and supplies the orthogonally transformed/quantized residual signal to the inverse quantizer/inverse orthogonal transformer 208.

The intra-predictor 206 generates a prediction picture signal by the intra-prediction from the surrounding decoded block stored in the decoding picture memory 211, according to the supplied intra-brightness prediction mode and intra-color-difference prediction mode, and supplies the prediction picture signal to the decoding picture signal superimposer 209 through the switch 213. However, in this embodiment, when the intra-prediction in which the color-difference format is 4:2:2 is performed, a second intra-color-difference prediction mode to be described below is used. The intra-prediction and the intra-prediction mode of the color-difference signal will be described in detail below.

The inter-predictor 207 generates a prediction picture signal by the inter-prediction using the motion compensation, from the decoded reference picture stored in the decoding picture memory 211, using the inter-prediction information such as the inter-prediction mode, the information specifying the reference picture, and the motion vector to be supplied, and supplies the prediction picture signal to the decoding picture signal superimposer 209 through the switch 213. When both predictions are performed, the two motion compensation prediction picture signals of the L0 prediction and the L1 prediction are adaptively multiplied with a weighting coefficient and are superimposed and a final prediction picture signal is generated.

The inverse quantizer/inverse orthogonal transformer 208 performs inverse orthogonal transform and inverse quantization on the orthogonally transformed/quantized residual signal decoded by the third bitstream decoder 204 and obtains an inversely orthogonally transformed/inversely quantized residual signal.

The decoding picture signal superimposer 209 superimposes the prediction picture signal predicted by the intra-predictor 206 or the inter-predictor 207 and the residual signal inversely orthogonally transformed/inversely quantized by the inverse quantizer/inverse orthogonal transformer 208, decodes the decoding picture signal, and stores the decoding picture signal in the decoding picture memory 211. When the decoding picture signal is stored in the decoding picture memory 211, a filtering process to decrease block distortion by coding may be executed on the decoding picture and the decoding picture may be stored in the decoding picture memory 211. The decoding picture signal stored in the decoding picture memory 211 is output in output order.

Next, the intra prediction performed by the intra-predictor 103 of the picture coding device of FIG. 1 and the intra-prediction performed by the intra-predictor 206 of the picture decoding device of FIG. 2 and the intra-prediction mode used at the time of the intra-prediction, coded by the second bitstream generator 113 of FIG. 1, and decoded by the second bitstream decoder 203 of FIG. 2 will be described.

In the intra-prediction, a value of a pixel of a conversion block of a process target is predicted from a value of a pixel of a surrounding decoded conversion block in the same screen. In the coding device and the decoding device according to this embodiment, an intra-prediction mode is selected from 35 intra-prediction modes and the intra-prediction is performed. FIG. 8 is a diagram illustrating a value and a prediction direction of an intra-prediction mode defined in this embodiment. An arrow direction shows a prediction direction of each intra-prediction, that is, a direction referred to by the intra-prediction. In each intra-prediction mode, the intra-prediction of each pixel (pixel of a starting point of an arrow of FIG. 8) is performed by referring to a decoded boundary pixel of a prediction direction (arrow direction of FIG. 8) of the intra-prediction included in a conversion block neighboring a conversion block becoming a target of the intra-prediction. Each of left and upper numbers shows a value of an intra-prediction mode. Each of right and lower numerals shows an angle of the intra-prediction corresponding to each of the left and upper intra-prediction modes. An intra-prediction mode (intraPredMode) defines 33 angle predictions (intra-prediction mode intraPredMode=2 . . . 34) in which prediction is performed from a pixel of a surrounding decoded conversion block at various angles, in addition to plane prediction (intra-prediction mode intraPredMode=0) in which prediction is performed by interpolating a pixel value from a pixel of a surrounding decoded conversion block and average value prediction (intra-prediction mode intraPredMode=1) in which prediction is performed by deriving an average value from a pixel of a surrounding decoded conversion block. In the angle predictions, vertical prediction (intra-prediction mode intraPredMode=26) in which prediction is performed from a pixel of an upper decoded conversion block in a vertical direction and horizontal prediction (intra-prediction mode intraPredMode=10) in which prediction is performed from a pixel of a left decoded conversion block in a horizontal direction are included. In this embodiment, an angle of the intra-prediction is represented by a length of the vertical direction to a unit length 32 of the horizontal direction or a length of the horizontal direction to a unit length 32 of the vertical direction. An angle of the intra-prediction corresponding to an intra-prediction mode of the horizontal prediction to perform the prediction in the horizontal direction is set as 0 and the length of the vertical direction to the unit length 32 of the horizontal direction is represented by a positive value in a downward direction and a negative value in an upward direction and is set as an angle of the intra-prediction. In addition, an angle of the intra-prediction corresponding to an intra-prediction mode of the vertical prediction to perform the prediction in the vertical direction is set as 0 and the length of the horizontal direction to the unit length 32 of the vertical direction is represented by a positive value in a rightward direction and a negative value in a leftward direction and is set as an angle of the intra-prediction. For example, an angle of the intra-prediction of 32 shows 45° of a degree measure and an angle of the intra-prediction of −32 shows −45° of the degree measure.

The intra-prediction mode is prepared for each of the brightness signal and the color-difference signal and an intra-prediction mode for the brightness signal is defined as an intra-brightness prediction mode and an intra-prediction mode for the color-difference signal is defined as an intra-color-difference prediction mode. When the intra-brightness prediction mode is coded and decoded, a correlation with an intra-brightness prediction mode of a neighboring block is used. When it is determined that prediction can be performed from the intra-brightness prediction mode of the neighboring block at the coding side, information specifying a reference block is transmitted. When it is determined that setting a different value to the intra-brightness prediction mode is more preferable than the prediction from the intra-brightness prediction mode of the neighboring block, a mechanism for coding or decoding the value of the intra-brightness prediction mode is used. An intra-brightness prediction mode of a coding/decoding target block is predicted from the intra-brightness prediction mode of the neighboring block, so that a transmitted code amount can be reduced. Meanwhile, when the intra-color-difference prediction mode is coded and decoded, a correlation with an intra-brightness prediction mode of a prediction block of a brightness signal of the same position as the prediction block of the color-difference signal is used. When it is determined that prediction can be performed from the intra-brightness prediction mode at the coding side, a value of the intra-color-difference prediction mode is predicted from a value of the intra-brightness prediction mode. When it is determined that setting an independent value to the intra-color-difference prediction mode is more preferable than the prediction from the intra-brightness prediction mode, a mechanism for coding or decoding the value of the intra-color-difference prediction mode is used. An intra-color-difference prediction mode is predicted from the intra-brightness prediction mode, so that a transmitted code amount can be reduced.

Figure 12:
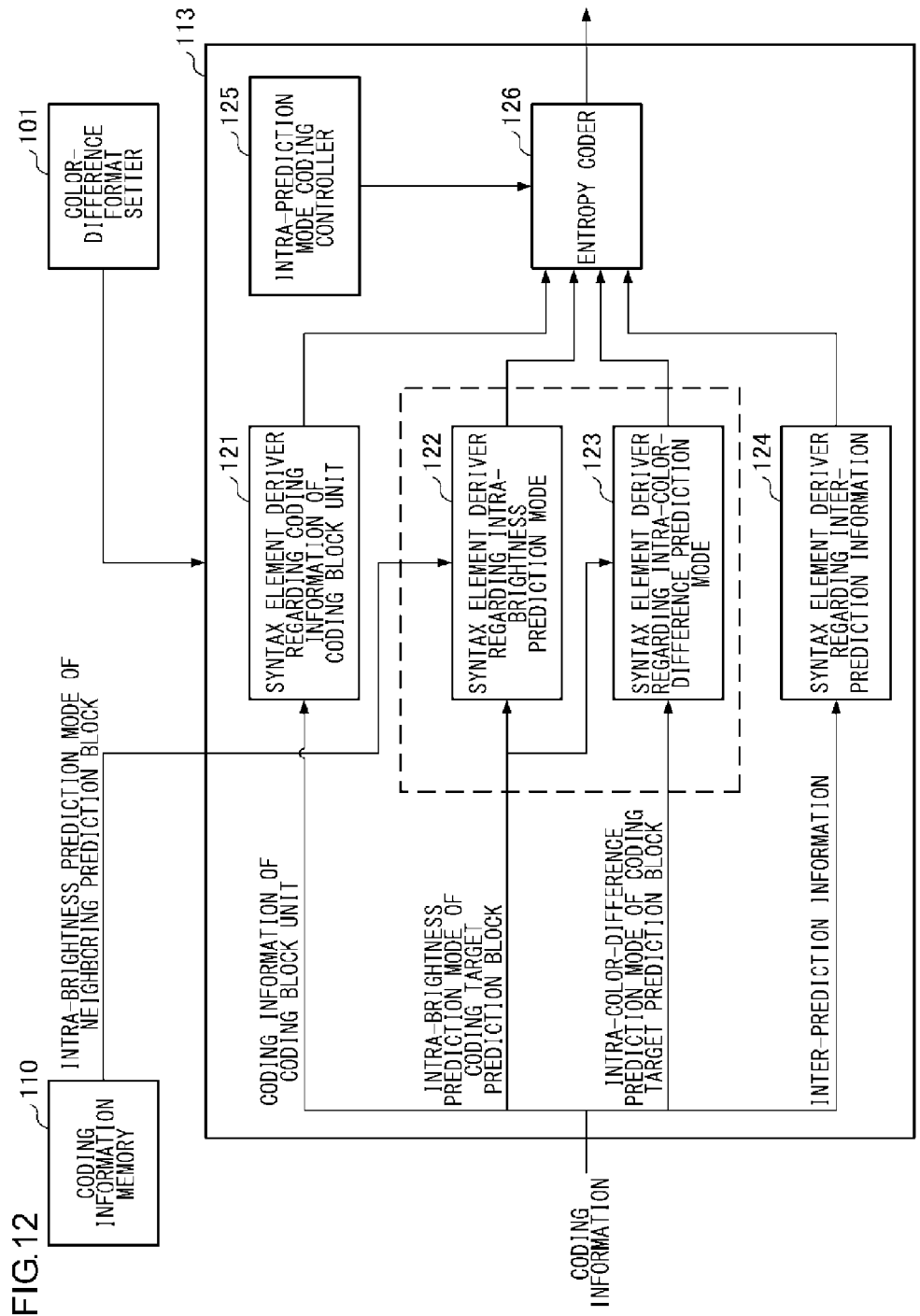
FIG. 12 is a block diagram illustrating a configuration of a second bitstream generator of the picture coding device according to the embodiment.

Next, a coding process of coding information of the coding block and prediction block units executed by the second bitstream generator 113 of FIG. 1 will be described on the basis of a point relating to the intra-prediction mode to be a characteristic of the embodiment. FIG. 12 is a block diagram illustrating a configuration of the second bitstream generator 113 of FIG. 1.

As illustrated in FIG. 12, the second bitstream generator 113 of FIG. 1 includes a syntax element deriver 121 regarding coding information of a coding block unit, a syntax element deriver 122 regarding an intra-brightness prediction mode, a syntax element deriver 123 regarding an intra-color-difference prediction mode, a syntax element deriver 124 regarding inter-prediction information, an intra-prediction mode coding controller 125, and an entropy coder 126. In individual elements configuring the second bitstream generator 113, a process according to color difference information supplied from the color-difference format setter 101 is executed and a process according to coding information such as a prediction mode and a division mode (PartMode) of a coding block unit is executed.

The syntax element deriver 121 regarding the coding information of the coding block unit derives a value of a syntax element regarding the coding information of the coding block unit and supplies the derived value of each syntax element to the entropy coder 126. Values of syntax elements regarding a prediction mode (PredMode) to determine intra-prediction (MODE_INTRA) or inter-prediction (MODE_INTER) of the coding block and a division mode (PartMode) to determine a shape of a prediction block are derived by the syntax element deriver 121 regarding the coding information of the coding block unit.

When the prediction mode (PredMode) of the coding block is the intra-prediction (MODE_INTRA), the syntax element deriver 122 regarding the intra-brightness prediction mode derives a value of a syntax element regarding an intra-brightness prediction mode of a prediction block of a brightness signal and supplies the derived value of each syntax element to the entropy coder 126. The syntax elements regarding the intra-brightness prediction mode are a syntax element prev_intra_luma_pred_flag[x0][y0] to be a flag showing whether prediction can be performed from an intra-brightness prediction mode of a neighboring block, a syntax element mpm_idx[x0][y0] to be an index showing a prediction block of a prediction origin, and a syntax element rem_intra_luma_pred_mode[x0][y0] showing an intra-brightness prediction mode of a prediction block unit. In addition, x0 and y0 are the coordinates showing a position of the prediction block. When the value of the syntax element regarding the intra-brightness prediction mode is derived, a correlation with an intra-brightness prediction mode of a neighboring block stored in the coding information memory 110 is used. When prediction can be performed from the intra-brightness prediction mode of the neighboring block, a syntax element prev_intra_luma_pred_flag [x0][y0] to be a flag showing that the value is used is set to 1 (true) and a value to specify a reference destination is set to the syntax element mpm_idx[x0][y0] to be the syntax showing the prediction block of the prediction origin. When the prediction cannot be performed, prev_intra_luma_pred_flag [x0][y0] is set to 0 (false) and a value to specify the intra-brightness prediction mode is set to the syntax element rem_intra_luma_pred_mode[x0][y0] showing an intra-brightness prediction mode to be coded.

The number of intra-brightness prediction modes of a prediction block in a coding block is different according to a division block. When the division mode (PartMode) is 2N×2N division, values of syntax elements regarding intra-brightness prediction modes of one set of prediction blocks are derived for each coding block and when the division mode is N×N division, values of syntax elements regarding intra-brightness prediction modes of four sets of prediction blocks are derived for each coding block.

When the prediction mode (PredMode) of the coding block is the intra-prediction (MODE_INTRA), the syntax element deriver 123 regarding the intra-color-difference prediction mode derives a value of a syntax element intra_ chroma_pred_mode[x0][y0] regarding an intra-color-difference prediction mode of a prediction block of a color-difference signal and supplies the derived value of the syntax element intra_chroma_pred_mode[x0][y0] to the entropy coder 126. In determination of the intra-color-difference prediction mode in the intra-predictor 103 and derivation of the value of the syntax element regarding the intra-color-difference prediction mode of the syntax element deriver 123 regarding the intra-color-difference prediction mode, a correlation with an intra-brightness prediction mode of a prediction block of a brightness signal of the same position as the prediction block of the color-difference signal is used. When a prediction value from the intra-brightness prediction mode of the prediction block of the brightness signal of the same position as the prediction block of the color-difference signal is most suitable, a value of the intra-color-difference prediction mode is predicted from the value of the intra-brightness prediction mode. When it is determined that setting an independent value is more preferable than the prediction value from the intra-brightness prediction mode, a mechanism for setting any value of 0 (plane prediction), 1 (average value prediction), 10 (horizontal prediction), 26 (vertical prediction), and 34 (oblique prediction) to be representative intra-prediction modes to the intra-color-difference prediction mode is used and a code amount is reduced.

Here, a method of deriving a value of the intra-color-difference prediction mode from the value of the intra-brightness prediction mode and the value of the syntax element regarding the intra-color-difference prediction mode by the intra-color-difference prediction mode deriver 225 to be described below at the decoding side will be described. In this embodiment, an intra-color-difference prediction mode for 4:2:0 or 4:4:4 derived by a table of FIG. 14 to be described below is defined as a first intra-color-difference prediction mode to distinguish an intra-color-difference prediction mode for a color-difference format 4:2:2 to be described below and the intra-color-difference prediction mode. FIG. 14 is a table to derive a value of a first intra-color-difference prediction mode from a value of a syntax element intra_chroma_pred_mode[x0][y0] regarding an intra-color-difference prediction mode defined in this embodiment and a value of an intra-brightness prediction mode of a prediction block of the same position as a prediction block of a color-difference signal. At the decoding side, the value of the first intra-color-difference prediction mode is derived using the table.

In the case in which the value of the syntax element intra_chroma_pred_mode[x0][y0] is 0, if the value of the intra-brightness prediction mode of the prediction block of the same position as the prediction block of the color-difference signal is not 0, the value of the first intra-color-difference prediction mode takes a value of 0 (plane prediction) and if the value of the intra-brightness prediction mode is 0, the value of the first intra-color-difference prediction mode takes a value of 34 (oblique prediction).

In the case in which the value of the syntax element intra_chroma_pred_mode[x0][y0] is 1, if the value of the intra-brightness prediction mode of the prediction block of the same position as the prediction block of the color-difference signal is not 1, the value of the first intra-color-difference prediction mode takes a value of 26 (vertical prediction) and if the value of the intra-brightness prediction mode is 1, the value of the first intra-color-difference prediction mode takes a value of 34 (oblique prediction).

In the case in which the value of the syntax element intra_chroma_pred_mode[x0][y0] is 2, if the value of the intra-brightness prediction mode of the prediction block of the same position as the prediction block of the color-difference signal is not 2, the value of the first intra-color-difference prediction mode takes a value of 10 (horizontal prediction) and if the value of the intra-brightness prediction mode is 2, the value of the first intra-color-difference prediction mode takes a value of 34 (oblique prediction).

In the case in which the value of the syntax element intra_chroma_pred_mode[x0][y0] is 3, if the value of the intra-brightness prediction mode of the prediction block of the same position as the prediction block of the color-difference signal is not 3, the value of the first intra-color-difference prediction mode takes a value of 1 (average value prediction) and if the value of the intra-brightness prediction mode is 3, the value of the first intra-color-difference prediction mode takes a value of 34 (oblique prediction).

In the case in which the value of the syntax element intra_chroma_pred_mode[x0][y0] is 4, the value of the first intra-color-difference prediction mode takes the same value as the intra-brightness prediction mode of the prediction block of the same position as the prediction block of the color-difference signal.

When the color-difference format is 4:2:0 or 4:4:4, the first intra-color-difference prediction mode derived by FIG. 14 is used as an intra-prediction mode of a color-difference signal for a color-difference format 4:2:0 or 4:4:4. In the intra-predictor 103 of the picture coding device of FIG. 1 and the intra-predictor 206 of the picture decoding device of FIG. 2, when the color-difference format is 4:2:0 or 4:4:4, the intra-prediction of the color-difference signal is performed using the first intra-color-difference prediction mode.

Figure 18:
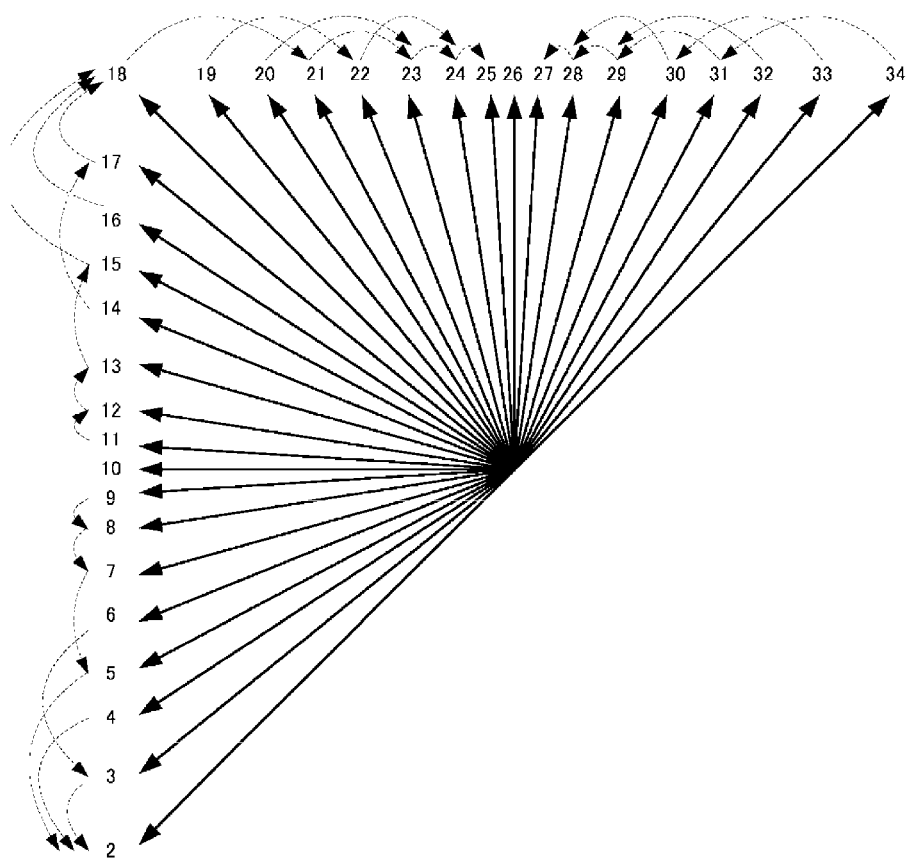
FIG. 18 is a diagram illustrating a value and a prediction direction of an intra-prediction mode of the conversion table of FIG. 15 defined in this embodiment.
Figure 19:
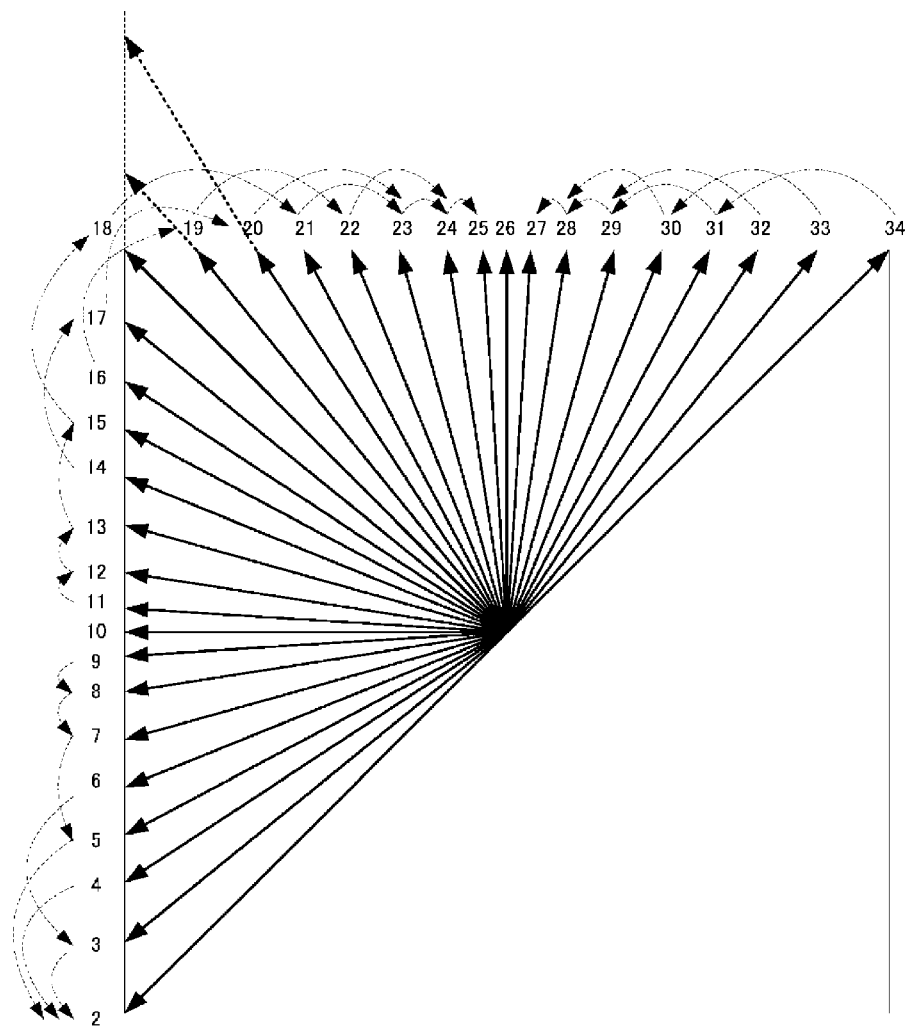
FIG. 19 is a diagram illustrating a value and a prediction direction of an intra-prediction mode of the conversion table of FIG. 16 defined in this embodiment.
Figure 20:
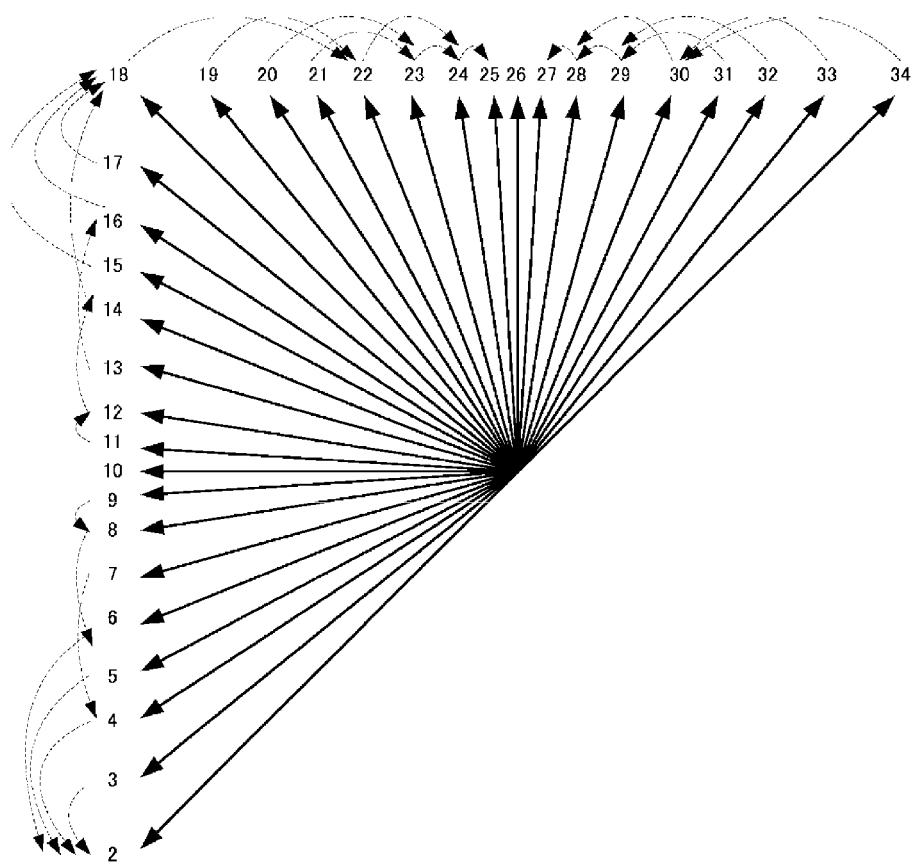
FIG. 20 is a diagram illustrating a value and a prediction direction of an intra-prediction mode of the conversion table of FIG. 17 defined in this embodiment.
Figure 31:
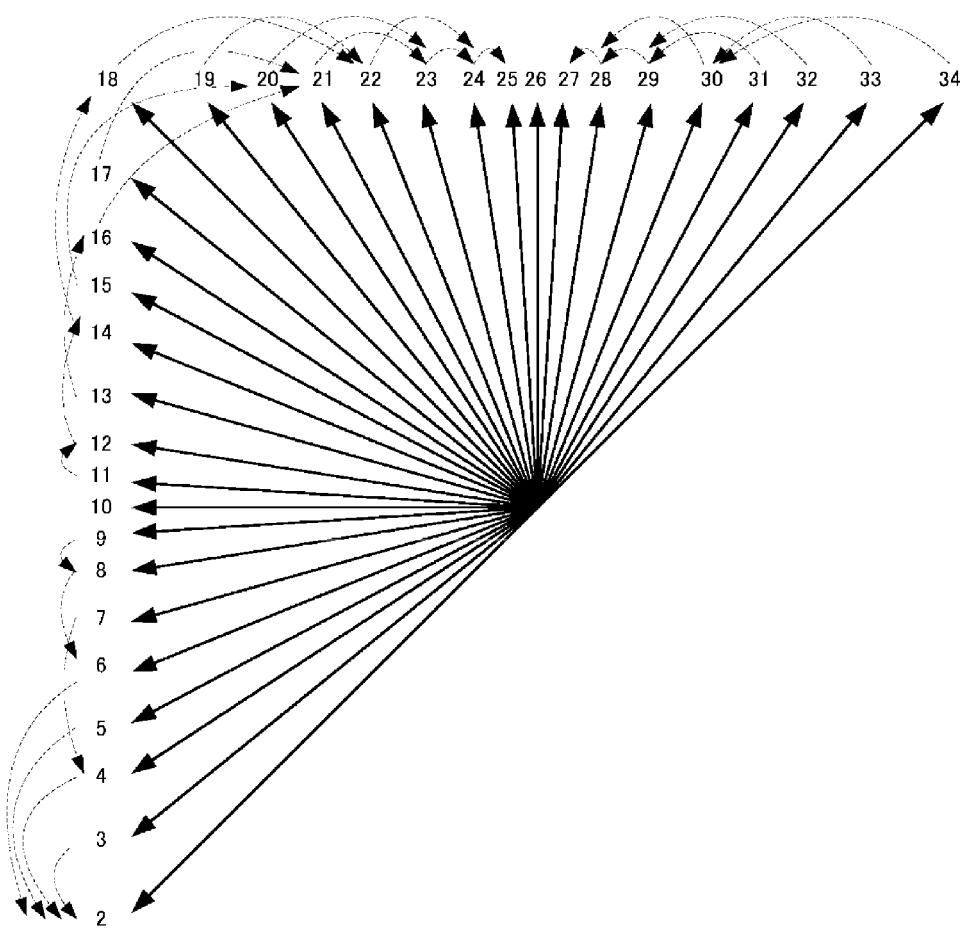
FIG. 31 is a diagram illustrating a value and a prediction direction of an intra-prediction mode of the conversion table of FIG. 30 defined in this embodiment.
Figure 34:
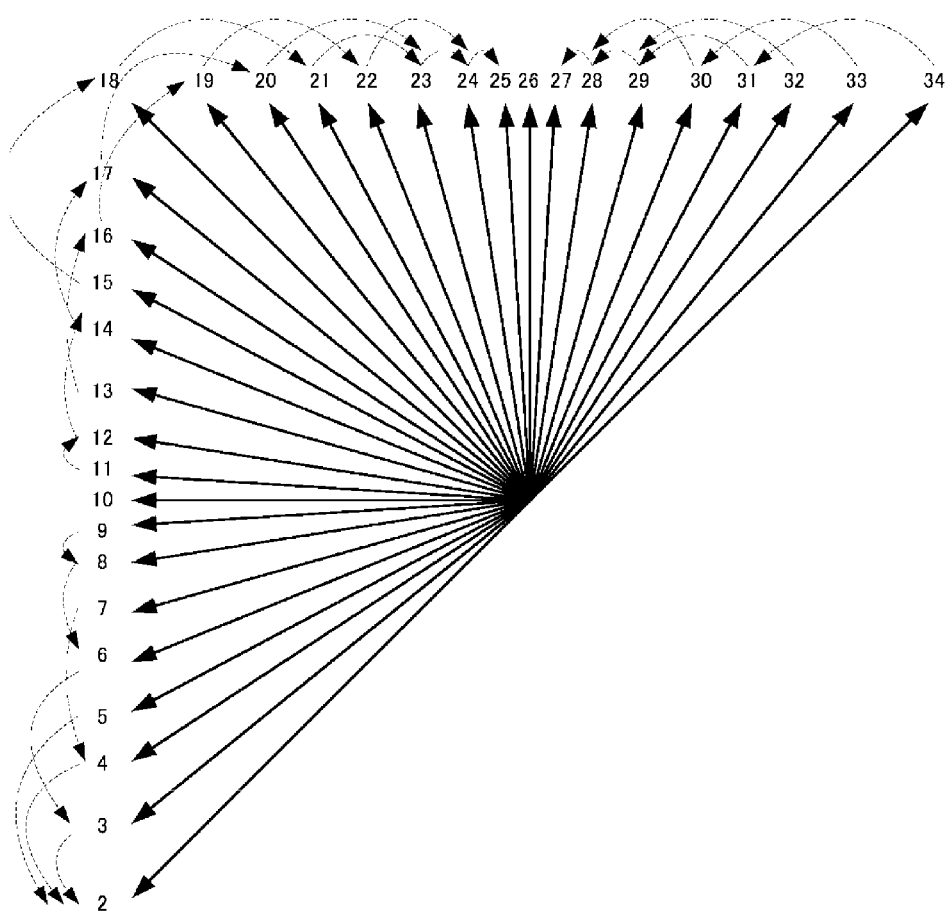
FIG. 34 is a diagram illustrating a value and a prediction direction of an intra-prediction mode of the conversion table of FIG. 33 defined in this embodiment.

When the color-difference format is 4:2:2, a value of an intra-color-difference prediction mode for a color-difference format 4:2:2 is derived from the first intra-color-difference prediction mode derived by FIG. 14 by the conversion table. In coding and decoding according to this embodiment, the intra-color-difference prediction mode for the color-difference format 4:2:2 derived by a conversion table of FIG. 15, 16, 17, 30, or 33 to be described below is defined as a second intra-color-difference prediction mode. In the intra-predictor 103 of the picture coding device of FIG. 1 and the intra-predictor 206 of the picture decoding device of FIG. 2, when the color-difference format is 4:2:2, the intra-prediction of the color-difference signal is performed using the second intra-color-difference prediction mode. FIGS. 15, 16, 17, 30, and 33 are conversion tables to derive a value of the second intra-color-difference prediction mode for the color-difference format 4:2:2 used for the intra-prediction of the color-difference signal in which the color-difference format is 4:2:2, from the intra-brightness prediction mode defined in this embodiment or the first intra-color-difference prediction mode derived by the table of FIG. 14. FIG. 18 is a diagram illustrating a value and a prediction direction of an intra-prediction mode derived by the conversion table of FIG. 15 defined in this embodiment. FIG. 19 is a diagram illustrating a value and a prediction direction of an intra-prediction mode derived by the conversion table of FIG. 16 defined in this embodiment. FIG. 20 is a diagram illustrating a value and a prediction direction of an intra-prediction mode derived by the conversion table of FIG. 17 defined in this embodiment. FIG. 31 is a diagram illustrating a value and a prediction direction of an intra-prediction mode derived by the conversion table of FIG. 30 defined in this embodiment. FIG. 34 is a diagram illustrating a value and a prediction direction of an intra-prediction mode derived by the conversion table of FIG. 33 defined in this embodiment.

In this embodiment, a process for deriving the second intra-color-difference prediction mode for the color-difference format 4:2:2 from the intra-brightness prediction mode or the first intra-color-difference prediction mode in FIGS. 15, 16, 17, 30, and 33 is executed by the intra-predictor 103 of the coding device at the coding side and is executed by the second bitstream decoder 203 or the intra-predictor 206 of the decoding device at the decoding side.

The reason why the second intra-color-difference prediction mode for the color-difference format 4:2:2 is derived using the conversion table of FIG. 15, 16, 17, 30, or 33, instead of using directly the first intra-color-difference prediction mode derived by the table of FIG. 14 like 4:2:0 or 4:4:4, when the color-difference format is 4:2:2, in coding and decoding according to this embodiment, will be described. When the color-difference format is 4:2:2, the color-difference format is a color-difference format in which the color-difference signal is sampled at a density of ½ in a horizontal direction and the same density in a vertical direction, with respect to the brightness signal, as illustrated in FIG. 3B. Therefore, if the intra-prediction of the color-difference signal is performed in a prediction direction obtained by scaling a prediction direction of each of the intra-brightness prediction mode and the first intra-color-difference prediction mode ½ times in the horizontal direction or a surrounding prediction direction thereof, the intra-prediction becomes equivalent to or almost equivalent to the intra-prediction of the brightness signal of the prediction block of the same position as the prediction block of the color-difference signal.

Figure 21B:
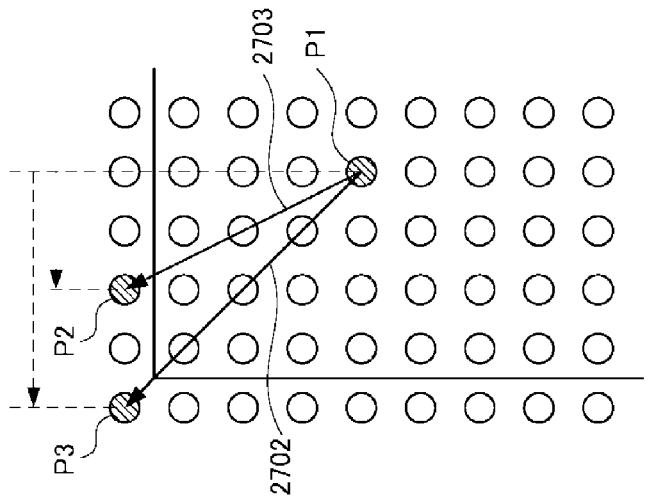
FIGS. 21A and 21B are a diagram illustrating a correspondence relation of prediction directions of intra-predictions of a brightness signal and a color-difference signal when a color-difference format is 4:2:2.
Figure 21A:
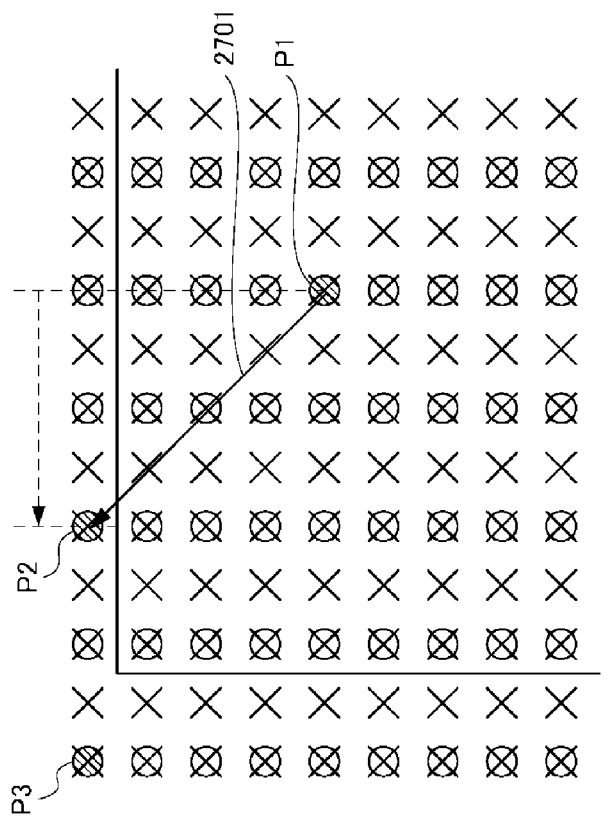

This will be described in detail with reference to FIGS. 21A and 21B. FIGS. 21A and 21B are a diagram illustrating a correspondence relation of prediction directions of intra-predictions of a brightness signal and a color-difference signal when a color-difference format is 4:2:2. In FIGS. 21A and 21B, x shows a position of a pixel of a brightness signal and ○ shows a position of a pixel of a color-difference signal. In 4:2:2, a color-difference signal is sampled at a density of ½ in a horizontal direction, with respect to a brightness signal, and aspect ratios of pixels of the brightness signal and the color-difference signal are different from each other. FIG. 21A illustrates positions of sampled pixels of a brightness signal and a color-difference signal at 4:2:2. A symbol P1 shows a pixel of the intra prediction and a symbol P2 shows a pixel (in actuality, because filtering is performed, adjacent pixels are also referred to) to be referred to at the time of the intra-prediction. An arrow extended from a pixel P1 to a pixel P2, shown by a symbol 2701, shows an intra-prediction direction of the pixel P1 of the brightness signal and shows an intra-prediction direction of the pixel P1 of the color-difference signal.

FIG. 21B illustrates an array of pixels of a color-difference signal sampled at a density of ½ in the horizontal direction. Here, when scaling of ½ is not performed in the horizontal direction at the time of the intra-prediction of the color-difference signal, the intra-prediction direction of the pixel P1 of the color-difference signal becomes an arrow direction shown by a symbol 2702 and a pixel of a symbol P3 is erroneously referred to in the pixel array of the color-difference signal. However, a correct reference destination is the pixel shown by the symbol P2. Therefore, the intra-prediction direction of the brightness signal is scaled ½ times in the horizontal direction and the intra-prediction direction is set to the intra-prediction direction of the color-difference signal, so that a correct intra-prediction direction in the array of the color-difference signal is derived, as shown by a symbol 2703, and a pixel (in actuality, because filtering is performed, adjacent pixels are also referred to) to be the correct reference destination in the intra-prediction direction and neighboring in an upward direction is acquired.

In FIGS. 21A and 21B, the case in which the pixel neighboring the prediction block in the upward direction is referred to has been described. However, the case in which a pixel neighboring in a leftward direction is referred to is also the same. In the case of the pixel neighboring in the leftward direction, the intra-prediction direction of the brightness signal is scaled two times in the vertical direction (this is equivalent to scaling the intra-prediction direction ½ times in the horizontal direction, from the viewpoint of acquiring the direction of the intra-prediction), so that a correction intra-prediction direction in the array of the color-difference signal is derived, and a pixel (a part of pixels neighboring in the upward direction is also included) to be the correct reference destination in the intra-prediction direction and neighboring in the leftward direction is acquired.

Therefore, in the conversion tables of FIGS. 15 and 16, as shown by arrows of dotted lines of FIGS. 18 and 19, when values of the intra-brightness prediction modes arranged in the horizontal direction (on a horizontal axis) or the first intra-color-difference prediction modes derived by the table of FIG. 14 are 18, 19, 20, 21, 22, 23, 24, 25, 26, 27, 28, 29, 30, 31, 32, 33, and 34, values of intra-prediction modes of a prediction direction close to a prediction direction derived by scaling an angle of the prediction direction ½ times in the horizontal direction on the basis of the vertical prediction (intra-prediction mode 26) are selected as values of the second intra-color-difference prediction modes and the values of the second intra-color-difference prediction modes are set to 21, 22, 23, 23, 24, 24, 25, 25, 26, 27, 27, 28, 28, 29, 29, 30, and 31, respectively. In addition, scaling the prediction direction of the intra-prediction ½ times in the horizontal direction is equivalent to scaling the prediction direction two times in the vertical direction. Therefore, if the intra-prediction of the color-difference signal is performed in a prediction direction obtained by scaling a prediction direction of each of the intra-brightness prediction mode and the first intra-color-difference prediction mode two times in the vertical direction on the basis of the horizontal prediction (intra-prediction mode 10) or a surrounding prediction direction thereof, the intra-prediction becomes equivalent to or almost equivalent to the intra-prediction of the brightness signal of the prediction block of the same position as the prediction block of the color-difference signal. Therefore, in the conversion tables of FIGS. 15 and 16, as illustrated in FIGS. 18 and 19, when values of the intra prediction modes (intra-brightness prediction modes or first intra-color-difference prediction modes) arranged in the vertical direction (on a vertical axis) are 2, 3, 4, 5, 6, 7, 8, 9, 10, 11, 12, 13, 14, 15, 16, and 17, values of intra-prediction modes of a prediction direction close to a prediction direction derived by scaling an angle of the prediction direction two times in the vertical direction on the basis of the horizontal prediction (intra-prediction mode 10) are selected as values of the second intra-color-difference prediction modes and the values of the second intra-color-difference prediction modes are set to 2, 2, 2, 2, 3, 5, 7, 8, 10, 12, 13, 15, 17, 18, 18, 18, and 18 and 2, 2, 2, 2, 3, 5, 7, 8, 10, 12, 13, 15, 17, 18, 18, 19, and 20, respectively.

In addition, the intra-prediction mode (intra-brightness prediction mode or first intra-color-difference prediction mode) can be converted into the second intra-color-difference prediction mode using the conversion table of FIG. 17.

In the conversion table of FIG. 17, as shown by an arrow of a dotted line of FIG. 20, when values of the intra-brightness prediction modes in which the reference destinations are arranged in the horizontal direction (on a horizontal axis) or the first intra-color-difference prediction modes derived by the table of FIG. 14 are 18, 19, 20, 21, 22, 23, 24, 25, 26, 27, 28, 29, 30, 31, 32, 33, and 34, values derived by scaling the intra-brightness prediction mode or the first intra-color-difference prediction mode ½ times in the horizontal direction on the basis of the vertical prediction (intra-prediction mode 26) are set to values of the second intra-color-difference prediction modes and the values of the second intra-color-difference prediction modes are set to 22, 22, 23, 23, 24, 24, 25, 25, 26, 27, 27, 28, 28, 29, 29, 30, and 30, respectively. In addition, scaling the prediction direction of the intra-prediction ½ times in the horizontal direction is equivalent to scaling the prediction direction two times in the vertical direction. Therefore, if the intra-prediction of the color-difference signal is performed in a prediction direction obtained by scaling a prediction direction of each of the intra-brightness prediction mode and the first intra-color-difference prediction mode two times in the vertical direction on the basis of the horizontal prediction (intra-prediction mode 10) or a surrounding prediction direction thereof, the intra-prediction becomes equivalent to or almost equivalent to the intra-prediction of the brightness signal of the prediction block of the same position as the prediction block of the color-difference signal. Therefore, in the conversion table of FIG. 17, as shown by an arrow of a dotted line of FIG. 20, when values of the intra-brightness prediction modes in which the reference destinations are arranged in the vertical direction (on a vertical axis) or the first intra-color-difference prediction modes are 2, 3, 4, 5, 6, 7, 8, 9, 10, 11, 12, 13, 14, 15, 16, and 17, values derived by scaling the intra-brightness prediction mode or the first intra-color-difference prediction mode two times in the vertical direction on the basis of the horizontal prediction (intra-prediction mode 10) and limiting the values to larger than or equal to 2 and smaller than or equal to 18 are set to values of the intra-color-difference prediction modes and the values of the second intra-color-difference prediction modes are set to 2, 2, 2, 2, 2, 4, 6, 8, 10, 12, 14, 16, 18, 18, 18, and 18.

In addition, the intra-prediction mode (intra-brightness prediction mode or first intra-color-difference prediction mode) can be converted into the second intra-color-difference prediction mode using the conversion table of FIG. 30. In the conversion table of FIG. 30, as shown by an arrow of a dotted line of FIG. 31, when values of the intra-brightness prediction modes or the first intra-color-difference prediction modes derived by the table of FIG. 14 are 16, 17, 18, 19, 20, 21, 22, 23, 24, 25, 26, 27, 28, 29, 30, 31, 32, 33, and 34, values derived by scaling the intra-brightness prediction mode or the first intra-color-difference prediction mode ½ times in the horizontal direction on the basis of the vertical prediction (intra-prediction mode 26) are set to values of the second intra-color-difference prediction modes and the values of the second intra-color-difference prediction modes are set to 21, 21, 22, 22, 23, 23, 24, 24, 25, 25, 26, 27, 27, 28, 28, 29, 29, 30, and 30, respectively. In addition, when values of the intra-brightness prediction modes or the first intra-color-difference prediction modes are 2, 3, 4, 5, 6, 7, 8, 9, 10, 11, 12, 13, 14, and 15, the values derived by scaling the intra-brightness prediction modes or the first intra-color-difference prediction modes two times in the vertical direction on the basis of the horizontal prediction (intra-prediction mode 10) and limiting the values to larger than or equal to 2 are set to values of the second intra-color-difference prediction modes and the values of the second intra-color-difference prediction modes are set to 2, 2, 2, 2, 2, 4, 6, 8, 10, 12, 14, 16, 18, and 20.

In addition, the intra-prediction mode (intra-brightness prediction mode or first intra-color-difference prediction mode) can be converted into the second intra-color-difference prediction mode using the conversion table of FIG. 33. In the conversion table of FIG. 33, as shown by an arrow of a dotted line of FIG. 34, when values of the intra-brightness prediction modes or the first intra-color-difference prediction modes derived by the table of FIG. 14 are 21, 22, 23, 24, 25, 26, 27, 28, 29, 30, and 31, values derived by scaling the intra-brightness prediction mode or the first intra-color-difference prediction mode ½ times in the horizontal direction on the basis of the vertical prediction (intra-prediction mode 26) are set to values of the second intra-color-difference prediction modes and the values of the second intra-color-difference prediction modes are set to 23, 24, 24, 25, 25, 26, 27, 27, 28, 28, and 29, respectively. In addition, when values of the intra-brightness prediction modes or the first intra-color-difference prediction modes are 7, 8, 9, 10, 11, 12, and 13, the values derived by scaling the intra-brightness prediction modes or the first intra-color-difference prediction modes two times in the vertical direction on the basis of the horizontal prediction (intra-prediction mode 10) are set to values of the second intra-color-difference prediction modes and the values of the second intra-color-difference prediction modes are set to 4, 6, 8, 10, 12, 14, and 16. In addition, when values of the intra-brightness prediction modes or the first intra-color-difference prediction modes are 2, 3, 4, 5, and 6, the values derived by subtracting 3 from the intra-brightness prediction modes or the first intra-color-difference prediction modes and limiting the values to larger than or equal to 2 are set to values of the second intra-color-difference prediction modes and the values of the second intra-color-difference prediction modes are set to 2, 2, 2, 2, and 3. In addition, when values of the intra-brightness prediction modes or the first intra-color-difference prediction modes are 14, 15, 16, 17, 18, 19, and 20, the values derived by adding 3 to the intra-brightness prediction modes or the first intra-color-difference prediction modes are set to values of the second intra-color-difference prediction modes and the values of the second intra-color-difference prediction modes are set to 17, 18, 19, 20, 21, and 22. In addition, when values of the intra-brightness prediction modes or the first intra-color-difference prediction modes are 32, 33, and 34, the values derived by subtracting 3 from the intra-brightness prediction modes or the first intra-color-difference prediction modes are set to values of the second intra-color-difference prediction modes and the values of the second intra-color-difference prediction modes are set to 29, 30, and 31.

A derivation process sequence when the first intra-color-difference prediction mode corresponding to the conversion tables of FIGS. 15 and 16 when the first intra-color-difference prediction mode is converted into the second intra-color-difference prediction mode at the color-difference format 4:2:2 is converted into the second intra-color-difference prediction mode will be described using a flowchart of FIG. 23.

Figure 23:
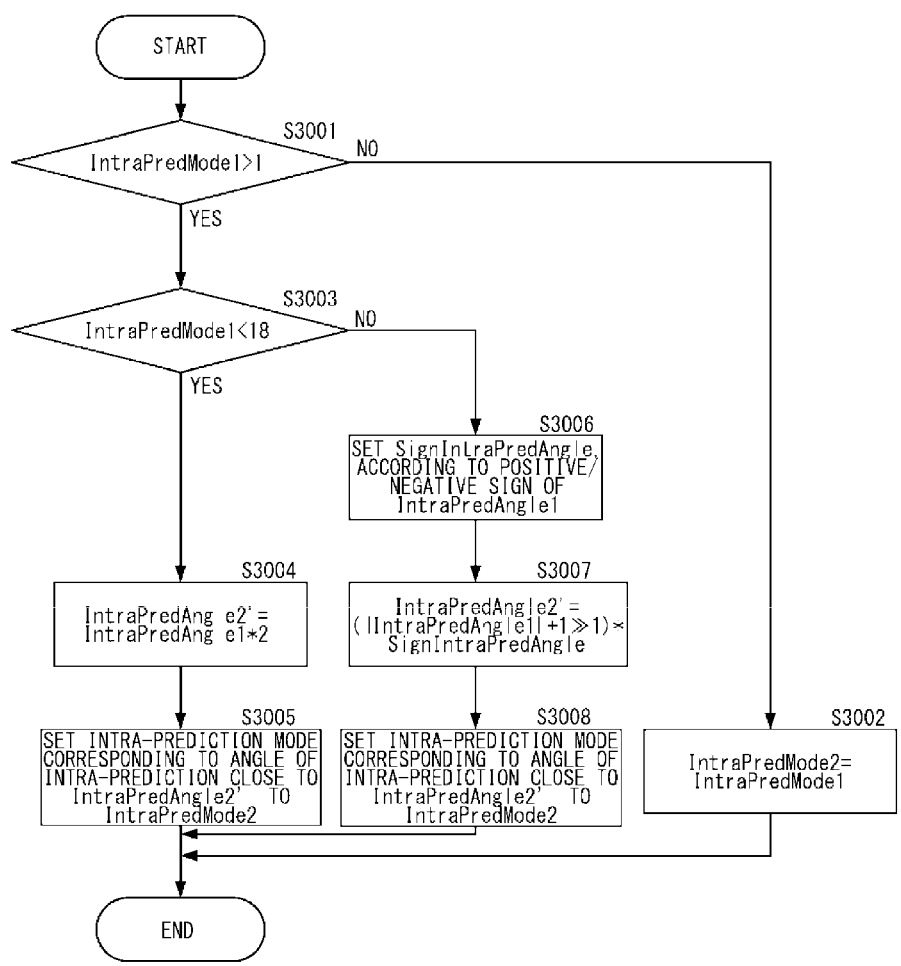
FIG. 23 is a diagram illustrating a derivation process sequence when an intra-brightness prediction mode or a first intra-color-difference prediction mode is converted into a second intra-color-difference prediction mode, corresponding to the conversion tables of FIGS. 15 and 16 defined in this embodiment.

In each value of a first intra-prediction mode IntraPredMode1 from 0 to 34, a second intra-prediction mode IntraPredMode2 is derived by the sequence of the flowchart of FIG. 23.

First, when the prediction is not the angle prediction, that is, the first intra-prediction mode IntraPredMode1 is smaller than or equal to 1 (NO of step S3001 of FIG. 23), the value of the first intra-prediction mode IntraPredMode1 is used directly as the second intra-color-difference prediction mode IntraPredMode2 (step S3002 of FIG. 23) and this derivation process ends. When the first intra-prediction mode IntraPredMode1 is smaller than or equal to 1, this corresponds to plane prediction (intra-prediction mode intraPredMode1=0) in which prediction is performed by interpolating a pixel value from a surrounding decoded block and average value prediction (intra-prediction mode intraPredMode1=1) in which prediction is performed by deriving an average value from a surrounding decoded block.

Meanwhile, when the first intra-color-difference prediction mode IntraPredMode1 is the angle prediction, that is, larger than 1 (YES of step S3001 of FIG. 23), a conversion process from the first intra-color-difference prediction mode to the second intra-color-difference prediction mode after step S3003 is executed.

When the intra-color-difference prediction mode IntraPredMode1 is smaller than 18 (YES of step S3003 of FIG. 23), an angle IntraPredAngle1 of the first intra-prediction corresponding to the first intra-color-difference prediction mode IntraPredMode1 is doubled and is set to an angle IntraPredAngle2' of the intra-prediction (step S3004 of FIG. 23). In addition, a value of the intra-brightness prediction mode or and the first intra-color-difference prediction mode IntraPredMode1 corresponding to the angle IntraPredAngle1 of the first intra-prediction close to the angle IntraPredAngle2' of the intra-prediction is set to the second intra-prediction mode IntraPredMode2 (step S3005 of FIG. 23) and this derivation process ends. However, when the first intra-prediction modes are 2, 3, 4, and 5, a value of the angle IntraPredAngle2' of the intra-prediction becomes smaller than or equal to −32. However, at this time, the angle of the intra-prediction is set to −32 and the second intra-color-difference prediction mode is set to 2. When the first intra-prediction modes are 15, 16, and 17, a value of the angle intraPredAngle2' of the Intra-prediction becomes larger than or equal to 32. However, at this time, the angle of the intra-prediction is set to 32 and the second intra-color-difference prediction mode is set to 18. As illustrated in FIG. 19, if the angle of the intra-prediction corresponding to the first intra-prediction mode of 16 is doubled in a longitudinal direction, the angle takes a value close to an angle of the intra-prediction corresponding to the intra-prediction mode of 19 and if the angle of the intra-prediction corresponding to the first intra-prediction mode of 17 is doubled in a longitudinal direction, the angle takes a value close to an angle of the intra-prediction corresponding to the intra-prediction mode of 20. Therefore, as illustrated in FIG. 19, when the first intra-prediction mode is 16, the second intra-prediction mode can be set to 19 and when the first intra-prediction mode is 17, the second intra-prediction mode can be set to 20.

Meanwhile, when the intra-color-difference prediction mode IntraPredMode1 is not smaller than 18, that is, larger than or equal to 18 (NO of step S3003 of FIG. 23), the angle IntraPredAngle1 of the first intra-prediction corresponding to the first intra-color-difference prediction mode IntraPredMode1 is multiplied with ½ and is set to the angle IntraPredAngle2' of the intra-prediction (steps S3006 and S3007 of FIG. 23). In this embodiment, a value is set to a variable SignIntraPredAngle having a value of −1 when a sign of the angle IntraPredAngle1 of the first intra-prediction corresponding to the first intra-color-difference prediction mode IntraPredMode1 is negative and having a value of 1 when the sign is positive or a variable a is 0 (step S3006 of FIG. 23), a result obtained by executing an operation to shift one bit to the right, equivalent to ½ times, on an absolute value of the first intra-color-difference prediction mode IntraPredMode1 is multiplied with the variable SignIntraPredAngle, and an obtained value is set to the angle IntraPredAngle2' of the intra-prediction (step S3007 of FIG. 23). Also, a result obtained by executing the operation to shift one bit to the right, equivalent to ½ times, on the absolute value of the first intra-color-difference prediction mode IntraPredMode1 after adding 1 to the absolute value may be multiplied with the variable SignIntraPredAngle and an obtained value may be set to the angle IntraPredAngle2' of the intra-prediction. In addition, a value of an intra-prediction mode (upper step of FIG. 8) corresponding to an angle (lower step of FIG. 8) of the intra-prediction prepared in the intra-brightness prediction mode and the first intra-color-difference prediction mode, close to the angle IntraPredAngle2' of the intra-prediction, is set to the second intra-prediction mode IntraPredMode2 (step S3008 of FIG. 23) and this derivation process ends. When the angle IntraPredAngle2' of the intra-prediction is rounded off to a value of an angle of the intra-prediction prepared in the intra-brightness prediction mode and the first intra-color-difference prediction mode, the angle IntraPredAngle2' of the intra-prediction may be rounded off to a value closest to the angle IntraPredAngle2' of the intra-prediction, may be revalued, and may be devalued. In addition, the same positive/negative sign as the angle IntraPredAngle2' of the intra-prediction may be set to a value obtained by rounding off, revaluing, or devaluing an absolute value of the angle IntraPredAngle2' of the intra-prediction.

If the angle of the intra-prediction in which the first intra-color-difference prediction mode is 25 is multiplied with ½, the angle becomes −1 and −1 can be converted into a value of either −2 corresponding to the value of the intra-prediction mode of 25 or 0 corresponding to the value of the intra-prediction mode of 26. However, because coding can be performed at all times in 26 showing the vertical prediction, the first intra-color-difference prediction mode is set to 25 when 25 is converted into the second intra-color-difference prediction mode. If the angle of the intra-prediction in which the first intra-color-difference prediction mode is 27 is multiplied with ½, the angle becomes 1 and 1 can be converted into a value of either 0 corresponding to the value of the intra-prediction mode of 26 or 2 corresponding to the value of the intra-prediction mode of 27. However, because coding can be performed at all times in 26 showing the vertical prediction, the first intra-color-difference prediction mode is set to 27 when 27 is converted into the second intra-color-difference prediction mode. In other words, when the first intra-color-difference prediction mode is converted into the second intra-color-difference prediction mode using the conversion tables illustrated in FIGS. 15, 16, 17, 30, and 33, in the case in which the first intra-color-difference prediction mode is not 26 to be the vertical prediction, the value is converted into a value other than 26 to be the vertical prediction and the second intra-color-difference prediction mode is derived from the first intra-color-difference prediction mode. That is, the value is converted to exclude values (0, 1, 10, 26, and 34) that can be derived from syntax elements (0, 1, 2, and 3 of FIGS. 14 and 25) of the intra-color-difference prediction modes selected when the value of the intra-brightness prediction mode and the value of the intra-color-difference prediction mode are not matched with each other. By this setting, a selection width of the intra-color-difference prediction mode is extended and coding efficiency can be improved.

In steps S3005 and S3008, when a value of the intra-brightness prediction mode or the first intra-color-difference prediction mode IntraPredMode1 corresponding to the angle IntraPredAngle1 of the first intra-prediction close to the angle IntraPredAngle2' of the intra-prediction is set to the second intra-prediction mode IntraPredMode2 and an intra-prediction operation of the color-difference signal at the color-difference format 4:2:2 is mounted by hardware, the intra-prediction operation using the second intra-color-difference prediction mode can be realized by only the angle of the intra-prediction corresponding to the intra-brightness prediction mode or the first intra-color-difference prediction mode IntraPredMode1. Therefore, the intra-prediction operation can be executed without adding hardware by an angle of new intra-prediction.

In the angle predictions, vertical prediction (intra-prediction mode intraPredMode1=26) in which prediction is performed from an upper decoded block in a vertical direction and horizontal prediction (intra-prediction mode intraPredMode1=10) in which prediction is performed from a left decoded block in a horizontal direction are also included. However, in the vertical prediction and the horizontal prediction, even though the conversion process from the first intra-color-difference prediction mode to the second intra-color-difference prediction mode after step S3003 is executed, values do not change. Therefore, in condition determination of step S3001, the process may proceed to step S3002, in the cases of the vertical prediction and the horizontal prediction.

A derivation process sequence when the first intra-color-difference prediction mode corresponding to the conversion table of FIG. 17 is converted into the second intra-color-difference prediction mode at the color-difference format 4:2:2 will be described using a flowchart of FIG. 24.

When the prediction is not the angle prediction, that is, the first intra-prediction mode IntraPredMode1 is smaller than or equal to 1 (NO of step S3101 of FIG. 24), the value of the first intra-prediction mode IntraPredMode1 is used directly as the second intra-color-difference prediction mode IntraPredMode2 (step S3102 of FIG. 24) and this derivation process ends.

Meanwhile, when the first intra-color-difference prediction mode IntraPredMode1 is the angle prediction, that is, larger than 1 (YES of step S3101 of FIG. 24), a conversion process from the first intra-color-difference prediction mode to the second intra-color-difference prediction mode after step S3103 is executed.

Figure 32:
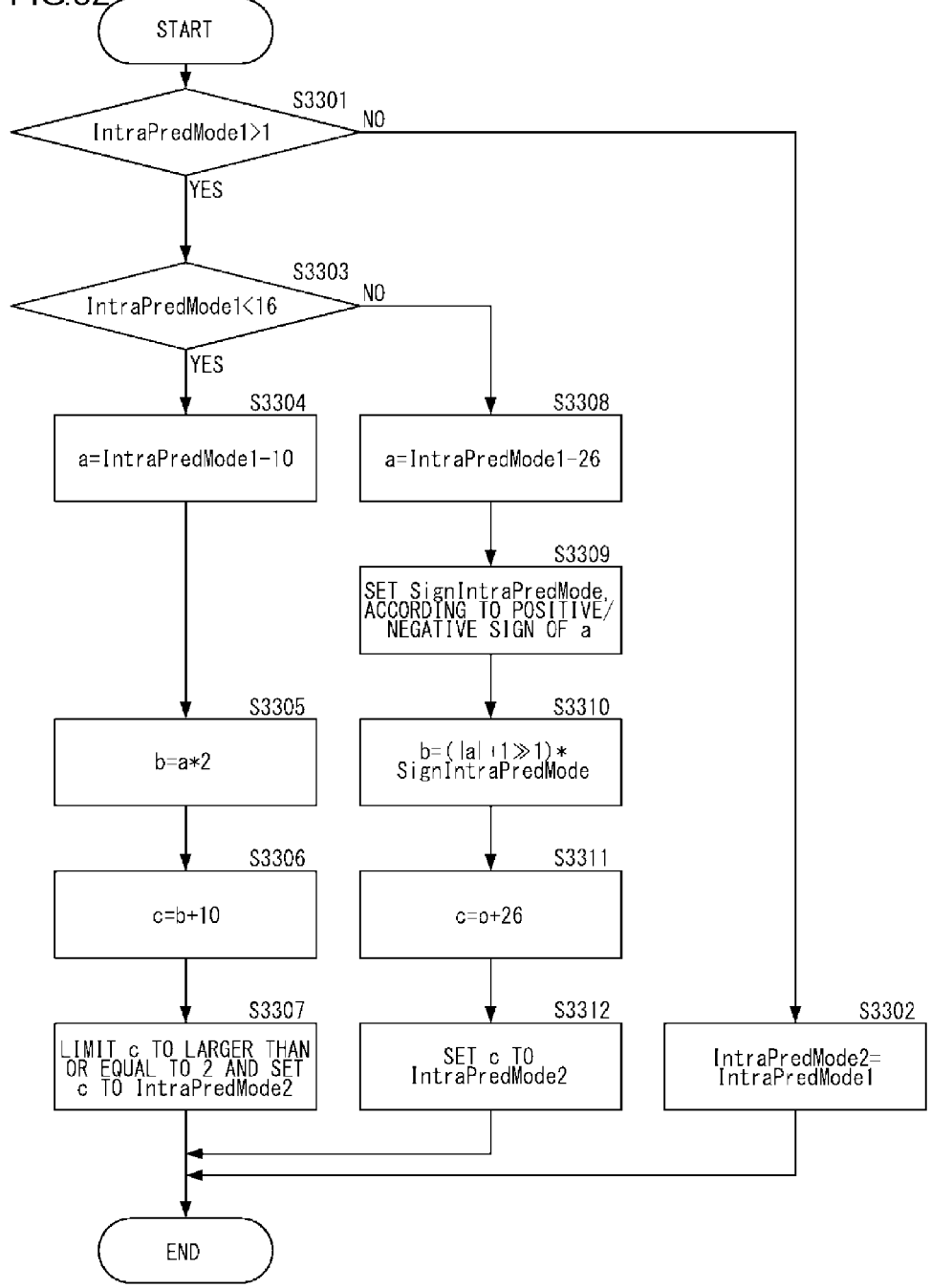
FIG. 32 is a diagram illustrating a derivation process sequence when a first intra-color-difference prediction mode is converted into a second intra-color-difference prediction mode, corresponding to the conversion table of FIG. 30 defined in this embodiment.

When the first intra-color-difference prediction mode IntraPredMode1 is smaller than 18 (YES of step S3103 of FIG. 24), a value derived by scaling the first intra-color-difference prediction mode derived by the table of FIG. 14 two times in the vertical direction on the basis of the horizontal prediction (intra-prediction mode 10) is set to a value of the second intra-color-difference prediction mode (steps S3304 to S3307 of FIG. 32). A value obtained by subtracting 10 showing the horizontal prediction from the first intra-color-difference prediction mode IntraPredMode1 is set to a variable a (step S3104 of FIG. 24). Next, a value obtained by doubling the variable a is set to a variable b (step S3105 of FIG. 24). Next, a value obtained by adding 10 showing the horizontal prediction to b is set to a variable c (step S3106 of FIG. 24). Next, a value obtained by limiting the value of the variable c to larger than or equal to 2 and smaller than or equal to 18 is set to the second intra-prediction mode IntraPredMode2 (step S3107 of FIG. 24) and this derivation process ends. Specifically, when the variable c is larger than or equal to 2 and is smaller than 18, the variable c is set directly to the value of the intra-prediction mode IntraPredMode2, when the variable c is smaller than 2, 2 is set to of the intra-prediction mode IntraPredMode2, and when the variable c is more than 18, 18 is set to the intra-prediction mode IntraPredMode2. That is, when a value derived by scaling a mode number of the angle prediction of the first intra-color-difference prediction mode is beyond a range of mode numbers of the angle prediction defined by the intra-prediction mode, the derived value is set to a value in the range. As a result, when an intra-prediction operation of the color-difference signal at the color-difference format 4:2:2 is mounted by hardware, the intra-prediction operation using the second intra-color-difference prediction mode can be executed without adding the hardware.

Figure 24:
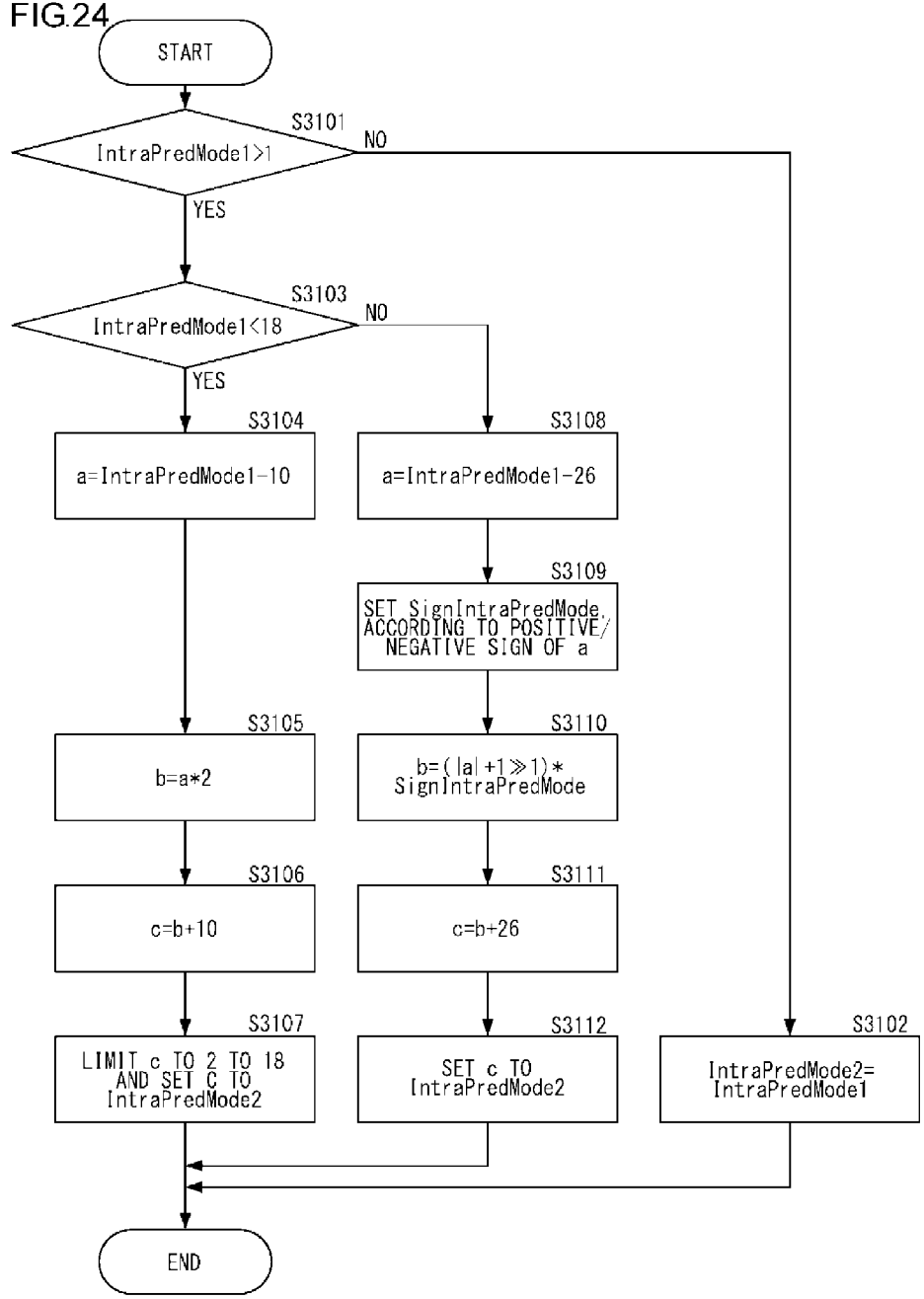
FIG. 24 is a diagram illustrating a derivation process sequence when a first intra-color-difference prediction mode is converted into a second intra-color-difference prediction mode, corresponding to the conversion table of FIG. 17 defined in this embodiment.

Meanwhile, when the first intra-color-difference prediction mode IntraPredMode1 is not smaller than 18, that is, larger than or equal to 18 (NO of step S3103 of FIG. 24), a value derived by scaling the first intra-color-difference prediction mode derived by the table of FIG. 14 ½ times in the horizontal direction on the basis of the vertical prediction (intra-prediction mode 26) is set to a value of the second intra-color-difference prediction mode (steps S3108 to S3112 of FIG. 24). A value obtained by subtracting 26 showing the vertical prediction from the first intra-color-difference prediction mode IntraPredMode1 is set to the variable a (step S3108 of FIG. 24). Next, a value is set to a variable SignIntraPredMode having a value of −1 when a sign of the variable a is negative and a value of 1 when the sign is positive or the variable a is 0 (step S3109 of FIG. 24). Next, a result obtained by executing an operation to shift one bit to the right, equivalent to ½ times, on an absolute value of the variable a, is multiplied with the variable SignIntraPredMode and an obtained value is set to the variable b (step S3110 of FIG. 24). Also, a result obtained by executing the operation to shift one bit to the right, equivalent to ½ times, on the absolute value of the variable a after adding 1 to the absolute value, may be multiplied with the variable SignIntraPredMode and an obtained value may be set to the variable b. Next, a value obtained by adding 26 showing the vertical prediction to b is set to the variable c (step S3111 of FIG. 24). Next, the value of the variable c is set to the second intra-prediction mode IntraPredMode2 (step S3112 of FIG. 24) and this derivation process ends. In the case in which the value of the variable c corresponding to the first intra-color-difference prediction mode of 25 becomes 26, the first intra-color-difference prediction mode is set to 25 when 25 is converted into the second intra-color-difference prediction mode, excluding 26 showing the vertical prediction in which coding can be performed at all times. In the case in which the value of the variable c corresponding to the first intra-color-difference prediction mode of 27 becomes 26, the first intra-color-difference prediction mode is set to 27 when 27 is converted into the second intra-color-difference prediction mode, excluding 26 showing the vertical prediction in which coding can be performed at all times. That is, the value is rounded off (converted) to exclude values (0, 1, 10, 26, and 34) that can be derived from syntax elements (0, 1, 2, and 3 of FIGS. 14 and 25) of the intra-color-difference prediction modes selected when the value of the intra-brightness prediction mode and the value of the intra-color-difference prediction mode are not matched with each other.

By this setting, a selection width of the intra-color-difference prediction mode is extended and coding efficiency can be improved. In this derivation process sequence, to convert the value to exclude a value 26 that can be derived from a syntax element (1 of FIGS. 14 and 25) of the intra-color-difference prediction mode selected when the value of the intra-brightness prediction mode and the value of the intra-color-difference prediction mode are not matched with each other, in step S3110, 1 is added to the absolute value of the variable a, before the operation to shift one bit to the right is executed on the absolute value of the variable a.

A derivation process sequence when the first intra-color-difference prediction mode corresponding to the conversion table of FIG. 30 is converted into the second intra-color-difference prediction mode at the color-difference format 4:2:2 will be described using a flowchart of FIG. 32.

When the prediction is not the angle prediction, that is, the first intra-prediction mode IntraPredMode1 is smaller than or equal to 1 (NO of step S3301 of FIG. 32), the value of the first intra-prediction mode IntraPredMode1 is used directly as the second intra-color-difference prediction mode IntraPredMode2 (step S3302 of FIG. 32) and this derivation process ends.

Meanwhile, when the first intra-color-difference prediction mode IntraPredMode1 is the angle prediction, that is, larger than 1 (YES of step S3301 of FIG. 32), a conversion process from the first intra-color-difference prediction mode to the second intra-color-difference prediction mode after step S3303 is executed.

When the first intra-color-difference prediction mode IntraPredMode1 is smaller than 16, that is, smaller than or equal to 15 (YES of step S3303 of FIG. 32), a value derived by scaling the first intra-color-difference prediction mode derived by the table of FIG. 14 two times in the vertical direction on the basis of the horizontal prediction (intra-prediction mode 10) and limiting the value to larger than or equal to 2 is set to a value of the second intra-color-difference prediction mode (steps S3304 to S3307 of FIG. 32). A value obtained by subtracting 10 showing the horizontal prediction from the first intra-color-difference prediction mode IntraPredMode1 is set to a variable a (step S3304 of FIG. 32). Next, a value obtained by doubling the variable a is set to a variable b (step S3305 of FIG. 32). Next, a value obtained by adding 10 showing the horizontal prediction to b is set to a variable c (step S3306 of FIG. 32). Next, a value obtained by limiting the value of the variable c to larger than or equal to 2 is set to the second intra-prediction mode IntraPredMode2 (step S3307 of FIG. 32) and this derivation process ends. Specifically, when the variable c is smaller than or equal to 2, the value of the intra-prediction mode IntraPredMode2 is set to 2. That is, when a value derived by scaling a mode number of the angle prediction of the first intra-color-difference prediction mode is beyond a range of mode numbers of the angle prediction defined by the intra-prediction mode, the derived value is set to a value in the range. As a result, when an intra-prediction operation of the color-difference signal at the color-difference format 4:2:2 is mounted by hardware, the intra-prediction operation using the second intra-color-difference prediction mode can be executed without adding the hardware.

Meanwhile, when the first intra-color-difference prediction mode IntraPredMode1 is not smaller than 16, that is, larger than or equal to 16 (NO of step S3303 of FIG. 32), a value derived by scaling the first intra-color-difference prediction mode derived by the table of FIG. 14 ½ times in the horizontal direction on the basis of the vertical prediction (intra-prediction mode 26) is set to a value of the second intra-color-difference prediction mode (steps S3308 to S3312 of FIG. 32). A value obtained by subtracting 26 showing the vertical prediction from the first intra-color-difference prediction mode IntraPredMode1 is set to a variable a (step S3308 of FIG. 32). Next, a value is set to the variable SignIntraPredMode having a value of −1 when a sign of the variable a is negative and a value of 1 when the sign is positive or the variable a is 0 (step S3309 of FIG. 32). Next, a result obtained by executing an operation to shift one bit to the right, equivalent to ½ times, on an absolute value of the variable a is multiplied with the variable SignIntraPredMode and an obtained value is set to the variable b (step S3310 of FIG. 32). Also, a result obtained by executing the operation to shift one bit to the right, equivalent to ½ times, on the absolute value of the variable a after adding 1 to the absolute value may be multiplied with the variable SignIntraPredMode and an obtained value may be set to the variable b. Next, a value obtained by adding 26 showing the vertical prediction to b is set to the variable c (step S3311 of FIG. 32). Next, the value of the variable c is set to the second intra-prediction mode IntraPredMode2 (step S3312 of FIG. 32) and this derivation process ends. In the case in which the value of the variable c corresponding to the first intra-color-difference prediction mode of 25 becomes 26, the first intra-color-difference prediction mode is set to 25 when 25 is converted into the second intra-color-difference prediction mode, excluding 26 showing the vertical prediction in which coding can be performed at all times. In the case in which the value of the variable c corresponding to the first intra-color-difference prediction mode of 27 becomes 26, the first intra-color-difference prediction mode is set to 27 when 27 is converted into the second intra-color-difference prediction mode, excluding 26 showing the vertical prediction in which coding can be performed at all times. In other words, when the first intra-color-difference prediction mode is converted into the second intra-color-difference prediction mode using the conversion tables illustrated in FIGS. 15, 16, 17, 30, and 33, in the case in which the first intra-color-difference prediction mode is not 26 to be the vertical prediction, the value is converted into a value other than 26 to be the vertical prediction and the second intra-color-difference prediction mode is derived from the first intra-color-difference prediction mode. That is, the value is rounded off (converted) to exclude values (0, 1, 10, 26, and 34) that can be derived from syntax elements (0, 1, 2, and 3 of FIGS. 14 and 25) of the intra-color-difference prediction modes selected when the value of the intra-brightness prediction mode and the value of the intra-color-difference prediction mode are not matched with each other. In this derivation process sequence, to convert the value to exclude a value 26 that can be derived from a syntax element (1 of FIGS. 14 and 25) of the intra-color-difference prediction mode selected when the value of the intra-brightness prediction mode and the value of the intra-color-difference prediction mode are not matched with each other, in step S3310, 1 is added to the absolute value of the variable a, before the operation to shift one bit to the right is executed on the absolute value of the variable a.

In step S3303 of this derivation process sequence, when the intra-color-difference prediction mode IntraPredMode1 is smaller than 16, that is, smaller than or equal to 15, a value derived by scaling the first intra-color-difference prediction mode two times in the vertical direction on the basis of the horizontal prediction (intra-prediction mode 10) and limiting the value to larger than or equal to 2 is set to a value of the second intra-color-difference prediction mode (steps S3304 to S3307 of FIG. 32). When the intra-color-difference prediction mode IntraPredMode1 is not smaller than 16, that is, larger than or equal to 16, a value derived by scaling the first intra-color-difference prediction mode ½ times in the horizontal direction on the basis of the vertical prediction (intra-prediction mode 26) is set to a value of the second intra-color-difference prediction mode (steps S3308 to S3312 of FIG. 32). However, when the intra-color-difference prediction mode IntraPredMode1 is smaller than 15, that is, smaller than or equal to 14, a value derived by scaling the first intra-color-difference prediction mode two times in the vertical direction on the basis of the horizontal prediction (intra-prediction mode 10) is set to a value of the second intra-color-difference prediction mode (steps S3304 to S3307 of FIG. 32). When the intra-color-difference prediction mode IntraPredMode1 is not smaller than 15, that is, larger than or equal to 15, a value derived by scaling the first intra-color-difference prediction mode ½ times in the horizontal direction on the basis of the vertical prediction (intra-prediction mode 26) may be set to a value of the second intra-color-difference prediction mode (steps S3308 to S3312 of FIG. 32) and the conversion result is the same. This is because a value derived by scaling the first intra-color-difference prediction mode two times in the vertical direction on the basis of the horizontal prediction (intra-prediction mode 10) and a value derived by scaling the first intra-color-difference prediction mode ½ times in the horizontal direction on the basis of the vertical prediction (intra-prediction mode 26) are equal to each other, when the intra-color-difference prediction mode IntraPredMode1 is 15.

Next, a derivation process sequence when the first intra-color-difference prediction mode corresponding to the conversion table of FIG. 33 is converted into the second intra-color-difference prediction mode at the color-difference format 4:2:2 will be described using a flowchart of FIG. 35.

When the prediction is not the angle prediction, that is, the first intra-prediction mode IntraPredMode1 is 1 or less (NO of step S3401 of FIG. 35), the value of the first intra-prediction mode IntraPredMode1 is used directly as the second intra-color-difference prediction mode IntraPredMode2 (step S3402 of FIG. 35) and this derivation process ends.

Meanwhile, when the first intra-color-difference prediction mode IntraPredMode1 is the angle prediction, that is, larger than 1 (YES of step S3401 of FIG. 35), a conversion process from the first intra-color-difference prediction mode to the second intra-color-difference prediction mode after step S3403 is executed.

Figure 35:
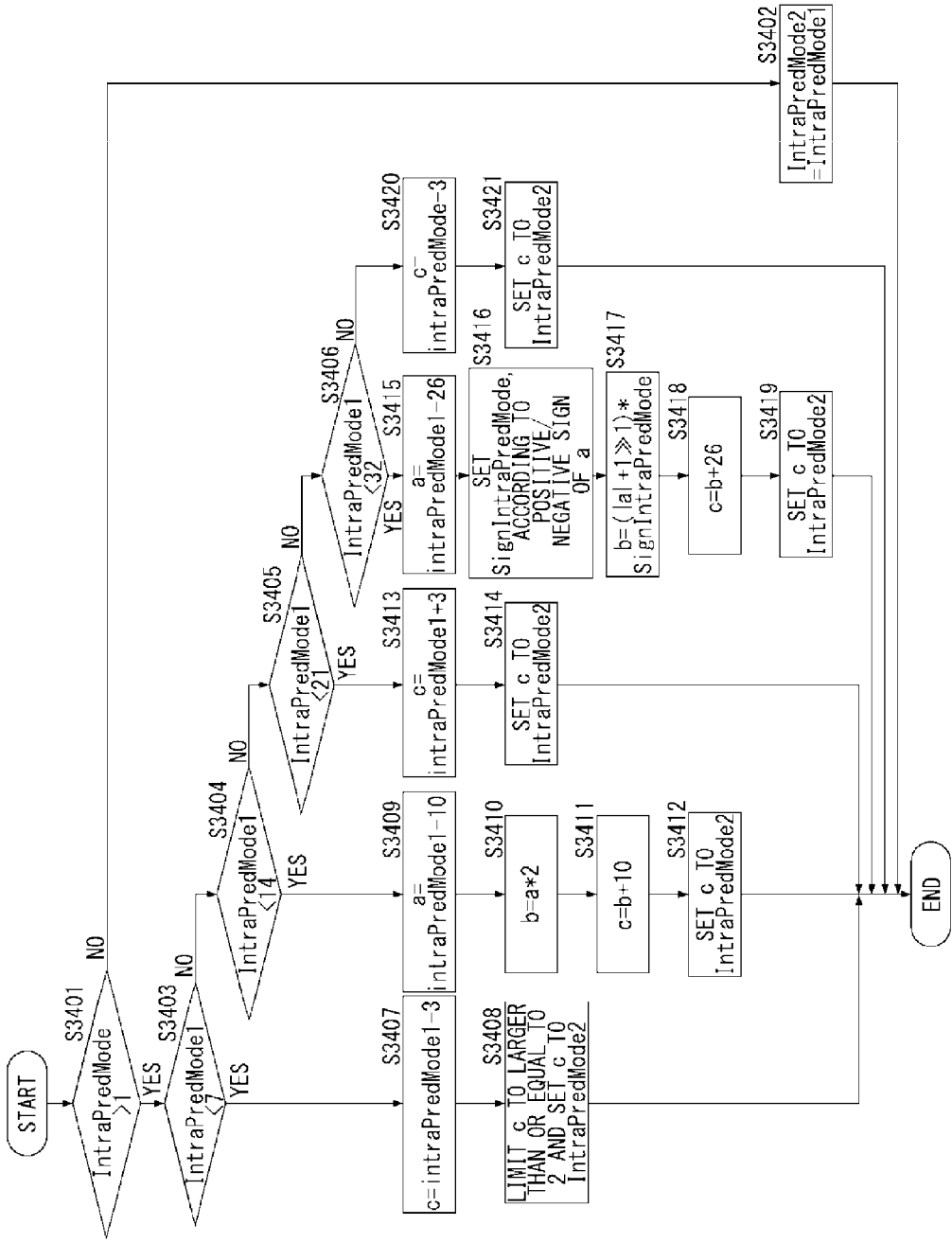
FIG. 35 is a diagram illustrating a derivation process sequence when a first intra-color-difference prediction mode is converted into a second intra-color-difference prediction mode, corresponding to the conversion table of FIG. 33 defined in this embodiment.

When the first intra-color-difference prediction mode IntraPredMode1 is smaller than 7, that is, smaller than or equal to 6 (YES of step S3403 of FIG. 35), a value obtained by subtracting 3 showing the horizontal prediction from the first intra-color-difference prediction mode IntraPredMode1 is set to a variable c (step S3407 of FIG. 35). Next, a value obtained by limiting the value of the variable c to larger than or equal to 2 is set to the second intra-prediction mode IntraPredMode2 (step S3408 of FIG. 35) and this derivation process ends. Specifically, when the variable c is larger than or equal to 2, the variable c is set directly to the intra-prediction mode IntraPredMode2 and when the variable c is smaller than 2, 2 is set to the intra-prediction mode IntraPredMode2. That is, when a value derived by scaling a mode number of the angle prediction of the first intra-color-difference prediction mode is beyond a range of mode numbers of the angle prediction defined by the intra-prediction mode, the derived value is set to a value in the range. As a result, when an intra-prediction operation of the color-difference signal at the color-difference format 4:2:2 is mounted by hardware, the intra-prediction operation using the second intra-color-difference prediction mode can be executed without adding the hardware.

Meanwhile, when the first intra-color-difference prediction mode IntraPredMode1 is not smaller than 7 and the first intra-color-difference prediction mode IntraPredMode1 is smaller than 14, that is, larger than or equal to 7 and smaller than or equal to 13 (NO of step S3403 and YES of step S3404 in FIG. 35), a value derived by scaling the first intra-color-difference prediction mode derived by the table of FIG. 14 two times in the vertical direction on the basis of the horizontal prediction (intra-prediction mode 10) is set to a value of the second intra-color-difference prediction mode (steps S3409 to S3412 of FIG. 35). A value obtained by subtracting 10 showing the horizontal prediction from the first intra-color-difference prediction mode IntraPredMode1 is set to a variable a (step S3409 of FIG. 35). Next, a value obtained by doubling the variable a is set to the variable b (step S3410 of FIG. 35). Next, a value obtained by adding 10 showing the horizontal prediction to b is set to the variable c (step S3411 of FIG. 35). Next, the value of the variable c is set to the second intra-prediction mode IntraPredMode2 (step S3412 of FIG. 35) and this derivation process ends.

Meanwhile, when the first intra-color-difference prediction mode IntraPredMode1 is not smaller than 14 and is smaller than 21, that is, larger than or equal to 14 and smaller than or equal to 20 (NO of step S3404 and YES of step S3405 in FIG. 35), a value obtained by adding 3 to the first intra-color-difference prediction mode IntraPredMode1 is set to the variable c (step S3413 of FIG. 35). Next, the value of the variable c is set to the second intra-prediction mode IntraPredMode2 (step S3414 of FIG. 35) and this derivation process ends.

Meanwhile, when the first intra-color-difference prediction mode IntraPredMode1 is not smaller than 21 and is smaller than 32, that is, larger than or equal to 21 and smaller than or equal to 31 (NO of step S3405 and YES of step S3406 in FIG. 35), a value derived by scaling the first intra-color-difference prediction mode derived by the table of FIG. 14 ½ times in the horizontal direction on the basis of the vertical prediction (intra-prediction mode 26) is set to a value of the second intra-color-difference prediction mode (steps S3415 to S3419 of FIG. 35). A value obtained by subtracting 26 showing the vertical prediction from the first intra-color-difference prediction mode IntraPredMode1 is set to a variable a (step S3415 of FIG. 35). Next, a value is set to the variable SignIntraPredMode having a value of −1 when a sign of the variable a is negative and a value of 1 when the sign is positive or the variable a is 0 (step S3416 of FIG. 35). Next, a result obtained by executing an operation to shift one bit to the right, equivalent to ½ times, on an absolute value of the variable a is multiplied with the variable SignIntraPredMode and an obtained value is set to the variable b (step S3417 of FIG. 35). Also, a result obtained by executing the operation to shift one bit to the right, equivalent to ½ times, on the absolute value of the variable a after adding 1 to the absolute value may be multiplied with the variable SignIntraPredMode and an obtained value may be set to the variable b. Next, a value obtained by adding 26 showing the vertical prediction to b is set to the variable c (step S3418 of FIG. 35) Next, the value of the variable c is set to the second intra-prediction mode IntraPredMode2 (step S3419 of FIG. 35) and this derivation process ends. In the case in which the value of the variable c corresponding to the first intra-color-difference prediction mode of 25 becomes 26, the first intra-color-difference prediction mode is set to 25 when 25 is converted into the second intra-color-difference prediction mode, excluding 26 showing the vertical prediction in which coding can be performed at all times. In the case in which the value of the variable c corresponding to the first intra-color-difference prediction mode of 27 becomes 26, the first intra-color-difference prediction mode is set to 27 when 27 is converted into the second intra-color-difference prediction mode, excluding 26 showing the vertical prediction in which coding can be performed at all times. That is, the value is rounded off (converted) to exclude values (0, 1, 10, 26, and 34) that can be derived from syntax elements (0, 1, 2, and 3 of FIGS. 14 and 25) of the intra-color-difference prediction modes selected when the value of the intra-brightness prediction mode and the value of the intra-color-difference prediction mode are not matched with each other. In this derivation process sequence, to convert the value to exclude a value 26 that can be derived from a syntax element (1 of FIGS. 14 and 25) of the intra-color-difference prediction mode selected when the value of the intra-brightness prediction mode and the value of the intra-color-difference prediction mode are not matched with each other, in step S3417, 1 is added to the absolute value of the variable a, before the operation to shift one bit to the right is executed on the absolute value of the variable a.

Meanwhile, when the first intra-color-difference prediction mode IntraPredMode1 is not smaller than 32, that is, larger than or equal to 32 (NO of step S3416 of FIG. 35), a value derived by subtracting 3 from the first intra-color-difference prediction mode IntraPredMode1 is set to the variable c (step S3420 of FIG. 35). Next, the value of the variable c is set to the second intra-prediction mode IntraPredMode2 (step S3421 of FIG. 35) and this derivation process ends.

In step S3403 of this derivation process sequence, when the intra-color-difference prediction mode IntraPredMode1 is smaller than or equal to 6, a value obtained by limiting a value obtained by subtracting 3 from the first intra-color-difference prediction mode to larger than or equal to 2 is set to the second intra-color-difference prediction mode. However, even when the condition determination of step S3403 is omitted for the simplification and the intra-color-difference prediction mode IntraPredMode1 is smaller than or equal to 6, similarly to when the intra-color-difference prediction mode IntraPredMode1 is larger than or equal to 7 and smaller than or equal to 13, a value derived by scaling the first intra-color-difference prediction mode two times in the vertical direction on the basis of the horizontal prediction (intra-prediction mode 10) can be set to a value of the second intra-color-difference prediction mode (steps S3409 to S3412 of FIG. 35). However, in step S3412, a value obtained by limiting the variable c derived by step S3411 to larger than or equal to 2 is set to the second intra-color-difference prediction mode, similarly to S3408.

In addition, in step S3406 of this derivation process sequence, when the intra-color-difference prediction mode IntraPredMode1 is larger than or equal to 32, a value obtained by subtracting 3 from the first intra-color-difference prediction mode is set to the second intra-color-difference prediction mode. However, even when the condition determination of step S3406 is omitted for the simplification and the intra-color-difference prediction mode IntraPredMode1 is larger than or equal to 32, similarly to when the intra-color-difference prediction mode IntraPredMode1 is larger than or equal to 21 and smaller than or equal to 31, a value derived by scaling the first intra-color-difference prediction mode ½ times in the horizontal direction on the basis of the vertical prediction (intra-prediction mode 26) can be set to a value of the second intra-color-difference prediction mode (steps S3415 to S3419 of FIG. 35).

Meanwhile, when the color-difference format is 4:2:0 or 4:4:4, because the sampling ratios of the intra-prediction direction of the brightness signal and the horizontal direction and the vertical direction of the color-difference signal are matched with each other, it is not necessary to convert the first intra-color-difference prediction mode derived by the table of FIG. 14 into the second intra-color-difference prediction mode. This will be described with reference to FIGS. 22A and 22B. FIGS. 22A and 22B are a diagram illustrating a correspondence relation of prediction directions of intra-predictions of a brightness signal and a color-difference signal when the color-difference format is 4:2:0. FIG. 22A illustrates an arrangement of the brightness signal and the color-difference signal when the color-difference format is 4:2:0 and a color-difference signal is sampled at a density of ½ in both horizontal and vertical directions, with respect to a brightness signal, and aspect ratios of pixels of the brightness signal and the color-difference signal are equal to each other. An arrow extended from a pixel P4 to a pixel P5, shown by a symbol 2704, shows an intra-prediction direction of the pixel P4 of the brightness signal. An arrow extended from a pixel P1 to a pixel P2, shown by a symbol 2705, shows an intra-prediction direction of the pixel P1 of the color-difference signal. The arrow extended from the pixel P4 to the pixel P5, shown by the symbol 2704, and the arrow extended from the pixel P1 to the pixel P2, shown by the symbol 2705, extend in the same direction and the intra-prediction directions are the same. In this case, in an array of the color-difference signals illustrated in FIG. 22B, the intra-prediction direction of the brightness signal is the intra-prediction direction of the color-difference signal as shown by a symbol 2706 and the pixel P2 of the reference destination of the pixel P1 of the color-difference signal can be surely referred to.

When the value of the intra-color-difference prediction mode is predicted in the intra-predictor 103 in consideration of the points described above, a value of the intra-color-difference prediction mode is predicted from a value of the intra-brightness prediction mode of the prediction block of the same position as the prediction block of the color-difference signal, according to the color-difference format. That is, when the value of the intra-color-difference prediction mode is predicted at the color-difference format 4:2:0 or 4:4:4 in which aspect ratios of the pixels of the brightness signal and the color-difference signal are the same, the value of the intra-color-difference prediction mode obtained from the table of FIG. 14 is used directly as the value of the intra-color-difference prediction mode for the color-difference format 4:2:0 or 4:4:4 and the intra-prediction of the color-difference signal is performed according to the intra-color-difference prediction mode. When the value of the intra-color-difference prediction mode is predicted at the color-difference format 4:2:2, a value of the intra-color-difference prediction mode for the color-difference format 4:2:2 is derived from the value of the intra-color-difference prediction mode obtained from the table of FIG. 14 by the conversion table illustrated in FIG. 15, 16, 17, 30, or 33 and the intra-prediction of the color-difference signal is performed according to the intra-color-difference prediction mode.

FIG. 25 is a table to derive a value of a syntax element intra_chroma_pred_mode[x0][y0] regarding an intra-color-difference prediction mode from a value of an intra-color-difference prediction mode and a value of an intra-brightness prediction mode of a prediction block of a brightness signal of the same position as a prediction block of a color-difference signal and the table of FIG. 25 used at the coding side corresponds to the table of FIG. 14 used at the decoding side. At the coding side, a value of the syntax element intra_chroma_pred_mode[x0][y0] is derived using the table illustrated in FIG. 25.

In the case in which the value of the first or second intra-color-difference prediction mode is 0, if the value of the intra-brightness prediction mode of the prediction block of the same position as the prediction block of the color-difference signal is not 0, the value of the syntax element intra_chroma_pred_mode[x0][y0] takes a value of 0 and if the value of the intra-brightness prediction mode is 0, the value of the syntax element intra_chroma_pred_mode[x0][y0] takes a value of 4.

In the case in which the value of the first or second intra-color-difference prediction mode is 26, if the value of the intra-brightness prediction mode of the prediction block of the same position as the prediction block of the color-difference signal is not 26, the value of the syntax element intra_chroma_pred_mode[x0][y0] takes a value of 1 and if the value of the intra-brightness prediction mode is 26, the value of the syntax element intra_chroma_pred_mode[x0][y0] takes a value of 4.

In the case in which the value of the first or second intra-color-difference prediction mode is 10, if the value of the intra-brightness prediction mode of the prediction block of the same position as the prediction block of the color-difference signal is not 10, the value of the syntax element intra_chroma_pred_mode[x0][y0] takes a value of 2 and if the value of the intra-brightness prediction mode is 10, the value of the syntax element intra_chroma_pred_mode[x0][y0] takes a value of 4.

In the case in which the value of the first or second intra-color-difference prediction mode is 1, if the value of the intra-brightness prediction mode of the prediction block of the same position as the prediction block of the color-difference signal is not 10, the value of the syntax element intra_chroma_pred_mode[x0][y0] takes a value of 3 and if the value of the intra-brightness prediction mode is 10, the value of the syntax element intra_chroma_pred_mode[x0][y0] takes a value of 4.

In the case in which the value of the first intra-color-difference prediction mode is 34, if the value of the intra-brightness prediction mode of the prediction block of the same position as the prediction block of the color-difference signal is not 0, the value of the syntax element intra_chroma_pred_mode[x0][y0] takes a value of 0, if the value of the intra-brightness prediction mode is 1, the value of the syntax element intra_chroma_pred_mode[x0][y0] takes a value of 1, if the value of the intra-brightness prediction mode is 2, the value of the syntax element intra_chroma_pred_mode[x0][y0] takes a value of 2, if the value of the intra-brightness prediction mode is 3, the value of the syntax element intra_chroma_pred_mode[x0][y0] takes a value of 3, and if the value of the intra-brightness prediction mode is 34, the value of the syntax element intra_chroma_pred_mode[x0][y0] takes a value of 4.

When the value of the first intra-color-difference prediction mode is equal to the value of the intra-brightness prediction mode of the prediction block of the same position as the prediction block of the color-difference signal, the value of the syntax element intra_chroma_pred_mode[x0][y0] takes a value of 4. However, when the value of the intra-color-difference prediction mode is predicted at the color-difference format 4:2:2, in the intra-predictor 103, the second intra-color-difference prediction mode for the color-difference format 4:2:2 is derived from the first intra-color-difference prediction mode for the color-difference format 4:2:0 or 4:4:4 by the conversion table illustrated in FIG. 15, 16, 17, 30, or 33. The second intra-color-difference prediction mode is used for the intra-prediction of the color-difference signal for the color-difference format 4:2:2.

When the prediction block of the same position as the prediction block of the color-difference signal is specified, the prediction block may be specified by referring to a division index PartIdx to specify each prediction block and may be specified by referring to the coordinates showing a position of each prediction block.

The number of intra-color-difference prediction modes of the prediction block in the coding block is different according to a combination of a division mode and a color-difference format supplied from the color-difference format setter 101. When the division mode is 2N×2N division, a value of a syntax element regarding an intra-color-difference prediction mode of one prediction block is derived for each coding block, regardless of a type of the color-difference format.

Figure 11:
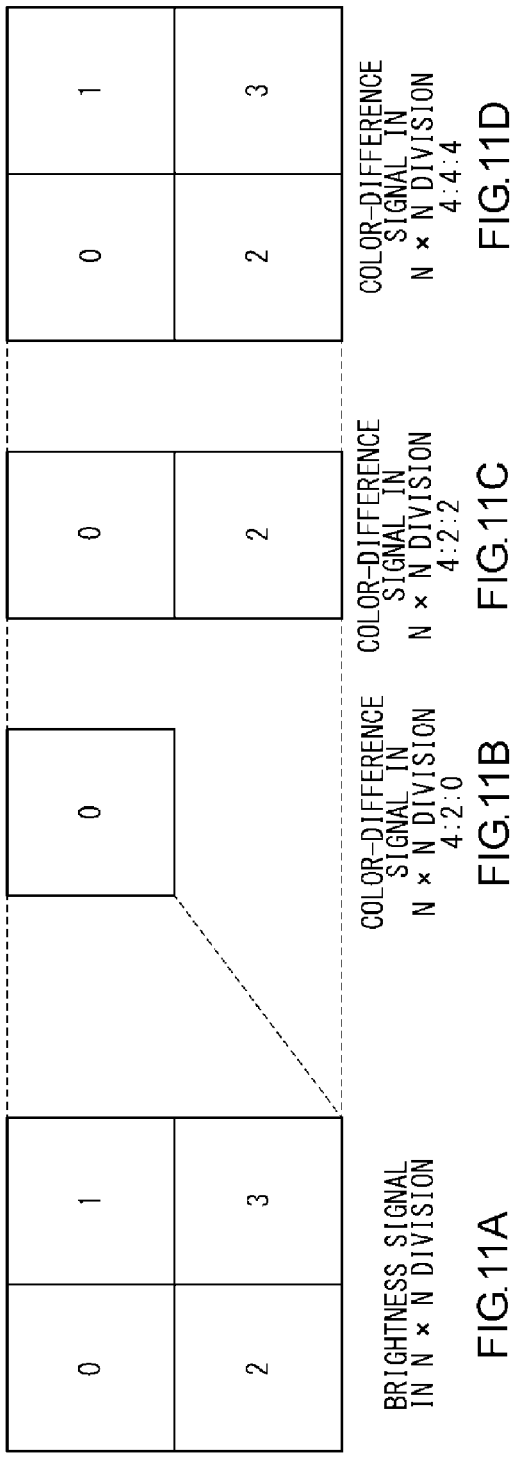
FIGS. 11A to 11D is a diagram illustrating a division method of a color-difference signal of a coding block in N×N division at the time of intra-prediction defined in this embodiment.

When the division mode is N×N division and the color-difference format is 4:2:0, a value of a syntax element regarding an intra-color-difference prediction mode of one prediction block is derived for each coding block. When the division mode is the N×N division and the color-difference format is 4:2:2, values of syntax elements regarding intra-color-difference prediction modes of two prediction blocks are derived for each coding block. When the division mode is the N×N division and the color-difference format is 4:4:4, values of syntax elements regarding intra-color-difference prediction modes of four prediction blocks are derived for each coding block. FIG. 11A to 11D is a diagram illustrating a method of dividing a color-difference signal of a coding block in the N×N division when the intra-prediction is performed into a prediction block. FIG. 11A illustrates a brightness signal in the N×N division, FIG. 11B illustrates a color-difference signal in the N×N division when the color-difference format is 4:2:0, FIG. 11C illustrates a color-difference signal in the N×N division when the color-difference format is 4:2:2, and FIG. 11D illustrates a color-difference signal in the N×N division when the color-difference format is 4:4:4. When the color-difference formats are 4:2:0 and 4:4:4, a coding block of the brightness signal and a coding block of the color-difference signal are similar to each other and aspect ratios of both blocks are matched with each other. When the color-difference format is 4:2:2, a coding block of the brightness signal and a coding block of the color-difference signal are not similar to each other and aspect ratios of both coding blocks are different from each other. Similarly to when the color-difference format is 4:2:0, when the color-difference format is 4:2:2 or 4:4:4, a coding block can be used as one prediction block without dividing the coding block, in a color-difference signal in which the division mode is the N×N division. Similarly to when the color-difference format is 4:0:0, when the color-difference format is 4:2:2 or 4:4:4, a coding block can be used as one prediction block without dividing the coding block, in a color-difference signal in which the division mode is the N×N division.

When a prediction mode (PredMode) of a coding block is inter-prediction (MODE_INTER), the syntax element deriver 124 regarding the inter-prediction information derives a value of a syntax element regarding inter-prediction information of a prediction block unit and supplies the derived value of each syntax element to the entropy coder 126. The inter-prediction information of the prediction block unit includes information such as inter-prediction modes (L0 prediction, L1 prediction, and both predictions), indexes to specify a plurality of reference pictures, and a motion vector.

The entropy coder 126 performs entropy coding on a value of a syntax element regarding the coding information of the coding block unit supplied from the syntax element deriver 121 regarding the coding information of the coding block unit, a value of a syntax element regarding the intra-brightness prediction mode of the prediction block of the brightness signal supplied from the syntax element deriver 122 regarding the intra-brightness prediction mode, a value of a syntax element regarding the intra-color-difference prediction mode of the prediction block of the color-difference signal supplied from the syntax element deriver 123 regarding the intra-color-difference prediction mode, and a value of a syntax element regarding the intra-prediction information of the prediction block unit supplied from the syntax element deriver 124 regarding the inter-prediction information, according to a prescribed syntax rule. At this time, the intra-prediction mode coding controller 125 controls order of entropy coding of the intra-brightness prediction mode and the intra-color-difference prediction mode, according to the division mode and the color-difference format, and the entropy coder 126 executes an entropy coding process of the intra-brightness prediction mode and the intra-color-difference prediction mode, in order commanded by the intra-prediction mode coding controller 125.

Figure 13:
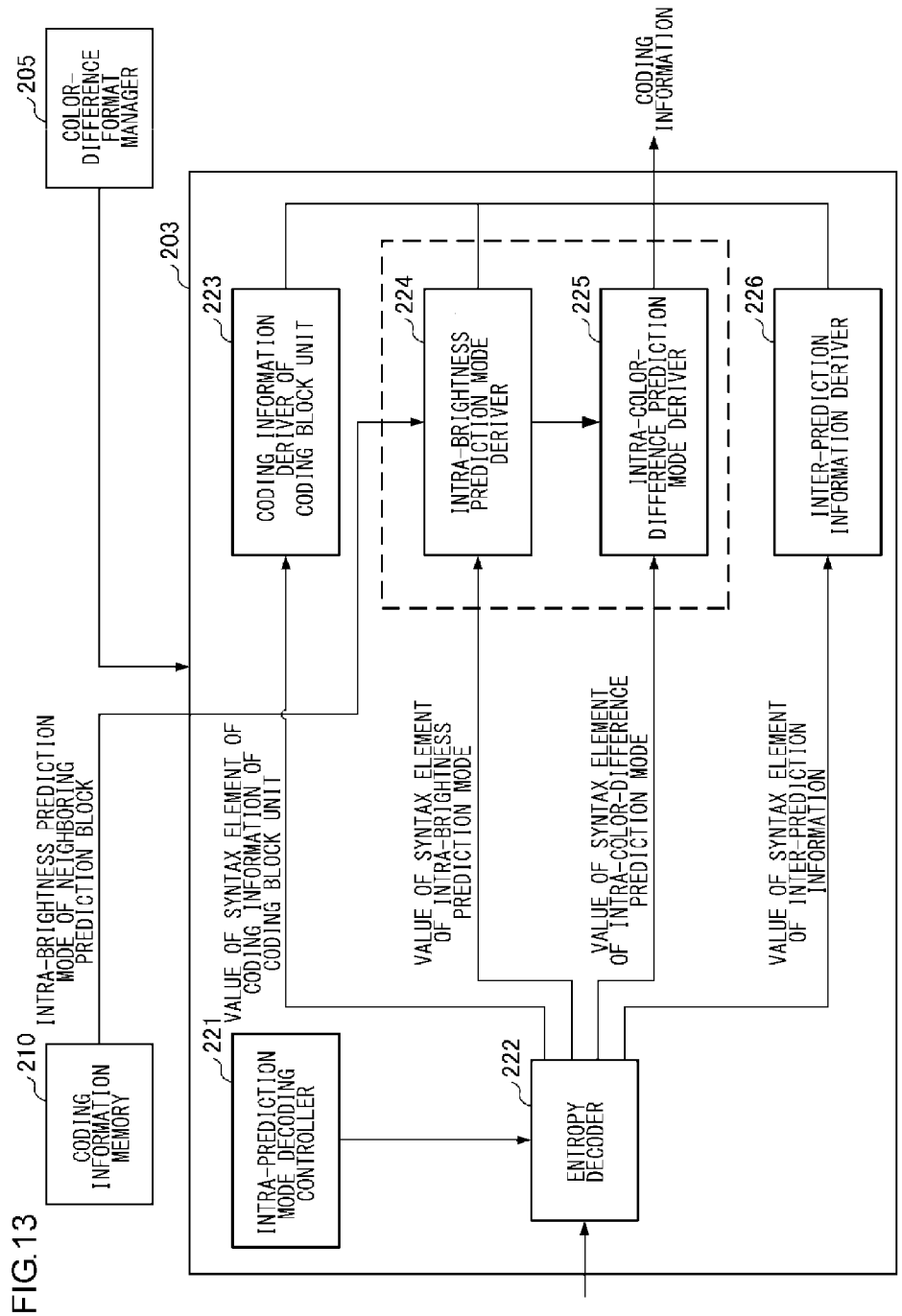
FIG. 13 is a block diagram illustrating a configuration of a second bitstream decoder of the picture decoding device according to the embodiment.

Next, a decoding process of coding information of the coding block and prediction block units executed by the second bitstream decoder 203 of FIG. 2 will be described on the basis of a point relating to the intra-prediction mode to be a characteristic of the embodiment. FIG. 13 is a block diagram illustrating a configuration of the second bitstream decoder 203 of FIG. 2.

As illustrated in FIG. 13, the second bitstream decoder 203 of FIG. 2 includes an intra-prediction mode decoding controller 221, an entropy decoder 222, a coding information deriver 223 of a coding block unit, an intra-brightness prediction mode deriver 224, an intra-color-difference prediction mode deriver 225, and an inter-prediction information deriver 226. In individual elements configuring the second bitstream decoder 203, a process according to color-difference format information supplied from the color-difference format manager 205 is executed and a process according to coding information such as a prediction mode and a division mode of a coding block unit is executed.

The entropy decoder 222 performs entropy decoding on the second bitstream including the coding information of the coding block and prediction block units supplied from the bitstream separator 201 according to the prescribed syntax rule and obtains the value of the syntax element regarding the coding information of the coding block unit, the value of the syntax element regarding the intra-brightness prediction mode of the prediction block of the brightness signal, the value of the syntax element regarding the intra-color-difference prediction mode of the prediction block of the color-difference signal, and the value of the syntax element regarding the inter-prediction information of the prediction block unit. At this time, the intra-prediction mode decoding controller 221 controls order of the entropy decoding of the intra-brightness prediction mode and the intra-color-difference prediction mode according to the division mode and the color-difference format and the entropy decoder 222 executes an entropy decoding process of the intra-brightness prediction mode and the intra-color-difference prediction mode in order commanded by the intra-prediction mode decoding controller 221. The intra-prediction mode decoding controller 221 is a controller corresponding to the intra-prediction mode coding controller 125 of the coding side. The intra-prediction mode decoding controller 221 sets decoding order of the intra-prediction mode equal to the coding order of the intra-prediction mode set by the intra-prediction mode coding controller 125 according to the division mode and the color-difference format and controls the decoding order of the intra-prediction mode of the entropy decoder 222. The entropy decoder 222 is a decoder corresponding to the entropy coder 126 of the coding side and executes an entropy decoding process according to the same rule as the syntax rule used by the entropy coder 126.

The value of the syntax element regarding the coding information of the coding block unit obtained by decoding is supplied to the coding information deriver 223 of the coding block unit, the value of the syntax element regarding the intra-brightness prediction mode of the prediction block of the brightness signal is supplied to the intra-brightness prediction mode deriver 224, the value of the syntax element regarding the intra-color-difference prediction mode of the prediction block of the color-difference signal is supplied to the intra-color-difference prediction mode deriver 225, and the value of the syntax element regarding the inter-prediction information of the prediction block unit is supplied to the inter-prediction information deriver 226.

The coding information deriver 223 of the coding block unit derives the coding information of the coding block unit from the supplied value of the syntax element regarding the coding information of the coding block unit and supplies the coding information to the intra-predictor 206 or the inter-predictor 207 through the switch 212.

The coding information deriver 223 of the coding block unit is a coding information deriver corresponding to the syntax element deriver 121 regarding the coding information of the coding block unit of the coding side and derives coding information according to a common rule at the coding side and the decoding side. Values regarding a prediction mode (PredMode) to determine intra-prediction (MODE_INTRA) or inter-prediction (MODE_INTER) of the coding block and a division mode (PartMode) to determine a shape of a prediction block are derived by the coding information deriver 223 of the coding block unit.

When the prediction mode (PredMode) of the coding block derived by the coding information deriver 223 of the coding block unit is the intra-prediction (MODE_INTRA), the intra-brightness prediction mode deriver 224 derives the intra-brightness prediction mode of the prediction block of the brightness signal from the supplied value of the syntax element regarding the intra-brightness prediction mode of the prediction block of the brightness signal, supplies the derived value to the intra-color-difference prediction mode deriver 225, and supplies the derived value to the intra-predictor 206 through the switch 212. The intra-brightness prediction mode deriver 224 is a deriver corresponding to the syntax element deriver 122 regarding the intra-brightness prediction mode of the coding side and derives the intra-brightness prediction mode according to the common rule at the coding side and the decoding side. The syntax elements regarding the intra-brightness prediction mode are a syntax element prev_intra_luma_pred_flag[x0][y0] to be a flag showing whether prediction can be performed from an intra-brightness prediction mode of a neighboring block, a syntax element mpm_idx[x0][y0] to be an index showing a prediction block of a prediction origin, and a syntax element rem_intra_luma_pred_mode[x0][y0] showing an intra-brightness prediction mode of a prediction block unit. When the intra-brightness prediction mode is derived, a correlation with an intra-brightness prediction mode of a neighboring block stored in the coding information memory 210 is used. When prediction can be performed from the intra-brightness prediction mode of the neighboring block, a syntax element prev_intra_luma_pred_flag[x0][y0] to be a flag showing that the value is used become 1 (true) and the intra-brightness prediction mode of the neighboring prediction block shown by the syntax element mpm_idx[x0][y0] to be the syntax showing the prediction block of the prediction origin is set to the intra-brightness prediction mode of the prediction mode. When the syntax element prev_intra_luma_pred_flag [x0][y0] is 0 (false), the intra-brightness prediction mode is not predicted from the neighboring prediction block and the intra-brightness prediction mode is derived from the value of the syntax element rem_intra_luma_pred_mode[x0][y0] showing the decoded intra-brightness prediction mode.

The number of intra-brightness prediction modes of the prediction block in the coding block is different according to the division mode. When the division mode is 2N×2N division, values of intra-brightness prediction modes of one set of prediction blocks are derived for each coding block and when the division mode is N×N division, values of intra-brightness prediction modes of four sets of prediction blocks are derived for each coding block.

When the prediction mode (PredMode) of the coding block derived by the coding information deriver 223 of the coding block unit is the intra-prediction (MODE_INTRA), the intra-color-difference prediction mode deriver 225 derives a value of the first intra-color-difference prediction mode from the supplied value of the syntax element intra_chroma_pred_mode[x0][y0] regarding the intra-color-difference prediction mode of the prediction block of the color-difference signal and the value of the intra-brightness prediction mode supplied from the intra-brightness prediction mode deriver 224, according to the table of FIG. 14. When the color-difference format is 4:2:0 or 4:4:4, the first intra-color-difference prediction mode is supplied as the intra-prediction mode of the color-difference signal to the intra-predictor 206 through the switch 212. In addition, when the color-difference format is 4:2:2, the second intra-color-difference prediction mode is derived from the first intra-color-difference prediction mode by the conversion table of FIG. 15, 16, 17, 30, or 33 and the second intra-color-difference prediction mode is supplied as the intra-prediction mode of the color-difference signal to the intra-predictor 206 through the switch 212. The intra-color-difference prediction mode deriver 225 is a coding information deriver corresponding to the syntax element deriver 123 regarding the intra-color-difference prediction mode of the coding side and derives the intra-color-difference prediction mode according to the common rule at the coding side and the decoding side. At the coding side, in coding of the intra-color-difference prediction mode, a correlation with an intra-brightness prediction mode of a prediction block of a brightness signal of the same position as the prediction block of the color-difference signal is used. At the coding side, when it is determined that a prediction value from the intra-brightness prediction mode of the prediction block of the brightness signal of the same position as the prediction block of the color-difference signal is most suitable, a value of the intra-color-difference prediction mode is predicted from the value of the intra-brightness prediction mode. When it is determined that setting an independent value to the intra-color-difference prediction mode is more preferable than the prediction from the intra-brightness prediction mode, a mechanism for setting any value of 0 (plane prediction), 1 (average value prediction), 10 (horizontal prediction), 26 (vertical prediction), and 34 (oblique prediction) to be representative intra-prediction modes to the intra-color-difference prediction mode is used and a code amount is reduced.

When the prediction mode (PredMode) of the coding block is the intra-prediction (MODE_INTER), the inter-prediction information deriver 226 derives the inter-prediction information from the value of the syntax element regarding the inter-prediction information of the prediction block unit and supplies the derived value of the inter-prediction information to the inter-predictor 207 through the switch 212. The inter-prediction information deriver 226 is an inter-prediction information deriver corresponding to the syntax element deriver 124 regarding the inter-prediction information of the coding side and derives the inter-prediction information according to the common rule at the coding side and het decoding side. The derived inter-prediction information of the prediction block unit includes information such as inter-prediction modes (L0 prediction, L1 prediction, and both predictions), indexes to specify a plurality of reference pictures, and a motion vector.

Figure 26:
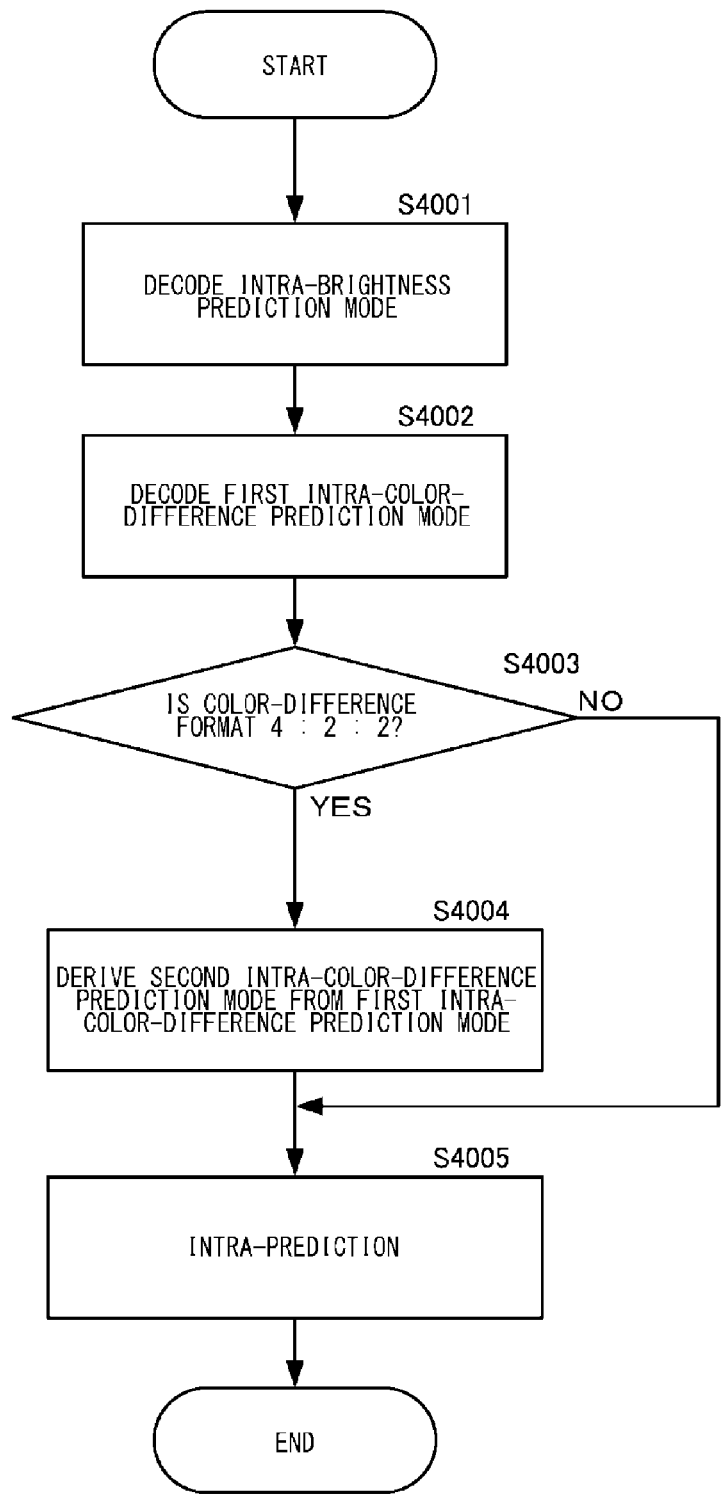
FIG. 26 is a diagram illustrating a process sequence of decoding of an intra-prediction mode and intra-prediction of a decoding side.

Next, a process sequence of decoding of the inter-prediction mode and the intra-prediction at the decoding side will be described. FIG. 26 is a diagram illustrating a process sequence of decoding of the intra-prediction mode and the intra-prediction executed by the second bitstream decoder 203 and the intra-predictor 206 of the decoding side. First, the intra-brightness prediction mode is decoded by the intra-brightness prediction mode deriver 224 of the second bitstream decoder 203 (step S4001 of FIG. 26). Next, the first intra-color-difference prediction mode is decoded by the intra-color-difference prediction mode deriver 225 of the second bitstream decoder 203 according to the table of FIG. 14 (step S4002 of FIG. 26). Next, when the color-difference format is not 4:2:2 (NO of step S4003 of FIG. 26), the process proceeds to step S4004 and when the color-difference format is 4:2:2 (YES of step S4003 of FIG. 26), the second intra-color-difference prediction mode is derived from the first intra-color-difference prediction mode by the intra-color-difference prediction mode deriver 225 of the second bitstream decoder 203, using the conversion table of FIG. 15, 16, 17, 30, or 33 (step S4004 of FIG. 26). Next, the intra-prediction of the brightness signal and the color-difference signal is performed by the intra-predictor 206 (step S4004 of FIG. 26). A process for deriving the second intra-color-difference prediction mode from the first intra-color-difference prediction mode in step S4004 of FIG. 26 may be executed by the intra-predictor 206, instead of the intra-color-difference prediction mode deriver 225 of the second bitstream decoder 203.

When the intra-prediction mode of the plane prediction is 0 and the intra-prediction mode of the average value prediction is 1, similarly to the cases of the color-difference formats 4:2:0 and 4:4:4, in the case of the color-difference format 4:2:2, the intra-prediction mode of the plane prediction is set to 0, the intra-prediction mode of the average value prediction is set to 1, and the intra-prediction is executed. For this reason, in the conversion table of FIG. 15, 16, 17, 30, or 33, even though the first intra-color-difference prediction mode is converted into the second intra-color-difference prediction mode, the values are the same. Therefore, in the intra-prediction modes 0 and 1 not to be the angle prediction, the intra-prediction may be executed after the value of the second intra-color-difference prediction mode is derived from the value of the first intra-color-difference prediction mode using the conversion table of FIG. 15, 16, 17, 30, or 33 and the intra-prediction may be executed according to the first intra-color-difference prediction mode without deriving the second intra-color-difference prediction mode using the conversion table of FIG. 15, 16, 17, 30, or 33.

In the picture coding device and the picture decoding device according to this embodiment, when the color-difference format is 4:2:2, the value of the second intra-color-difference prediction mode is derived from the value of the first intra-color-difference prediction mode using the conversion table of FIG. 15, 16, 17, 30, or 33. However, the value of the second intra-color-difference prediction mode may be derived from the value of the first intra-color-difference prediction mode using a calculation formula, instead of the conversion table.

In the picture coding device and the picture decoding device according to this embodiment, in the case of the color-difference format 4:2:2 in which the aspect ratios of the pixels of the brightness signal and the color-difference signal are different from each other, the value of the second intra-color-difference prediction mode is derived from the value of the first intra-color-difference prediction mode using the conversion table of FIG. 15, 16, 17, 30, or 33. However, in the intra-predictor 103 of the coding device and the intra-predictor 206 of the decoding device, instead of converting the first intra-color-difference prediction mode into the second intra-color-difference prediction mode, a table associated with the angle of the intra-prediction for the color-difference signal of the color-difference format 4:2:2 in addition to the angle (the angle of the intra-prediction for the brightness signal and the angle of the intra-prediction for the color-difference signals of the color-difference formats 4:2:0 and 4:4:4) of the intra-prediction for the signal other than the color-difference signal of the color-difference format 4:2:2 from the intra-prediction mode illustrated in FIG. 27 or 28 may be prepared, the angle of the intra-prediction for the color-difference signal of the color-difference format 4:2:2 may be derived from the first intra-color-difference prediction mode using the table, when the color-difference format is 4:2:2, and the intra-prediction of the color-difference signal may be performed using the angle. FIGS. 27 and 28 are tables used when an angle of the intra-prediction for the color-difference signal of the color-difference format 4:2:2 is derived from the intra-prediction mode, in addition to the angle (the angle of the intra-prediction for the brightness signal and the angle of the intra-prediction for the color-difference signals of the color-difference formats 4:2:0 and 4:4:4) of the intra-prediction for the signal other than the color-difference signal of the color-difference format 4:2:2. FIG. 27 is a table in which the angle of the intra-prediction for the color-difference signal of the color-difference format 4:2:2 is set to obtain the same result as when the value of the second intra-color-difference prediction mode is derived from the value of the first intra-color-difference prediction mode using the conversion table of FIG. 15 and the intra-prediction of the color-difference signal is performed. When the color-difference format is 4:2:2, the angle of the intra-prediction for the color-difference signal is derived according to the table of FIG. 27 and the intra-prediction is performed, so that the same result as when the value of the second intra-color-difference prediction mode is derived from the value of the first intra-color-difference prediction mode using the conversion table of FIG. 15 and the intra-prediction of the color-difference signal is performed is obtained.

FIG. 28 is a table in which a result obtained by multiplying the angle of the intra-prediction with 2 in the vertical direction and ½ in the horizontal direction is set. A derivation process sequence of the table of FIG. 28 when the angle of the first intra-color-difference prediction is converted into the angle of the second intra-color-difference prediction at the color-difference format 4:2:2 will be described using a flowchart of FIG. 29.

Figure 29:
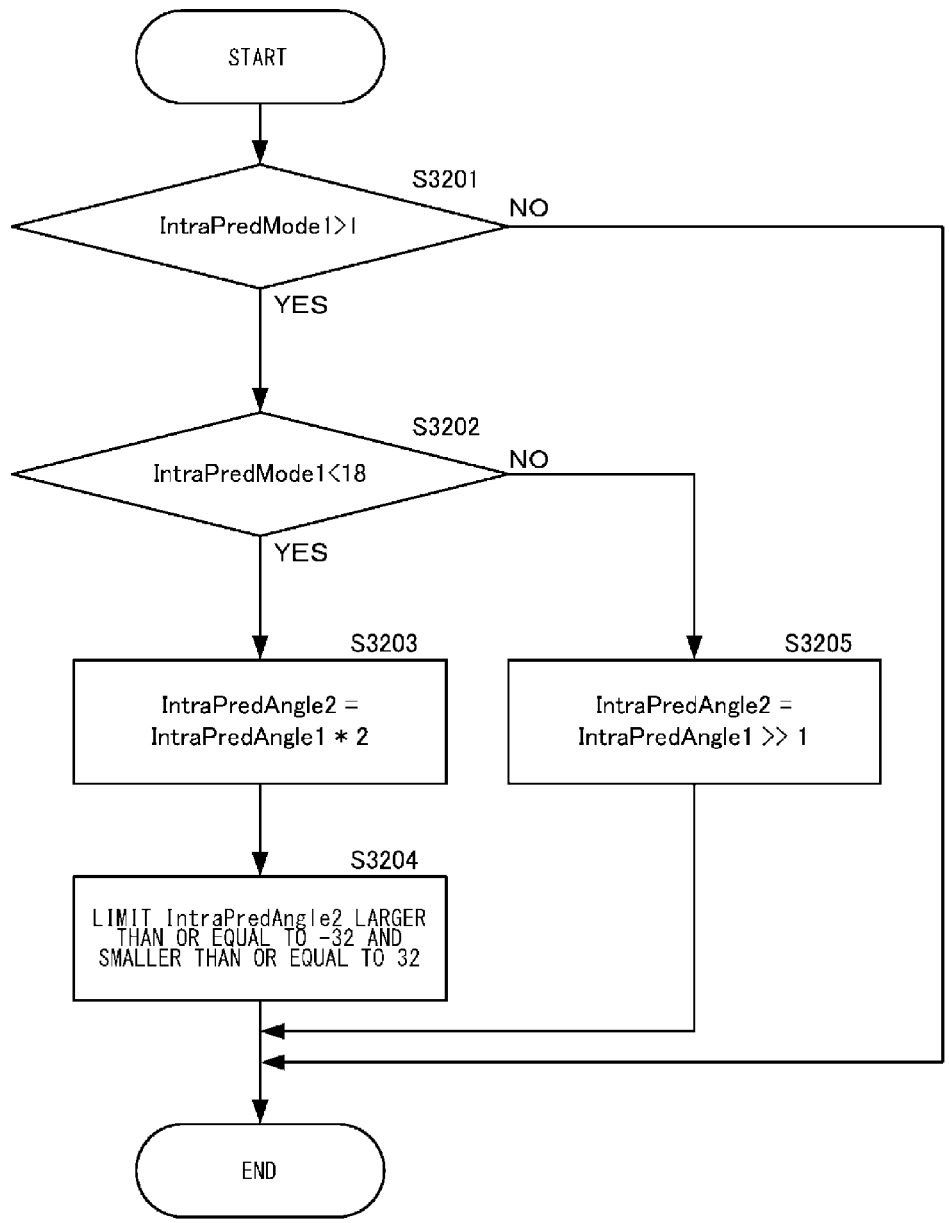
FIG. 29 is a diagram illustrating a derivation process sequence to derive an angle of intra-prediction for a color-difference format 4:2:2 from a first intra-color-difference prediction mode, corresponding to the table of FIG. 28 defined in this embodiment.

In each value of the first intra-prediction mode IntraPredMode1 from 0 to 34, an angle IntraPredMode2 of the second intra-prediction used for the intra-prediction of the color-difference signal of the color-difference format 4:2:2 is derived by a sequence of the flowchart of FIG. 29.

First, when the prediction is not the angle prediction, that is, the first intra-prediction mode IntraPredMode1 is smaller than or equal to 1 (NO of step S3201 of FIG. 29), this derivation process ends. When the first intra-prediction mode IntraPredMode1 is smaller than or equal to 1, this corresponds to plane prediction (intra-prediction mode intraPredMode1=0) in which prediction is performed by interpolating a pixel value from a surrounding decoded block and average value prediction (intra-prediction mode intraPredMode1=1) in which prediction is performed by deriving an average value from a surrounding decoded block.

Meanwhile, when the first intra-color-difference prediction mode IntraPredMode1 is the angle prediction, that is, larger than 1 (YES of step S3201 of FIG. 29), a conversion process from the angle of the first intra-prediction to the angle of the second intra-prediction after step S3202 is executed.

When the intra-color-difference prediction mode IntraPredMode1 is smaller than 18 (YES of step S3202 of FIG. 29), an angle IntraPredAngle1 of the first intra-prediction corresponding to the first intra-prediction mode IntraPredMode1 is doubled and is set to an angle IntraPredAngle2 of the second intra-prediction (step S3203 of FIG. 29). In addition, the angle IntraPredAngle2 of the second intra-prediction is limited to larger than or equal to −32 and smaller than or equal to 32 (step S3204 of FIG. 29) and this derivation process ends. Specifically, when the angle IntraPredAngle2 of the second intra-prediction is smaller than −32, −32 is set to the angle IntraPredAngle2 of the second intra-prediction and when the angle IntraPredAngle2 of the second intra-prediction is larger than 32, 32 is set to the angle IntraPredAngle2 of the second intra-prediction. When the intra-prediction mode IntraPredMode2 is larger than or equal to 2 and is smaller than 18, the intra-prediction mode IntraPredMode2 is maintained.

Meanwhile, when the intra-color-difference prediction mode IntraPredMode1 is not smaller than 18, that is, larger than or equal to 18 (NO of step S3202 of FIG. 29), the angle IntraPredAngle1 of the first intra-prediction corresponding to the first intra-color-difference prediction mode IntraPredMode1 is multiplied with ½ and is set to the angle IntraPredAngle2 of the second intra-prediction (step S3205 of FIG. 29) and this derivation process ends. In this embodiment, a result obtained by executing an operation to shift one bit to the right, equivalent to ½ times, on the angle IntraPredAngle1 of the first intra-prediction is set to the angle IntraPredAngle2 of the second intra-prediction.

In the above description, when the color-difference format is 4:2:2, the angle of the second intra-prediction is derived from the angle of the first intra-prediction using the table of FIG. 28. However, in the intra-predictor 103 of the coding device and the intra-predictor 206 of the decoding device, the angle of the second intra-prediction may be derived from the value of the first intra-color-difference prediction mode, by a derivation method according to the process sequence of FIG. 29, instead of the table of FIG. 28.

The bitstream of the moving pictures output by the picture coding device according to the embodiment described above has the specific data format to be decoded according to the coding method used in the embodiment and the picture decoding device corresponding to the picture coding device can decode the bitstream of the specific data format.

When a wired or wireless network is used to exchange the bitstream between the picture coding device and the picture decoding device, a data format of the bitstream may be converted into a data format suitable for a transmission form of a communication path and the bitstream may be transmitted. In this case, a picture transmitting device to convert the bitstream output by the picture coding device into coding data of the data format suitable for the transmission form of the communication path and transmit the coding data to a network and a picture receiving device to receive the coding data from the network, restore the coding data to the bitstream, and supply the bitstream to the picture decoding device are provided.

The picture transmitting device includes a memory that buffers the bitstream output by the picture coding device, a packet processor that packetizes the bitstream, and a transmitter that transmits the packetized coding data through the network. The picture receiving device includes a receiver that receives the packetized coding data through the network, a memory that buffers the received coding data, and a packet processor that processes the coding data to generate a bitstream and provides the bitstream to the picture decoding device.

The processes regarding the coding and the decoding can be realized as transmission, accumulation, and reception devices using hardware and can be realized by firmware stored in a read only memory (ROM) and a flash memory or software such as a computer. A firmware program and a software program can be recorded on a recording medium readable by the computer and can be provided, the firmware program and the software program can be provided from a server through the wired or wireless network, and the firmware program and the software program can be provided as data broadcasting of terrestrial or satellite digital broadcasting.

The present invention has been described on the basis of the embodiment. However, the embodiment is only exemplary and it should be understood by those skilled in the art that various modifications can be made in a combination of components and processes and the modifications can be included in a range of the present invention.

[Item 1]

A picture coding device for coding information regarding an intra-prediction mode in a prediction block unit and coding picture signals including a brightness signal and a color-difference signal in a conversion block unit using intra-prediction, comprising:

an intra-brightness prediction mode coder that sets a prediction block of the brightness signal, codes a syntax element regarding the intra-prediction mode of the brightness signal, on the basis of the intra-prediction mode of the brightness signal showing an intra-prediction method of the prediction block of the bright signal, and codes information regarding an intra-brightness prediction mode in a bitstream;

an intra-color-difference prediction mode coder that sets a prediction block of the color-difference signal, codes a syntax element regarding an intra-color-difference prediction mode of the color-difference signal by referring to the intra-brightness prediction mode, on the basis of the intra-color-difference prediction mode of the color-difference signal showing an intra-prediction method of the prediction block of the color-difference signal, and codes information regarding the intra-color-difference prediction mode in the bitstream;

a brightness signal intra-predictor that predicts a brightness signal of a conversion block of the brightness signal from a surrounding brightness signal of the conversion block of the brightness signal, according to the intra-brightness prediction mode; and a color-difference signal intra-predictor that predicts a color-difference signal of a conversion block of the color-difference signal from a surrounding color-difference signal of the conversion block of the color-difference signal, according to the intra-color-difference prediction mode.

[Item 2]

The picture coding device according to item 1, wherein when aspect ratios of pixels of the brightness signal and the color-difference signal are different from each other, the intra-color-difference prediction mode coder converts a mode number of a first intra-color-difference prediction mode used when the aspect ratios are equal to each other into a scaled mode number and derives a second intra-color-difference prediction mode used when the aspect ratios are different from each other.

[Item 3]

The picture coding device according to item 1, wherein when aspect ratios of pixels of the brightness signal and the color-difference signal are different from each other, the color-difference signal intra-predictor scales an angle of a prediction direction defined by a first intra-color-difference prediction mode used when the aspect ratios are equal to each other, specifies a mode number of an intra-prediction mode of an angle close to the scaled angle, and derives a second intra-prediction mode used when the aspect ratios are different from each other.

[Item 4]

The picture coding device according to item 1, wherein when aspect ratios of pixels of the brightness signal and the color-difference signal are different from each other, the color-difference signal intra-predictor refers to a conversion table in which a mode number of an intra-color-difference prediction mode used when the aspect ratios are equal to each other and an angle after scaling are associated with each other and performs the intra-prediction on the color-difference signal using a converted angle.

[Item 5]

The picture coding device according to item 1, wherein when aspect ratios of pixels of the brightness signal and the color-difference signal are different from each other, the intra-color-difference prediction mode coder derives a second intra-color-difference prediction mode used when the aspect ratios are different from each other, on the basis of a conversion table in which a value close to a prediction direction derived by scaling an angle of a prediction direction corresponding to a first intra-color-difference prediction mode used when the aspect ratios are equal to each other is set.

[Item 6]

The picture coding device according to item 5, wherein when a value of the second intra-color-difference prediction mode derived by scaling the angle of the prediction direction of the first intra-color-difference prediction mode is beyond a range of mode numbers defined by an intra-prediction mode, the intra-color-difference prediction mode coder sets the value of the second intra-color-difference prediction mode to a value in the range of the mode numbers defined by the intra-prediction mode.

[Item 7]

The picture coding device according to item 5 or 6, wherein the intra-color-difference prediction mode coder refers to a syntax element regarding an intra-color-difference prediction mode and a corresponding intra-brightness prediction mode and specifies a mode number of the first intra-color-difference prediction mode, and the color-difference signal intra-predictor derives the second intra-color-difference prediction mode, on the basis of a conversion table in which a value obtained by scaling the mode number of the first intra-color-difference prediction mode is set to exclude a mode number derived when values of the intra-brightness prediction mode and the first intra-color-difference prediction mode are not matched with each other.

[Item 8]

The picture coding device according to any one of items 5 to 7, wherein the intra-color-difference prediction mode coder refers to a syntax element regarding an intra-color-difference prediction mode and a corresponding intra-brightness prediction mode and specifies a mode number of the first intra-color-difference prediction mode, and when the mode number of the first intra-color-difference prediction mode is not a value showing vertical prediction, the color-difference signal intra-predictor derives the second intra-color-difference prediction mode, on the basis of a conversion table in which the mode number is converted to exclude a mode number showing the vertical prediction.

[Item 9]

The picture coding device according to any one of items 1 to 8, wherein the number of candidates of the syntax element regarding the intra-color-difference prediction mode is smaller than the number of intra-color-difference prediction modes.

[Item 10]

A picture coding method for coding information regarding an intra-prediction mode in a prediction block unit and coding picture signals including a brightness signal and a color-difference signal in a conversion block unit using intra-prediction, comprising:

setting a prediction block of the brightness signal, coding a syntax element regarding the intra-prediction mode of the brightness signal, on the basis of the intra-prediction mode of the brightness signal showing an intra-prediction method of the prediction block of the bright signal, and coding information regarding an intra-brightness prediction mode in a bitstream;

setting a prediction block of the color-difference signal, coding a syntax element regarding an intra-color-difference prediction mode of the color-difference signal by referring to the intra-brightness prediction mode, on the basis of the intra-color-difference prediction mode of the color-difference signal showing an intra-prediction method of the prediction block of the color-difference signal, and coding information regarding the intra-color-difference prediction mode in the bitstream;

predicting a brightness signal of a conversion block of the brightness signal from a surrounding brightness signal of the conversion block of the brightness signal, according to the intra-brightness prediction mode; and predicting a color-difference signal of a conversion block of the color-difference signal from a surrounding color-difference signal of the conversion block of the color-difference signal, according to the intra-color-difference prediction mode.

[Item 11]

A picture coding program for coding information regarding an intra-prediction mode in a prediction block unit and coding picture signals including a brightness signal and a color-difference signal in a conversion block unit using intra-prediction, the picture coding program causing a computer to execute:

setting a prediction block of the brightness signal, coding a syntax element regarding the intra-prediction mode of the brightness signal, on the basis of the intra-prediction mode of the brightness signal showing an intra-prediction method of the prediction block of the bright signal, and coding information regarding an intra-brightness prediction mode in a bitstream;

setting a prediction block of the color-difference signal, coding a syntax element regarding an intra-color-difference prediction mode of the color-difference signal by referring to the intra-brightness prediction mode, on the basis of the intra-color-difference prediction mode of the color-difference signal showing an intra-prediction method of the prediction block of the color-difference signal, and coding information regarding the intra-color-difference prediction mode in the bitstream;

predicting a brightness signal of a conversion block of the brightness signal from a surrounding brightness signal of the conversion block of the brightness signal, according to the intra-brightness prediction mode; and predicting a color-difference signal of a conversion block of the color-difference signal from a surrounding color-difference signal of the conversion block of the color-difference signal, according to the intra-color-difference prediction mode.

[Item 12]

A picture decoding device for decoding information regarding an intra-prediction mode in a prediction block unit and decoding picture signals including a brightness signal and a color-difference signal in a conversion block unit using intra-prediction, comprising:

an intra-brightness prediction mode decoder that decodes a syntax element regarding an intra-prediction mode of the brightness signal from a bitstream in which information regarding an intra-brightness prediction mode showing an intra-prediction method of a prediction block of the bright signal is coded and derives the intra-prediction mode of the brightness signal;

an intra-color-difference prediction mode decoder that decodes a syntax element regarding an intra-color-difference prediction mode of the color difference signal from the bitstream in which information regarding an intra-color-difference prediction mode showing an intra-prediction method of a prediction block of the color-difference signal is coded and derives the intra-color-difference prediction mode by referring to the intra-brightness prediction mode;

a brightness signal intra-predictor that predicts a brightness signal of a conversion block of the brightness signal from a surrounding brightness signal of the conversion block of the brightness signal, according to the intra-brightness prediction mode specified for each prediction block of the brightness signal; and a color-difference signal intra-predictor that predicts a color-difference signal of a conversion block of the color-difference signal from a surrounding color-difference signal of the conversion block of the color-difference signal, according to the intra-color-difference prediction mode specified for each prediction block of the color-difference signal.

[Item 13]

The picture decoding device according to item 12, wherein when aspect ratios of pixels of the brightness signal and the color-difference signal are different from each other, the intra-color-difference prediction mode decoder converts a mode number of a first intra-color-difference prediction mode used when the aspect ratios are equal to each other into a scaled mode number and derives a second intra-color-difference prediction mode used when the aspect ratios are different from each other.

[Item 14]

The picture decoding device according to item 12, wherein when aspect ratios of pixels of the brightness signal and the color-difference signal are different from each other, the color-difference signal intra-predictor scales an angle of a prediction direction defined by a first intra-color-difference prediction mode used when the aspect ratios are equal to each other, specifies a mode number of an intra-prediction mode of an angle close to the scaled angle, and derives a second intra-prediction mode used when the aspect ratios are different from each other.

[Item 15]

The picture decoding device according to item 12, wherein when aspect ratios of pixels of the brightness signal and the color-difference signal are different from each other, the color-difference signal intra-predictor refers to a conversion table in which a mode number of an intra-color-difference prediction mode used when the aspect ratios are equal to each other and an angle after scaling are associated with each other and performs the intra-prediction on the color-difference signal using a converted angle.

[Item 16]

The picture decoding device according to item 12, wherein when aspect ratios of pixels of the brightness signal and the color-difference signal are different from each other, the intra-color-difference prediction mode decoder derives a second intra-color-difference prediction mode used when the aspect ratios are different from each other, on the basis of a conversion table in which a value close to a prediction direction derived by scaling an angle of a prediction direction corresponding to a first intra-color-difference prediction mode used when the aspect ratios are equal to each other is set.

[Item 17]

The picture decoding device according to item 16, wherein when a value of the second intra-color-difference prediction mode derived by scaling the angle of the prediction direction of the first intra-color-difference prediction mode is beyond a range of mode numbers defined by an intra-prediction mode, the intra-color-difference prediction mode decoder sets the value of the second intra-color-difference prediction mode to a value in the range of the mode numbers defined by the intra-prediction mode.

[Item 18]

The picture decoding device according to item 16 or 17, wherein the intra-color-difference prediction mode decoder refers to a syntax element regarding an intra-color-difference prediction mode and a corresponding intra-brightness prediction mode and specifies a mode number of the first intra-color-difference prediction mode, and the color-difference signal intra-predictor derives the second intra-color-difference prediction mode, on the basis of a conversion table in which a value obtained by scaling the mode number of the first intra-color-difference prediction mode is set to exclude a mode number derived when values of the intra-brightness prediction mode and the first intra-color-difference prediction mode are not matched with each other.

[Item 19]

The picture decoding device according to any one of items 16 to 18, wherein the intra-color-difference prediction mode decoder refers to a syntax element regarding an intra-color-difference prediction mode and a corresponding intra-brightness prediction mode and specifies a mode number of the first intra-color-difference prediction mode, and when the mode number of the first intra-color-difference prediction mode is not a value showing vertical prediction, the color-difference signal intra-predictor derives the second intra-color-difference prediction mode, on the basis of a conversion table in which the mode number is converted to exclude a mode number showing the vertical prediction.

[Item 20]

The picture decoding device according to any one of items 12 to 19, wherein the number of candidates of the syntax element regarding the intra-color-difference prediction mode is smaller than the number of intra-color-difference prediction modes.

[Item 21]

A picture decoding method for decoding information regarding an intra-prediction mode in a prediction block unit and decoding picture signals including a brightness signal and a color-difference signal in a conversion block unit using intra-prediction, comprising:

decoding a syntax element regarding an intra-prediction mode of the brightness signal from a bitstream in which information regarding an intra-brightness prediction mode showing an intra-prediction method of a prediction block of the bright signal is coded and deriving the intra-prediction mode of the brightness signal;

decoding a syntax element regarding an intra-color-difference prediction mode of the color-difference signal from the bitstream in which information regarding an intra-color-difference prediction mode showing an intra-prediction method of a prediction block of the color-difference signal is coded and deriving the intra-color-difference prediction mode by referring to the intra-brightness prediction mode;

predicting a brightness signal of a conversion block of the brightness signal from a surrounding brightness signal of the conversion block of the brightness signal, according to the intra-brightness prediction mode specified for each prediction block of the brightness signal; and predicting a color-difference signal of a conversion block of the color-difference signal from a surrounding color-difference signal of the conversion block of the color-difference signal, according to the intra-color-difference prediction mode specified for each prediction block of the color-difference signal.

[Item 22]

A picture decoding program for decoding information regarding an intra-prediction mode in a prediction block unit and decoding picture signals including a brightness signal and a color-difference signal in a conversion block unit using intra-prediction, the picture decoding program causing a computer to execute:

decoding a syntax element regarding an intra-prediction mode of the brightness signal from a bitstream in which information regarding an intra-brightness prediction mode showing an intra-prediction method of a prediction block of the bright signal is coded and deriving the intra-prediction mode of the brightness signal;

decoding a syntax element regarding an intra-color-difference prediction mode of the color-difference signal from the bitstream in which information regarding an intra-color-difference prediction mode showing an intra-prediction method of a prediction block of the color-difference signal is coded and deriving the intra-color-difference prediction mode by referring to the intra-brightness prediction mode;

predicting a brightness signal of a conversion block of the brightness signal from a surrounding brightness signal of the conversion block of the brightness signal, according to the intra-brightness prediction mode specified for each prediction block of the brightness signal; and predicting a color-difference signal of a conversion block of the color-difference signal from a surrounding color-difference signal of the conversion block of the color-difference signal, according to the intra-color-difference prediction mode specified for each prediction block of the color-difference signal.

What is claimed is:

1. A picture decoding device for decoding information regarding an intra-prediction mode in a prediction block unit and decoding picture signals including a brightness signal and a color-difference signal in a conversion block unit using intra-prediction, comprising:

an intra-brightness prediction mode decoder that decodes a first syntax element regarding an intra-prediction mode of the brightness signal from a bitstream in which information regarding an intra-brightness prediction mode showing an intra-prediction method of a prediction block of a bright signal is coded and derives the intra-brightness prediction mode from the first syntax element;

an intra-color-difference prediction mode decoder that decodes a second syntax element regarding an intra-color-difference prediction mode of the color-difference signal from the bitstream in which information regarding an intra-color-difference prediction mode showing an intra-prediction method of a prediction block of the color-difference signal is coded and derives a first intra-color-difference prediction mode from the second syntax element and the intra-brightness prediction mode;

a brightness signal intra-predictor that predicts a brightness signal of a conversion block of the brightness signal from a surrounding brightness signal of the conversion block of the brightness signal, according to the intra-brightness prediction mode specified for each prediction block of the brightness signal; and a color-difference signal intra-predictor that predicts a color-difference signal of a conversion block of the color-difference signal from a surrounding color-difference signal of the conversion block of the color-difference signal, according to the intra-color-difference prediction mode specified for each prediction block of the color-difference signal, wherein when aspect ratios of pixels of the brightness signal and the color-difference signal are different from each other, the intra-color-difference prediction mode decoder derives a second intra-color-difference prediction mode from the first intra-color-difference prediction mode, based on a conversion table in which an intra-prediction mode of a prediction direction of an angle close to an angle derived by scaling an angle of a prediction direction corresponding to the first intra-color-difference prediction mode used when the aspect ratios are equal to each other by a predetermined scaling factor is set as the second intra-color-difference prediction mode used when the aspect ratios are different from each other, in the conversion table, a mode number of the second intra-color-difference prediction mode is set, excluding a mode number showing vertical prediction, if a mode number of the first intra-color-difference prediction mode is not a mode number showing vertical prediction.

2. A picture decoding method for decoding information regarding an intra-prediction mode in a prediction block unit and decoding picture signals including a brightness signal and a color-difference signal in a conversion block unit using intra-prediction, comprising:

decoding a first syntax element regarding an intra-prediction mode of the brightness signal from a bitstream in which information regarding an intra-brightness prediction mode showing an intra-prediction method of a prediction block of a bright signal is coded and derives the intra-brightness prediction mode from the first syntax element;

decoding a second syntax element regarding an intra-color-difference prediction mode of the color-difference signal from the bitstream in which information regarding an intra-color-difference prediction mode showing an intra-prediction method of a prediction block of the color-difference signal is coded and derives a first intra-color-difference prediction mode from the second syntax element and the intra-brightness prediction mode;

predicting a brightness signal of a conversion block of the brightness signal from a surrounding brightness signal of the conversion block of the brightness signal, according to an intra-brightness prediction mode specified for each prediction block of the brightness signal; and predicting a color-difference signal of a conversion block of the color-difference signal from a surrounding color-difference signal of the conversion block of the color-difference signal, according to the intra-color-difference prediction mode specified for each prediction block of the color-difference signal, wherein when aspect ratios of pixels of the brightness signal and the color-difference signal are different from each other, deriving a second intra-color-difference prediction mode from the first intra-color-difference prediction mode, based on a conversion table in which an intra-prediction mode of a prediction direction of an angle close to an angle derived by scaling an angle of a prediction direction corresponding to the first intra-color-difference prediction mode used when the aspect ratios are equal to each other by a predetermined scaling factor is set as the second intra-color-difference prediction mode used when the aspect ratios are different from each other, in the conversion table, a mode number of the second intra-color-difference prediction mode is set, excluding a mode number showing vertical prediction, if a mode number of the first intra-color-difference prediction mode is not a mode number showing vertical prediction.

3. A non-transitory computer-readable recording medium having embodied thereon a picture decoding program for decoding information regarding an intra-prediction mode in a prediction block unit and decoding picture signals including a brightness signal and a color-difference signal in a conversion block unit using intra-prediction, the picture decoding program causing a computer to execute:

decoding a first syntax element regarding an intra-prediction mode of the brightness signal from a bitstream in which information regarding an intra-brightness prediction mode showing an intra-prediction method of a prediction block of a bright signal is coded and derives the intra-brightness prediction mode from the first syntax element;

decoding a second syntax element regarding an intra-color-difference prediction mode of the color-difference signal from the bitstream in which information regarding an intra-color-difference prediction mode showing an intra-prediction method of a prediction block of the color-difference signal is coded and derives a first intra-color-difference prediction mode from the second syntax element and the intra-brightness prediction mode;

predicting a brightness signal of a conversion block of the brightness signal from a surrounding brightness signal of the conversion block of the brightness signal, according to an intra-brightness prediction mode specified for each prediction block of the brightness signal; and predicting a color-difference signal of a conversion block of the color-difference signal from a surrounding color-difference signal of the conversion block of the color-difference signal, according to the intra-color-difference prediction mode specified for each prediction block of the color-difference signal, wherein when aspect ratios of pixels of the brightness signal and the color-difference signal are different from each other, deriving a second intra-color-difference prediction mode from the first intra-color-difference prediction mode, based on a conversion table in which an intra-prediction mode of a prediction direction of an angle close to an angle derived by scaling an angle of a prediction direction corresponding to the first intra-color-difference prediction mode used when the aspect ratios are equal to each other by a predetermined scaling factor is set as the second intra-color-difference prediction mode used when the aspect ratios are different from each other, in the conversion table, a mode number of the second intra-color-difference prediction mode is set, excluding a mode number showing vertical prediction, if a mode number of the first intra-color-difference prediction mode is not a mode number showing vertical prediction.

\* \* \* \* \*